United States Patent [19]
Park

[11] Patent Number: 6,004,241
[45] Date of Patent: Dec. 21, 1999

[54] POWERTRAIN FOR 5-SPEED AUTOMATIC TRANSMISSIONS

[75] Inventor: Jong-sool Park, Suwon-si, Rep. of Korea

[73] Assignee: Hyundai Motor Company, Seoul, Rep. of Korea

[21] Appl. No.: 09/099,410

[22] Filed: Jun. 18, 1998

[30] Foreign Application Priority Data

Oct. 8, 1997 [KR] Rep. of Korea .................. 97-51614

[51] Int. Cl.$^6$ ..................................................... F16H 3/62
[52] U.S. Cl. ............................................ 475/275; 475/284
[58] Field of Search ............................... 475/275, 284

[56] References Cited

U.S. PATENT DOCUMENTS

| | | | |
|---|---|---|---|
| 5,098,357 | 3/1992 | Asada et al. ........................... | 475/284 |
| 5,122,103 | 6/1992 | Nakawaki et al. ...................... | 475/284 |
| 5,716,298 | 2/1998 | Beim et al. ............................. | 475/275 |

*Primary Examiner*—Dirk Wright
*Attorney, Agent, or Firm*—Finnegan, Henderson, Farabow, Garrett & Dunner, L.L.P.

[57] ABSTRACT

A powertrain which is used for a 5-speed automatic transmission. The powertrain includes a first planetary gear unit and a second planetary gear unit. The first planetary gear unit comprises first and second simple planetary gearsets having first, second, third, and fourth operating elements, while the second planetary gear unit comprises a simple planetary gearsets having fifth, sixth, and seventh operating elements. The fifth operating element acts as an output element, one of the operating elements of the second planetary gear unit being fixedly connected to one of the operating elements of the first planetary gear unit, and the remaining two operating elements of the second planetary gear unit are variably connected to one operating element of the first planetary gear unit. Clutches are provided for variably connecting the two operating elements of the second planetary gear unit to the one operating element of the first planetary gear unit, and a brake is provided for selectively connecting at least one of the operating elements of the first and second planetary gear units to a transmission housing.

68 Claims, 43 Drawing Sheets

FIG. 6

| Shift Stage | C1 | C2 | B1 | B2 |
|---|---|---|---|---|
| R |  |  | ● | ● |
| D 1 | ● |  | ● |  |
| D 2 | ● |  |  | ● |
| D 3 | ● | ● |  |  |
| D 4 |  | ● |  | ● |
| D 5 |  | ● | ● |  |

6,004,241

POWERTRAIN FOR 5-SPEED AUTOMATIC TRANSMISSIONS

FIELD OF THE INVENTION

The present invention relates to a powertrain for automatic transmissions, and more particularly, to a powertrain for a 5-speed automatic transmission which can be designed to be compact in size and lightweight by reducing the number of friction elements and planetary gearsets.

BACKGROUND OF THE INVENTION

Generally, automatic transmissions include a transmission control unit (TCU) for automatically controlling shift ratios according to variations in vehicle speed and load.

The TCU controls friction elements, a plurality of which are provided in a powertrain, to ON and OFF states to select one of the three elements of a planetary gearset (sun gear, ring gear, and planet carrier) to be an input element, another a reaction element, and the last an output element, thereby controlling the number of output revolutions.

To design a powertrain so that four forward speeds and one reverse speed can be output, one compound planetary gearset, comprised of two simple planetary gearsets, and at least five friction elements are used. The compound planetary gearset is structured such that elements from one planetary gearset are integrated or shared with elements from another planetary gearset.

However, the powertrain structured as in the above has the disadvantage of having a limited number of forward speeds, i.e., four. As a result, the powertrain can not make full use of the power provided by increasingly high-output engines. Also, the powertrain is not fuel efficient.

As a solution, there is provided a prior art powertrain having five forward speeds and one reverse speed. Such a powertrain is comprised of three simple planetary gearsets and at least six friction elements.

However, in such a powertrain for a 5-speed automatic transmission, to drive the vehicle in fourth or fifth-speed overdrive, there is a need for an element which rotates at a higher speed than that of a final output element. This results in a substantial amount of power loss. In addition, the large number of friction elements results in a heavy and large-size automatic transmission.

SUMMARY OF THE INVENTION

The present invention has been made in an effort to solve the above problems. It is an object of the present invention to provide a powertrain for a 5-speed automatic transmission which minimizes power loss by eliminating an element rotating faster than a final output element needed in the prior art when in overdrive.

It is another object of the present invention to provide a powertrain for a 5-speed automatic transmission which can be designed to be compact in size and lightweight by reducing the number of friction elements.

To achieve the above objects, the present invention provides a powertrain for a 5-speed automatic transmission. The powertrain includes a first planetary gear unit and a second planetary gear unit. The first planetary gear unit comprises first and second simple planetary gearsets having first, second, third, and fourth operating elements, while the second planetary gear unit comprises a simple planetary gearsets having fifth, sixth, and seventh operating elements. The fifth operating element acts as an output element, one of the operating elements of the second planetary gear unit being fixedly connected to one of the operating elements of the first planetary gear unit, and the remaining two operating elements of the second planetary gear unit are variably connected to one operating element of the first planetary gear unit. Clutches are provided for variably connecting the two operating elements of the second planetary gear unit to the one operating element of the first planetary gear unit, and a brake is provided for selectively connecting at least one of the operating elements of the first and second planetary gear units to a transmission housing.

BRIEF DESCRIPTION OF THE DRAWINGS

These and other features, aspects, and advantages of the present invention will become better understood with regard to the following description, appended claims, and accompanying drawings where:

Figure 6:
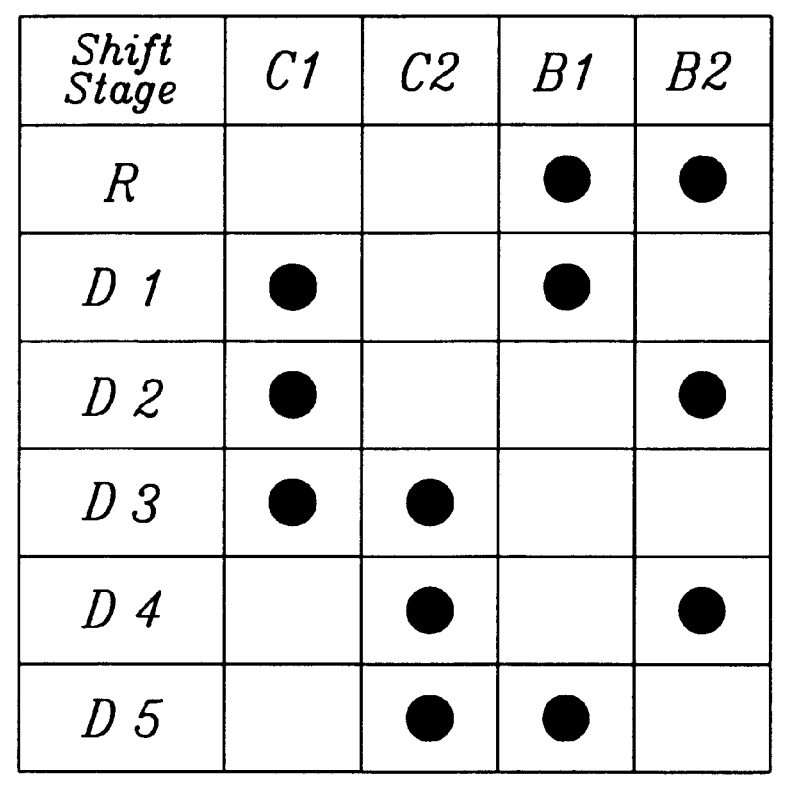

FIG. 6 is a chart illustrating the operation of friction elements in each shift range of a powertrain according to a preferred embodiment of the present invention;

DETAILED DESCRIPTION OF THE PREFERRED EMBODIMENTS

In the following detailed description, only the preferred embodiments of the invention have been shown and described, simply by way of illustration of the best mode contemplated by the inventor of carrying out the invention. As will be realized, the invention is capable of modification in various obvious respects, all without departing from the invention. Accordingly, the drawings and description are to be regarded as illustrative in nature, and not restrictive.

Figure 1:
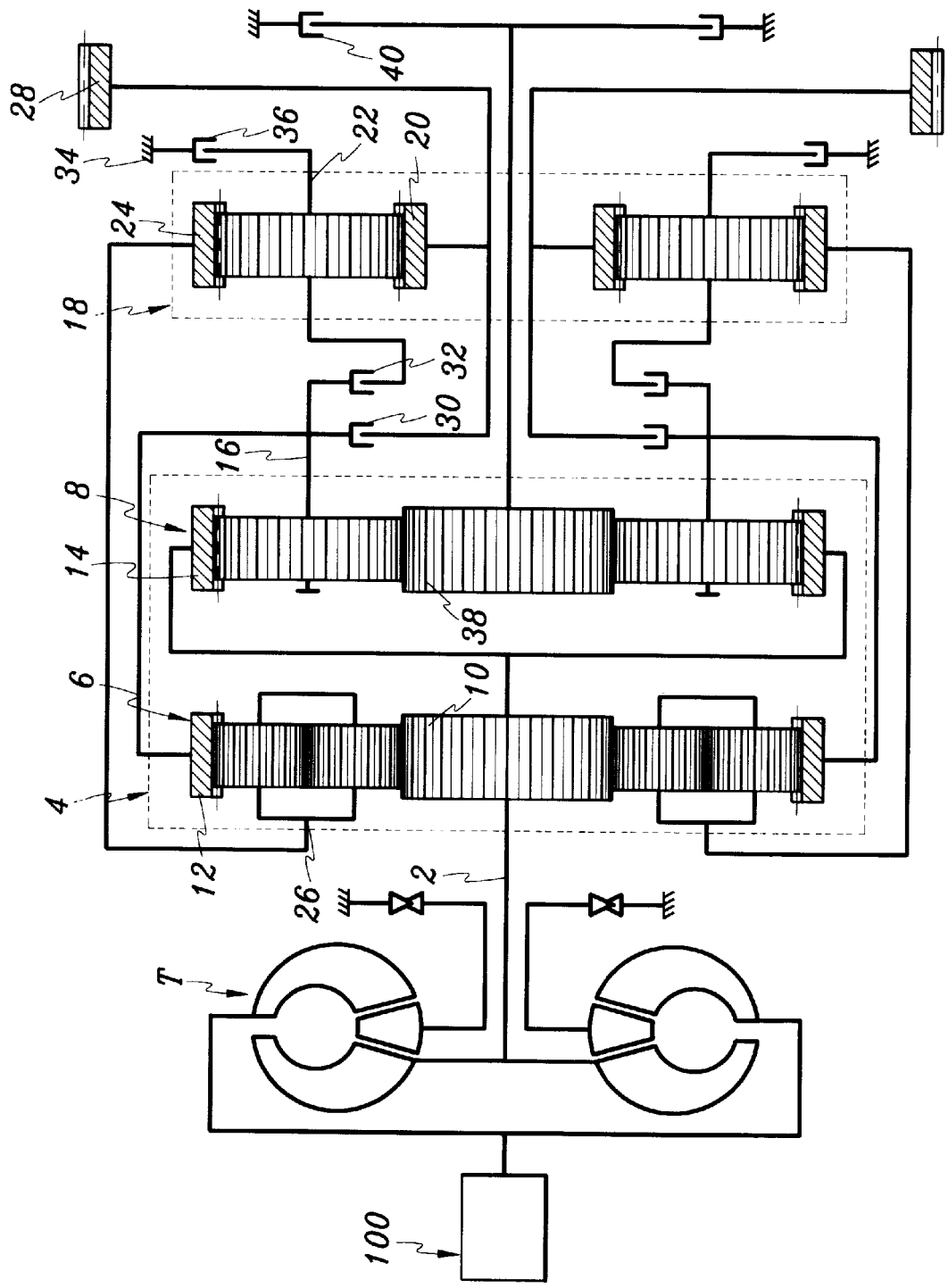
FIG. 1 is a schematic view of a powertrain according to a first preferred embodiment of the present invention.

Referring to FIG. 1, shown is a schematic view of a powertrain according to a first preferred embodiment of the present invention. As shown in the drawing, the inventive powertrain comprises an engine E for generating power, a torque converter T for multiplying torque generated from the engine E, and first and second planetary gear units 4 and 18 for receiving rotational power through an input shaft 2 and for outputting five forward speeds and one reverse speed.

The first planetary gear unit 4 is realized through the combination of a first simple planetary gearset 6 and a second simple planetary gearset 8. In the present invention, the first simple planetary gearset 6 is a double pinion planetary gearset and the second simple planetary gearset 8 is a single pinion planetary gearset.

A sun gear 10 and a ring gear 12 of the first simple planetary gearset 6 are fixedly connected respectively to a ring gear 14 and a planet carrier 16 of the second simple planetary gearset 8. Together with these two combinations, and a planet carrier 26 of the first simple planetary gearset 6 and a sun gear 38 of the second simple planetary gearset 8, four operating elements are provided in the first planetary gear unit 4.

The second planetary gear unit 18, receiving power from the first planetary gear unit 4, is realized through one single pinion planetary gearset. The second planetary gear unit 18 includes a sun gear 20, a planet carrier 22 for connecting a plurality of pinions mounted equidistantly around an outer circumference of the sun gear 20, and a ring gear 24 circumscribing the pinions and meshing with the same.

With regard to the combination of the first and second planetary gear units 4 and 18, the planet carrier 26 of the first simple planetary gearset 8 is fixedly connected to the ring gear 24 of the second planetary gear unit 18, and the planet carrier 16 of the second simple planetary gearset 8 is variably connected to both the sun gear 20 and planet carrier 22 of the second planetary gear unit 18. The sun gear 20 of the second planetary gear unit 18 is integrally formed with an output gear 28 such that the sun gear 20 acts as an output element.

Here, because the structure and operation of the output gear 28 is well known, i.e., its differential function through a final reduction gear, an explanation thereof and illustration in FIG. 1 have been omitted.

Further, first and second clutches 30 and 32 are provided to realize the above variable connections. Namely, the first clutch 30 connects the planet carrier 16 of the second simple planetary gearset 8 to the sun gear 20 of the second planetary gear unit 18 when in the forward first, second, and third speeds; and the second clutch 32 connects the planet carrier 16 of the second simple planetary gearset 8 to the planet carrier 22 of the second planetary gear unit 18 in forward third, fourth, and fifth speeds.

Also, first and second brakes 36 and 40 are provided to selectively enable at least one of the operating elements forming the first and second planetary gear units 4 18 to act as a reaction element. The first brake 36 connects the planet carrier 22 of the second planetary gear unit 18 to a transmission housing 34 in forward first and fifth speeds and in reverse, and the second brake 40 connects the sun gear 38 of the second simple planetary gearset 8 to the transmission housing 34 in forward second and fourth speeds and in reverse.

Figure 2:
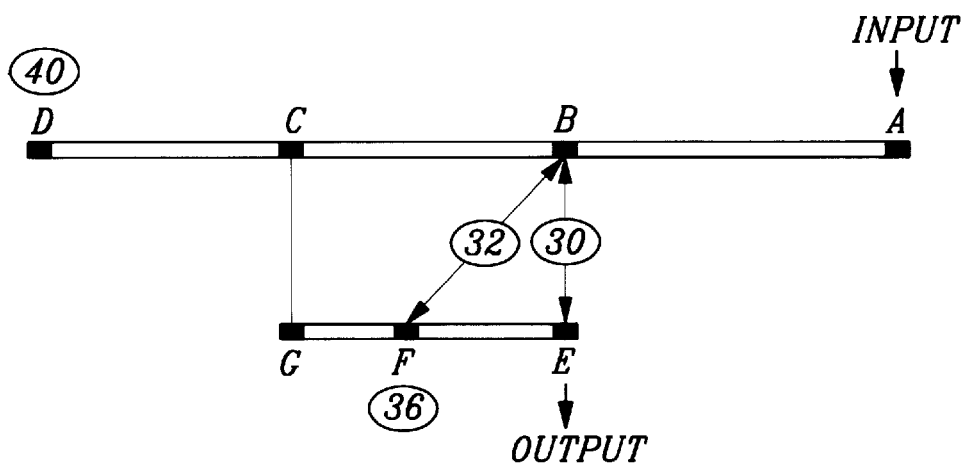
FIG. 2 is a lever analogy representation which can be obtained through powertrains according to various embodiments of the present invention.

Referring now to FIG. 2, shown is a lever analogy representation which can be obtained through powertrains according to various embodiments of the present invention. In the drawing, the first planetary gear unit 4 is represented by a first operating element A indicating the sun gears 10 and ring gear 14 of the first and second simple planetary gearsets 6 and 8, a second operating element B indicating the ring gear 12 and planet carrier 16 of the first and second simple planetary gearsets 6 and 8, a third operating element C indicates the planet carrier 26 of the first simple planetary gearset 6, and a fourth operating element D indicates the sun gear 38 of the second simple planetary gearset 8.

In the above, the establishment of the first through fourth operating elements of the first planetary gear unit 4 is determined by the type of planetary gear unit and connecting structure. As this process is well known, a detailed description thereof is omitted.

With regard to the second planetary gear unit 18, the first operating element E indicates the sun gear 20, a second operating element F indicates the planet carrier 22, and a third operating element G indicates the ring gear 24.

With reference to FIG. 2, the first planetary gear unit 4, having four operating elements, and the second planetary gear unit 18, having three operating element, are combined in the following manner: the third operating element C of the first planetary gear unit 4, or the planet carrier 26 of the first simple planetary gearset 6, is fixedly connected to the third operating element G of the second planetary gear unit 18, or the ring gear 24; the second operating element B of the first planetary gear unit 4, or the ring gear 12 and planet carrier 16 of the first and second simple planetary gearsets 6 and 8, is variably connected to both the first operating element E of the second planetary gear unit 18, or the sun gear 20, through the first clutch 30, and to the second operating element F of the second planetary gear unit 18, or the planet carrier 22, through the second clutch 32.

Figure 3:
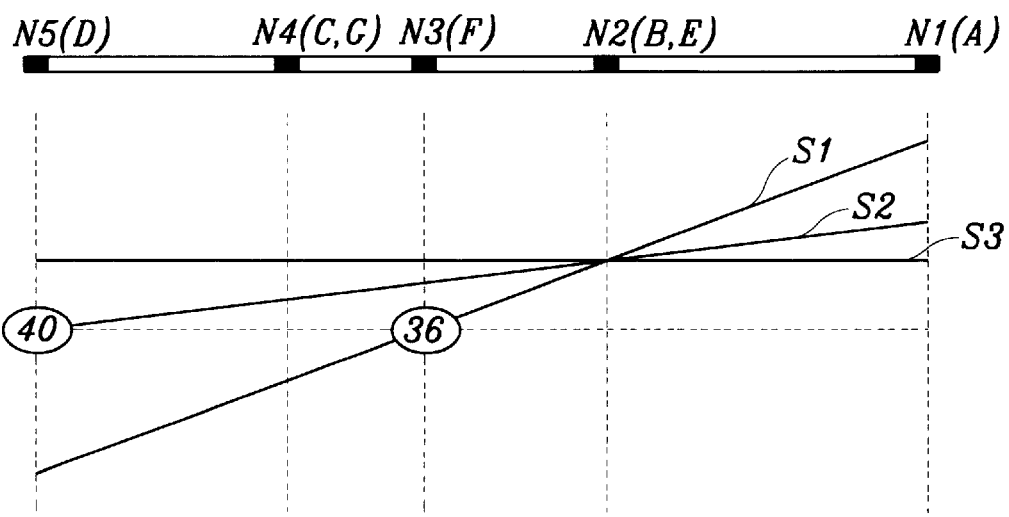
FIG. 3 is a schematic diagram illustrating an operation of forward first, second, and third speeds of a powertrain according to a preferred embodiment of the present invention through a lever analogy.

On the basis of the above description, the first and la 12 second planetary gear units 4 and 18 can be merged into a single lever as shown in FIG. 3, the lever having first through fifth nodes N1, N2, N3, N4, and N5 representing the operating elements of the first and second planetary gear units 4 and 18. The lever analogy of FIG. 3 is used to illustrate the operation of the inventive powertrain in forward first, second, and third speeds. The first clutch is engaged in all of these three speeds.

Describing in more detail with reference to the drawing, the first node N1 indicates the first operating element A of the first planetary gear unit 4, the second node N2 indicates a combination of the second operating element B of the first planetary gear unit 4 and the first operating element E of the second planetary gear unit 18, the third node N3 indicates the second operating element F of the second planetary gear unit 18, the fourth node N4 indicates a combination of the third operating element C of the first planetary gear unit 4 and the third operating element G of the second planetary gear unit 18, and the fifth node N5 indicates the fourth operating element D of the first planetary gear unit 4.

Forward First Speed

In the forward first speed, the first clutch 30 and the first brake 36 are engaged. Here, in a state where input is realized through the sun gear 10 and ring gear 14 of the first and second simple planetary gearsets 6 and 8, or the first node N1, and the planet carrier 22 of the second planetary gear unit 18, or the third node N3, acts as a reaction element by the operation of the first brake 36.

Accordingly, as shown in FIG. 3, if assuming that the number of output revolutions is "1", the line connecting the third node N3, or reacting element, to the second node N2, or output element, becomes a first speed line S1. As shown by the first speed line S1, the number of revolutions input through the first node N1 is substantially higher than output revolutions.

Further, the planet carrier 26 of the first simple planetary gearset 6 and the ring gear 24 of the second planetary gear unit 18, comprising the fourth node N4, and the sun gear 38 of the second simple planetary gearset 8, or the fifth node N5, rotate reversely.

Forward Second Speed

In the forward second speed, the first brake 36 is disengaged, while the second brake 40 is engaged. Here, in a state where input is realized through the first node N1, the sun gear 38 of the second planetary gear unit 18, or the fifth node N6, acts as reaction elements by the operation of the second brake 40.

Accordingly, as shown in FIG. 3, if assuming that the number of output revolutions is "1", the line connecting the fifth node N5, or reacting element, to the second node N2, or output element, becomes a second speed line S2. As shown in the second speed line S2, the number of revolutions input is less than that of the first speed.

Further, in the second speed, although the third and fourth nodes N3 and N4 rotate in a direction identical to that of input, they rotate at a number of revolutions less than that of the output.

Forward Third Speed

In the forward third speed, the second brake 40 is disengaged, while the second clutch 32 is engaged such that both clutches 30 and 32 are operating. Here, in a state where input is realized through the first node N1, the first and second planetary gear units 4 and 18 become locked in direct drive such that a 1:1 ratio is realized between the input and output. That is, neither a state of gear reduction nor overdrive is realized.

Forward Fourth Speed

In the forward fourth and fifth speeds, the first clutch 30 is disengaged, the second clutch 32 is engaged, and either the first or second brake 36 and 40 is engaged. As a result, the second operating element B of the first planetary gear unit 4 and the second operating element F of the second planetary gear unit 18 are connected.

Figure 4:
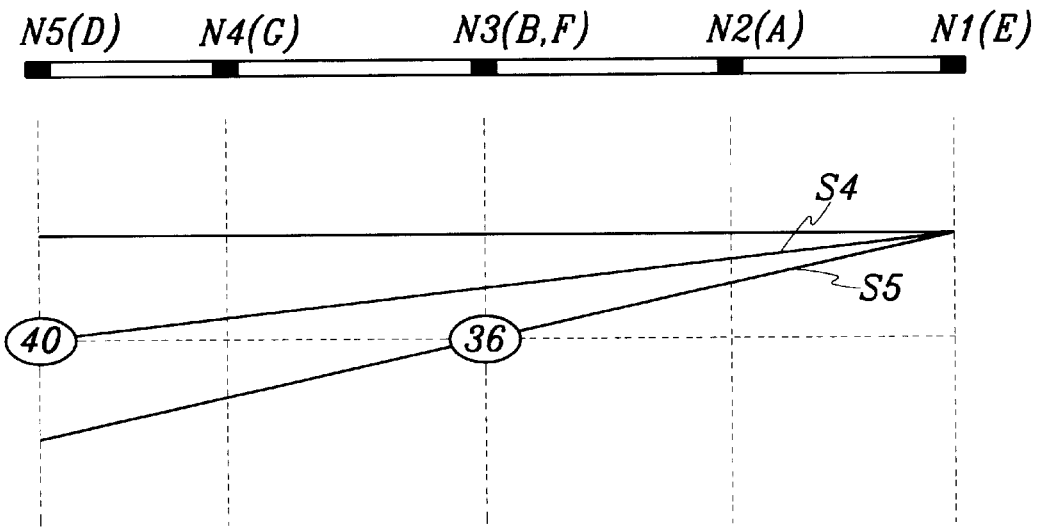
FIG. 4 is a schematic diagram illustrating an operation of forward fourth and fifth speeds of a powertrain according to a preferred embodiment of the present invention through a lever analogy.

Accordingly, the first and second planetary gear units 4 and 18 can be merged into a single lever having first to fifth nodes N1, N2, N3, N4, and N5 as shown in FIG. 4. That is, in the lever of FIG. 4, the first node N1 indicates the first operating element G of the second planetary gear unit 18, the second node N2 indicates the first operating element A of the first planetary gear unit 4, the third node N3 indicates the second operating element B of the first planetary gear unit 4 and the second operating element F of the second planetary gear unit 18, the fourth node N4 indicates the third operating element G of the second planetary gear unit 18, and the fifth node N5 indicates the fourth operating element D of the first planetary gear unit 4.

Therefore, in the fourth speed, if assuming the number of output revolutions is "1" in a state where input is realized through the second node N2, a line connecting the fifth node N5, operating as a reacting element by the operation of the second brake 40, with the first node N1, operating as an output element, becomes a fourth speed line S4. Accordingly, the number of revolutions input through the second node N2 is substantially lower than output revolutions, indicating the realization of an overdrive state.

Also, because the third and fourth nodes N3 and N4 rotate at a rate slower than the output, an operating element rotating faster than the output is not need as in the prior art such that power loss is prevented.

Forward Fifth Speed

In the forward fifth speed, the second brake 40 is disengaged, while the first brake 36 is engaged. Accordingly, in a state where input is realized through the second node N2, if assuming the number of output revolutions is "1", a line connecting the third node N3, operating as a reacting element by the operation of the first brake 36, with the first node N1, operating as an output element, becomes a fifth speed line S5. Here, an overdrive state is realized as in the forward fourth speed.

Reverse

Figure 5:
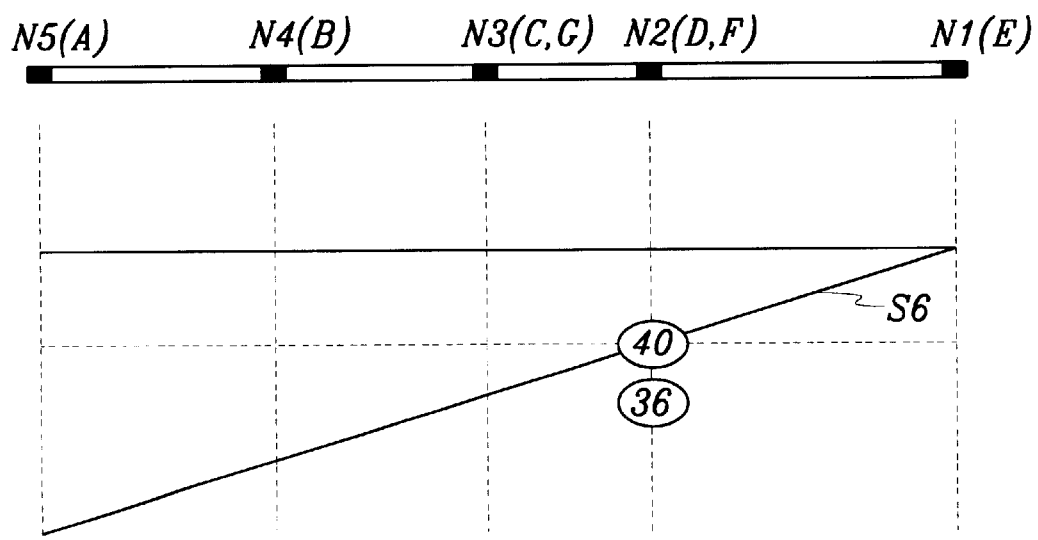
FIG. 5 is a schematic diagram illustrating an operation of a reverse speed of a powertrain according to a preferred embodiment of the present invention through a lever analogy.

In the reverse range, the first and second clutches 30 and 32 are disengaged, while the first and second brakes 36 and 40 are engaged. Accordingly, as shown in FIG. 5, the fourth operating element D of the first planetary gear unit 4 and the second operating element F of the second planetary gear unit 18 are connected, such that the first operating element A of the first planetary gear unit 4 comes to be located at an opposite position as in the forward speeds in the lever of FIG. 5. The lever of FIG. 5 has first to fifth nodes N1, N2, N3, N4, and N5.

In the lever, the first node N1 indicates the first operating element E of the second planetary gear unit 18, the second node N2 indicates the fourth operating element D of the first planetary gear unit 4 and the second operating element F of the second planetary gear unit 18, the third node N3 indicates the third operating element C of the first planetary gear unit 4 and the third operating element G of the second planetary gear unit 18, the fourth node N4 indicates the second operating element B of the first planetary gear unit 4, and the fifth node N5 indicates the first operating element A of the first planetary gear unit 4.

Therefore, in the reverse range where input is realized through the fifth node N5 and the second node N2 acts as a reacting element by the engagement of the first and second brakes 36 and 40, if assuming the number of output revolutions is "1", a line connecting the second node N2, operating as a reacting element, with the first node N1, operating as an output element, becomes a reverse speed line S6.

In FIG. 5, input below "0" does not indicate input in the reverse direction. This is merely a result of selecting the random number of output revolution of "1".

Second Embodiment

Figure 7:
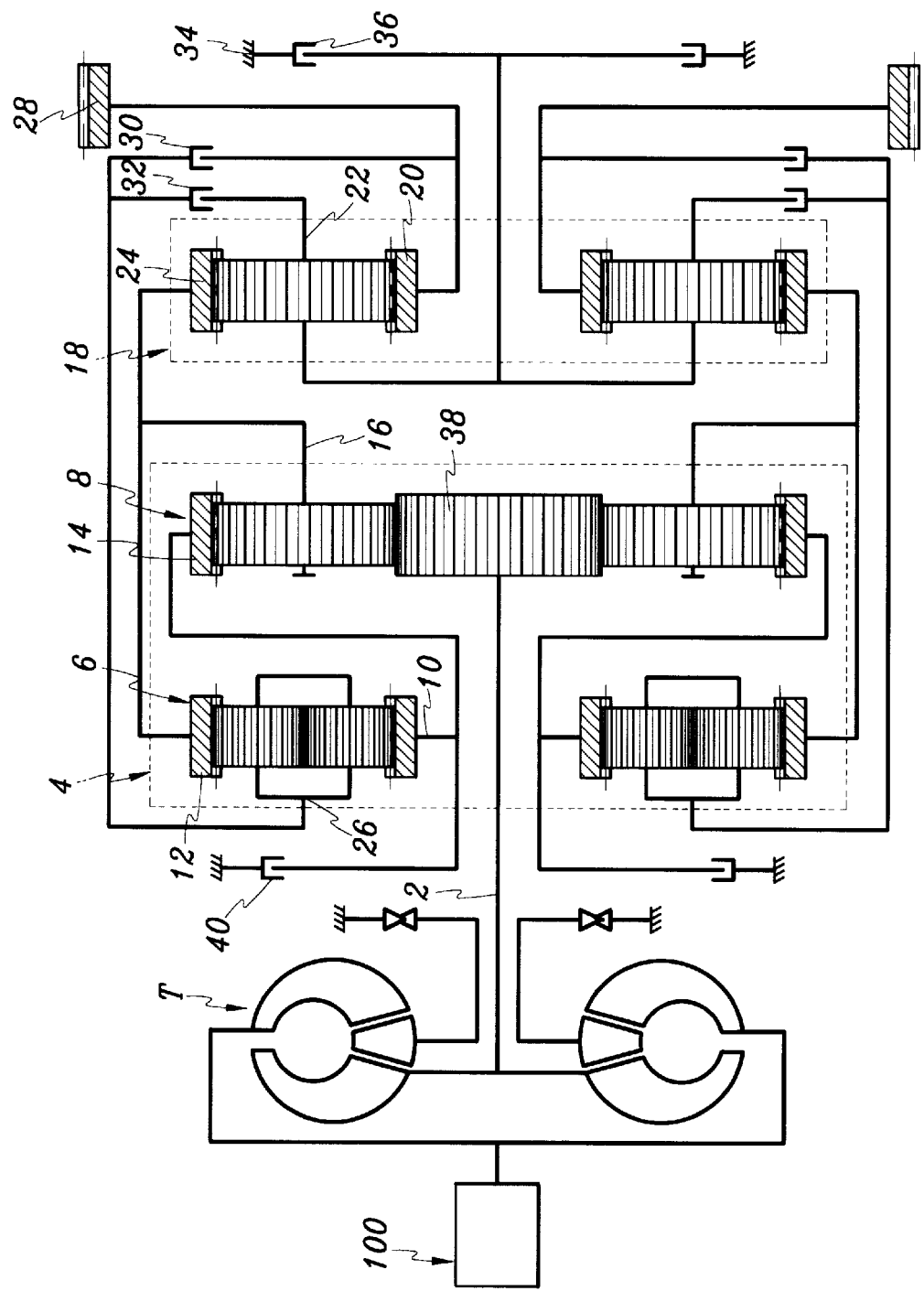
FIG. 7 is a schematic view of a powertrain according to a second preferred embodiment of the present invention.

Referring to FIG. 7, shown is a schematic view of a powertrain according to a second preferred embodiment of the present invention. In the drawing, the first planetary gear unit 4 is formed by a combination of the first simple planetary gearset 6 with the second simple planetary gearset 8, the first and second simple planetary gearsets 6 and 8 being respectively double and single pinion planetary gearsets as in the first embodiment. Namely, the sun gear 10 and ring gear 12 of the first simple planetary gearset 6 are fixedly connected respectively to the ring gear 14 and planet carrier 16 of the second simple planetary gearset 8.

Further, with regard to the combination of the first and second planetary gear units 4 and 18, the ring gear 12 of the first simple planetary gearset 6 is fixedly connected to the ring gear 24 of the second planetary gear unit 18, and the planet carrier 26 of the first simple planetary gearset 6 is variably connected to both the sun gear 20 of the second planetary gear unit 18 through the first clutch 30, and to the planet carrier 22 of the second planetary gear unit 18 through the second clutch 32.

Also, the first brake 36 is interposed between the planet carrier 22 of the second planetary gear unit 18 and the transmission housing 34, and the second brake 40 is interposed between the sun gear 10 of the first simple planetary gearset 6 and the transmission housing 34 such that the planet carrier 22 and sun gear 10 selectively act as reacting elements. In addition, the sun gear 20 of the second planetary gear unit 18 is integrally formed with the output gear 28 such that the sun gear 20 acts as an output element.

According to the above structure, operating elements for the first planetary gear unit 4 in the lever analogies of FIGS. 2–5 are as follows: the first operating element A indicates the sun gear 38 of the second simple planetary gearset 8, the second operating element B indicates the planet carrier 26 of the first simple planetary gearset 6, the third operating element C indicates the ring gear 12 of the first simple planetary gearset 6 and the planet carrier 16 of the second simple planetary gearset 8, and the fourth operating element D indicates the sun gear 10 of the first simple planetary gearset 6 and the ring gear 14 of the second simple planetary gearset 8.

The operating elements of the first planetary gear unit 4 are connected to the operating elements of the second planetary gear unit 18 identically as in the first embodiment. Namely, the third operating element C of the first planetary gear unit 4 is fixedly connected to the third operating element G of the second planetary gear unit 18, and the second operating element B of the first planetary gear unit 4 is variably connected to the first and second operating elements E and F of the second planetary gear unit 18.

In the second embodiment, only the structure of the first planetary gear unit 4 is changed from the first embodiment. As the operation of the operating elements in each shift range is identical to that of the first embodiment, an explanation thereof will be omitted herein.

Third Embodiment

Figure 8:
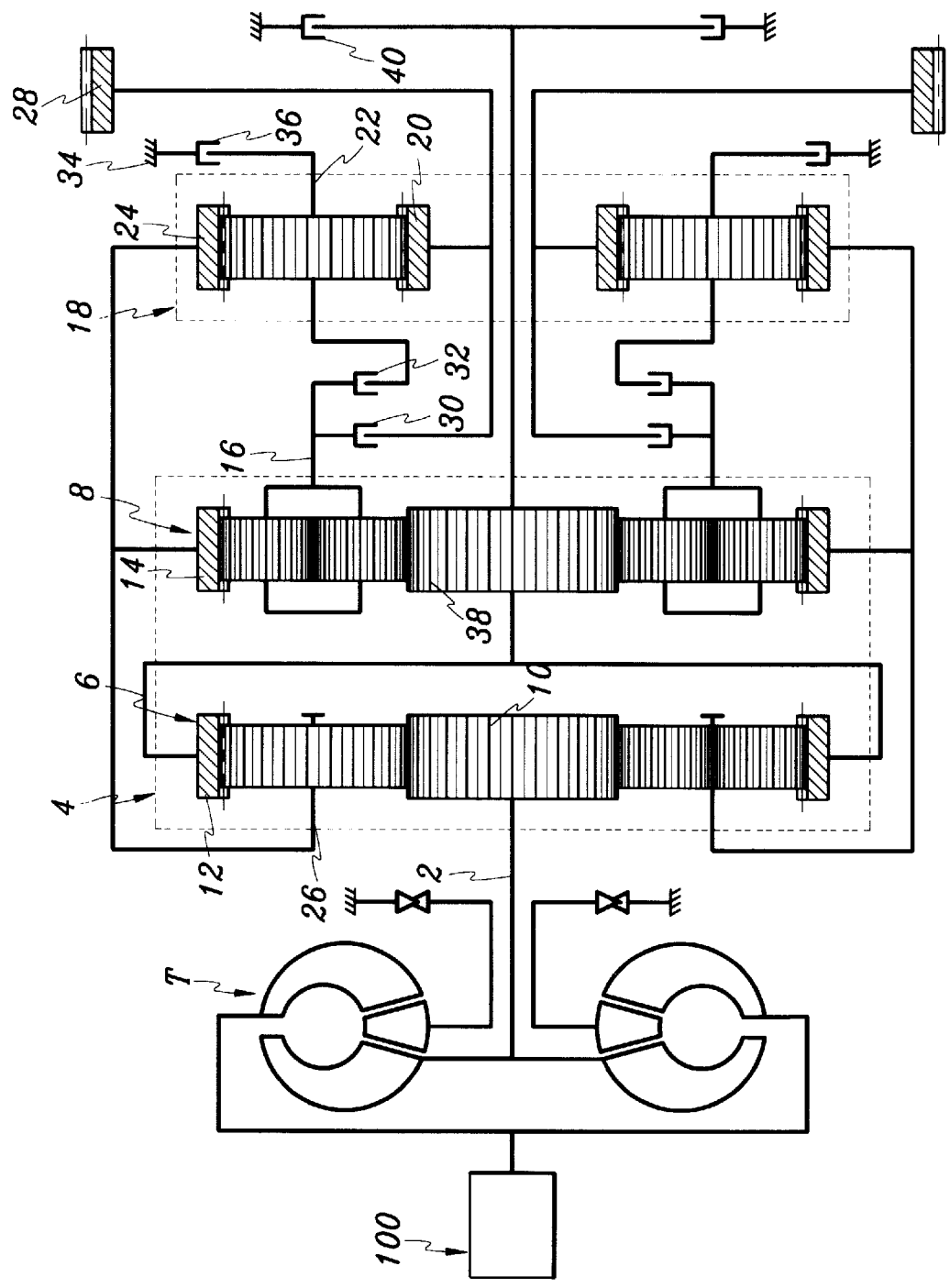
FIG. 8 is a schematic view of a powertrain according to third preferred embodiment of the present invention.

Referring to FIG. 8, shown is a schematic view of a powertrain according to a third preferred embodiment of the present invention. In the drawing, the first planetary gear unit 4 is formed by a combination of the first simple planetary gearset 6, which is a single pinion planetary gearset in this embodiment, with the second second simple planetary gearset 8, which is a double pinion planetary gearset in this embodiment. Namely, the planet carrier 26 and ring gear 12 of the first simple planetary gearset 6 are fixedly connected respectively to the ring gear 14 and sun gear 38 of the second simple planetary gearset 8.

Further, with regard to the combination of the first and second planetary gear units 4 and 18, the planet carrier 26 of the first simple planetary gearset 6 is fixedly connected to the ring gear 24 of the second planetary gear unit 18, and the planet carrier 16 of the second simple planetary gearset 8 is variably connected to both the sun gear 20 of the second planetary gear unit 18 through the first clutch 30, and to the planet carrier 22 of the second planetary gear unit 18 through the second clutch 32.

Also, the first brake 36 is interposed between the planet carrier 22 of the second planetary gear unit 18 and the transmission housing 34, and the second brake 40 is interposed between the sun gear 38 of the second simple planetary gearset 8 and the transmission housing 34 such that the planet carrier 22 and sun gear 38 selectively act as reacting elements. In addition, the sun gear 20 of the second planetary gear unit 18 is integrally formed with the output gear 28 such that the sun gear 20 acts as an output element.

According to the above structure, operating elements for the first planetary gear unit 4 in the lever analogies of FIGS. 2–5 are as follows: the first operating element A indicates the sun gear 10 of the first simple planetary gearset 6, the second operating element B indicates the planet carrier 16 of the second simple planetary gearset 8, the third operating element C indicates the planet carrier 26 of the first simple planetary gearset 6 and the ring gear 14 of the second simple planetary gearset 8, and the fourth operating element D indicates the ring gear 12 of the first simple planetary gearset 6 and the sun gear 38 of the second simple planetary gearset 8.

The operating elements of the first planetary gear unit 4 are connected to the operating elements of the second planetary gear unit 18 identically as in the first embodiment. Namely, the third operating element C of the first planetary gear unit 4 is fixedly connected to the third operating element G of the second planetary gear unit 18, and the second operating element B of the first planetary gear unit 4 is variably connected to the first and second operating elements E and F of the second planetary gear unit 18.

In the third embodiment, only the structure of the first planetary gear unit 4 is changed from the first embodiment. As the operation of the operating elements in each shift range is identical to that of the first embodiment, an explanation thereof will be omitted herein.

Fourth Embodiment

Figure 9:
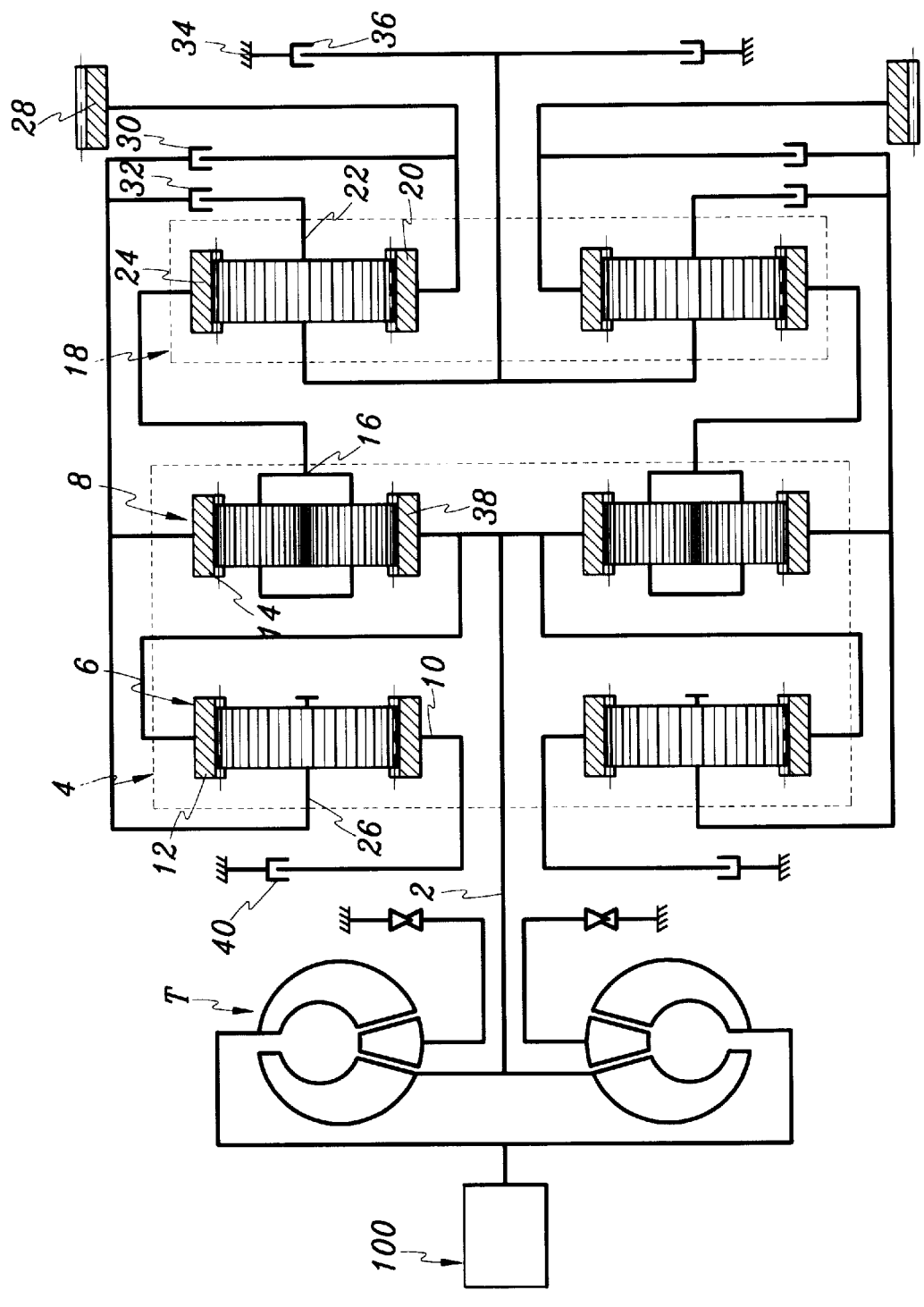
FIG. 9 is a schematic view of a powertrain according to a fourth preferred embodiment of the present invention.

Referring to FIG. 9, shown is a schematic view of a powertrain according to a fourth preferred embodiment of the present invention. In the drawing, the first planetary gear unit 4 is formed by a combination of the first simple planetary gearset 6, which is a single pinion planetary gearset in this embodiment, with the second simple planetary gearset 8, which is a double pinion planetary gearset in this embodiment. Namely, the planet carrier 26 and ring gear 12 of the first simple planetary gearset 6 are fixedly connected respectively to the ring gear 14 and sun gear 38 of the second simple planetary gearset 8.

Further, with regard to the combination of the first and second planetary gear units 4 and 18, the planet carrier 16 of the second simple planetary gearset 8 is fixedly connected to the ring gear 24 of the second planetary gear unit 18, the planet carrier 26 of the first simple planetary gearset 6 is variably connected to the sun gear 20 of the second planetary gear unit 18 through the first clutch 30, and the ring gear 14 of the second simple planetary gearset 8 is variably connected to the planet carrier 22 of the second planetary gear unit 18 through the second clutch 32.

Also, the first brake 36 is interposed between the planet carrier 22 of the second planetary gear unit 18 and the transmission housing 34, and the second brake 40 is interposed between the sun gear 10 of the first simple planetary gearset 6 and the transmission housing 34 such that the planet carrier 22 and sun gear 10 selectively act as reacting elements. In addition, the sun gear 20 of the second planetary gear unit 18 is integrally formed with the output gear 28 such that the sun gear 20 acts as an output element.

According to the above structure, operating elements for the first planetary gear unit 4 in the lever analogies of FIGS. 2–5 are as follows: the first operating element A indicates the ring gear 12 of the first simple planetary gearset 6 and the sun gear 38 of the second simple planetary gearset 8, the second operating element B indicates the planet carrier 26 of the first simple planetary gearset 6 and ring gear 14 of the second simple planetary gearset 8, the third operating element C indicates the planet carrier 16 of the second simple planetary gearset 8, and the fourth operating element D indicates the sun gear 10 of the first simple planetary gearset 6.

The operating elements of the first planetary gear unit 4 are connected to the operating elements of the second planetary gear unit 18 identically as in the first embodiment. Namely, the third operating element C of the first planetary gear unit 4 is fixedly connected to the third operating element G of the second planetary gear unit 18, and the second operating element B of the first planetary gear unit 4 is variably connected to the first and second operating elements E and F of the second planetary gear unit 18.

In the fourth embodiment, only the structure of the first planetary gear unit 4 is changed from the first embodiment. As the operation of the operating elements in each shift range is identical to that of the first embodiment, an explanation thereof will be omitted herein.

Fifth Embodiment

Figure 10:
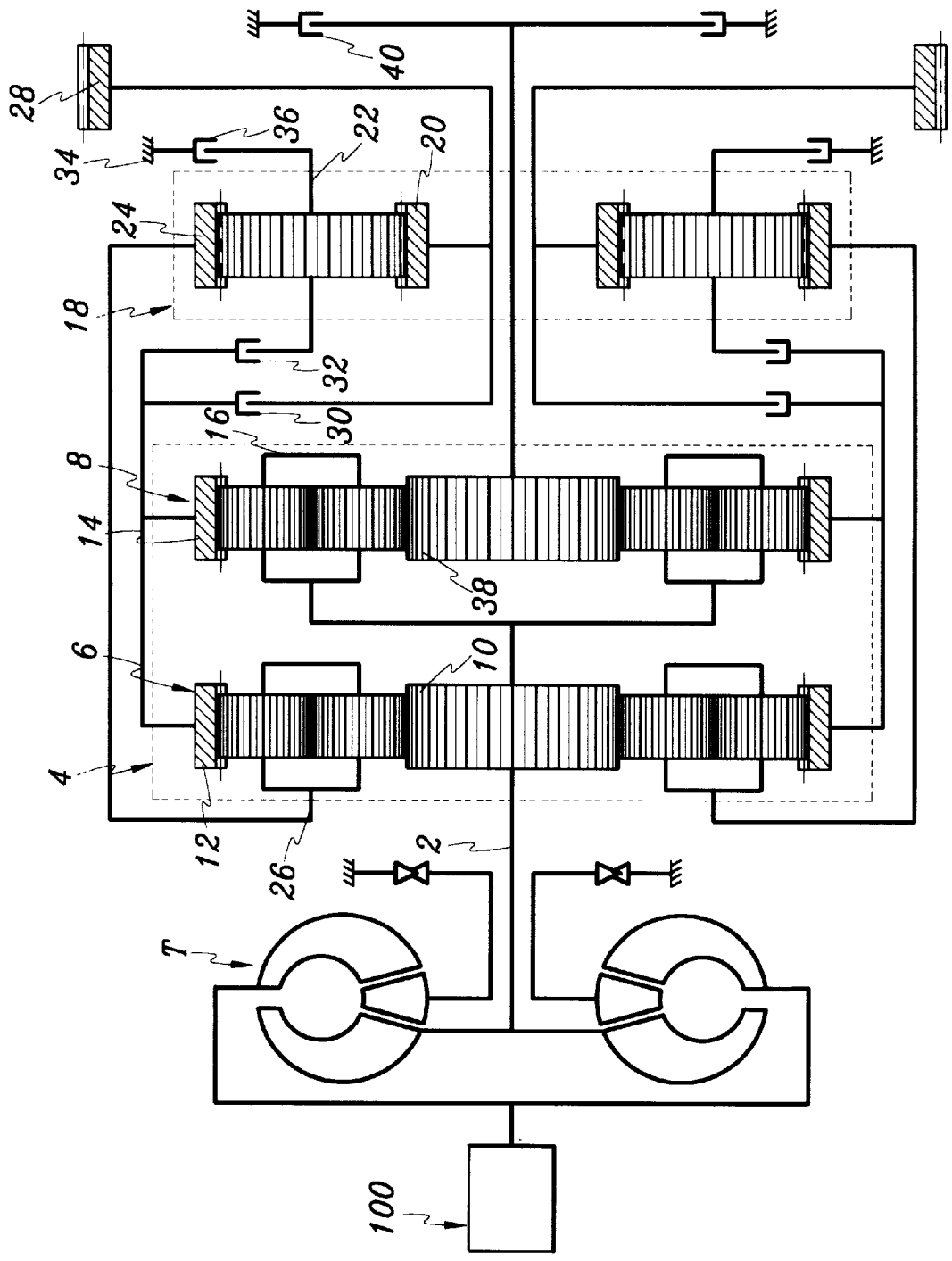
FIG. 10 is a schematic view of a powertrain according to a fifth preferred embodiment of the present invention.

Referring to FIG. 10, shown is a schematic view of a powertrain according to a fifth preferred embodiment of the present invention. In the drawing, the first planetary gear unit 4 is formed by a combination of the first simple planetary gearset 6, which is a double pinion planetary gearset as in the first embodiment, with the second simple planetary gearset 8, which is a double pinion planetary gearset in this embodiment. Namely, the sun gear 10 and ring gear 12 of the first simple planetary gearset 6 are fixedly connected respectively to the planet carrier 16 and ring gear 14 of the second simple planetary gearset 8.

Further, with regard to the combination of the first and second planetary gear units 4 and 18, the planet carrier 26 of the first simple planetary gearset 6 is fixedly connected to the ring gear 24 of the second planetary gear unit 18, and the ring gears 12 and 14 of the first and second simple planetary gearsets 6 and 8 are variably connected to both the sun gear 20 of the second planetary gear unit 18 through the first clutch 30, and the planet carrier 22 of the second planetary gear unit 18 through the second clutch 32.

Also, the first brake 36 is interposed between the planet carrier 22 of the second planetary gear unit 18 and the transmission housing 34, and the second brake 40 is interposed between the sun gear 38 of the second simple planetary gearset 8 and the transmission housing 34 such that the planet carrier 22 and sun gear 38 selectively act as reacting elements. In addition, the sun gear 20 of the second planetary gear unit 18 is integrally formed with the output gear 28 such that the sun gear 20 acts as an output element.

According to the above structure, operating elements for the first planetary gear unit 4 in the lever analogies of FIGS. 2–5 are as follows: the first operating element A indicates the sun gear 10 of the first simple planetary gearset 6 and the planet carrier 16 of the second simple planetary gearset 8, the second operating element B indicates the ring gears 12 and 14 of the first and second simple planetary gearsets 6 and 8, the third operating element C indicates the planet carrier 26 of the first simple planetary gearset 6, and the fourth operating element D indicates the sun gear 38 of the second simple planetary gearset 8.

The operating elements of the first planetary gear unit 4 are connected to the operating elements of the second planetary gear unit 18 identically as in the first embodiment. Namely, the third operating element C of the first planetary gear unit 4 is fixedly connected to the third operating element G of the second planetary gear unit 18, and the second operating element B of the first planetary gear unit 4 is variably connected to the first and second operating elements E and F of the second planetary gear unit 18.

In the fifth embodiment, only the structure of the first planetary gear unit 4 is changed from the first embodiment. As the operation of the operating elements in each shift range is identical to that of the first embodiment, an explanation thereof will be omitted herein.

Sixth Embodiment

Figure 11:
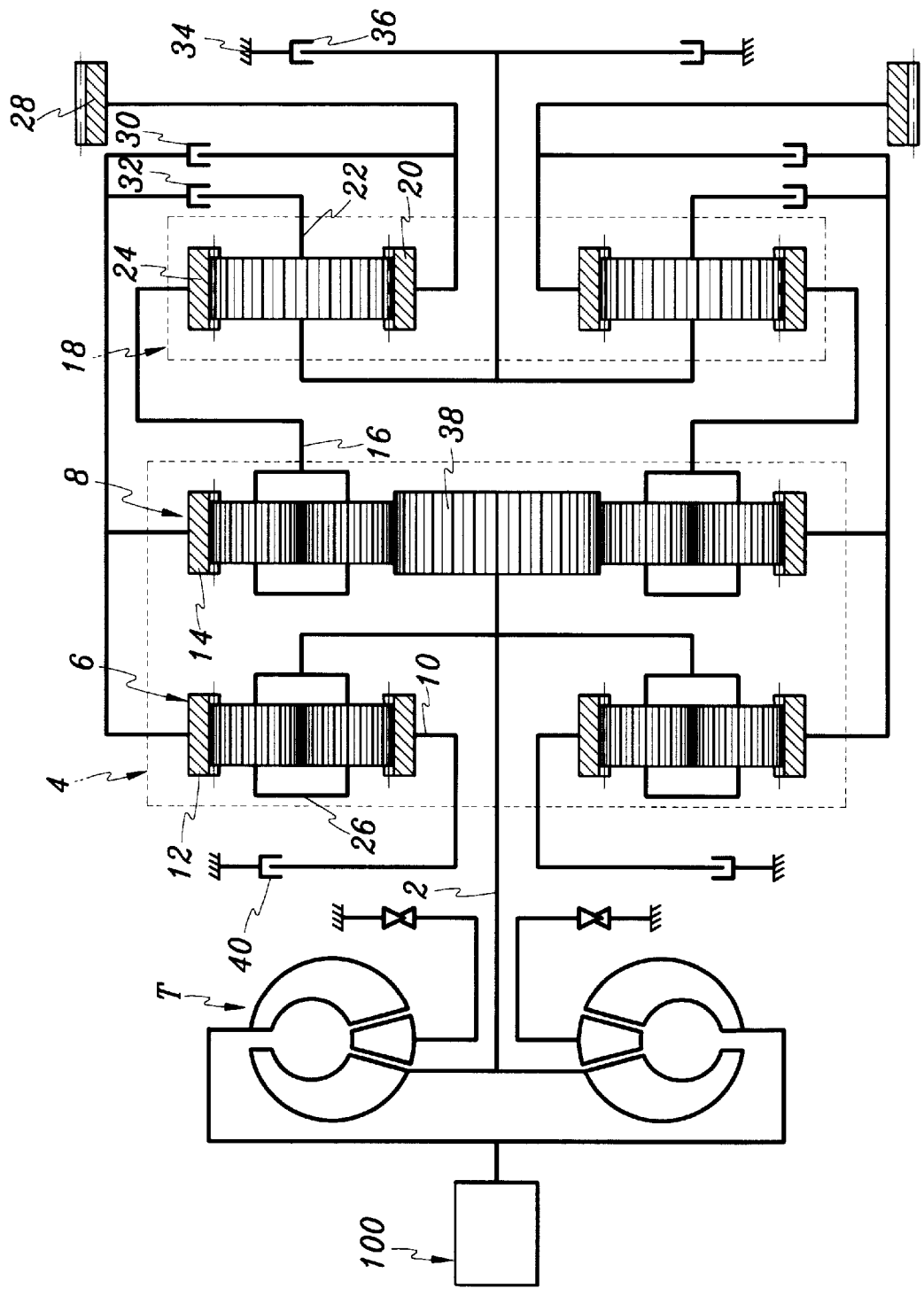
FIG. 11 is a schematic view of a powertrain according to sixth preferred embodiment of the present invention.

Referring to FIG. 11, shown is a schematic view of a powertrain according to a sixth preferred embodiment of the present invention. In the drawing, the first planetary gear unit 4 is formed by a combination of the first simple planetary gearset 6, which is a double pinion planetary gearset as in the first embodiment, with the second simple planetary gearset 8, which is a double pinion planetary gearset in this embodiment. Namely, the planet carrier 26 and ring gear 12 of the first and second simple planetary gearsets 6 and 8 are fixedly connected respectively to the sun gear 38 and ring gear 14 of the second simple planetary gearset 8.

Further, with regard to the combination of the first and second planetary gear units 4 and 18, the planet carrier 16 of the second simple planetary gearset 8 is fixedly connected to the ring gear 24 of the second planetary gear unit 18, and the ring gears 12 and 14 of the first and second simple planetary gearsets 6 and 8 are variably connected to both the sun gear 20 of the second planetary gear unit 18 through the first clutch 30, and the planet carrier 22 of the second planetary gear unit 18 through the second clutch 32.

Also, the first brake 36 is interposed between the planet carrier 22 of the second planetary gear unit 18 and the transmission housing 34, and the second brake 40 is interposed between the sun gear 10 of the first simple planetary gearset 6 and the transmission housing 34 such that the planet carrier 22 and sun gear 10 selectively act as reacting elements. In addition, the sun gear 20 of the second planetary gear unit 18 is integrally formed with the output gear 28 such that the sun gear 20 acts as an output element.

According to the above structure, operating elements for the first planetary gear unit 4 in the lever analogies of FIGS. 2–5 are as follows: the first operating element A indicates the planet carrier 26 of the first simple planetary gearset 6 and the sun gear 38 of the second simple planetary gearset 8, the second operating element B indicates the ring gears 12 and 14 of the first and second simple planetary gearsets 6 and 8, the third operating element C indicates the planet carrier 16 of the second simple planetary gearset 8, and the fourth operating element D indicates the sun gear 10 of the first simple planetary gearset 6.

The operating elements of the first planetary gear unit 4 are connected to the operating elements of the second planetary gear unit 18 identically as in the first embodiment. Namely, the third operating element C of the first planetary gear unit 4 is fixedly connected to the third operating element G of the second planetary gear unit 18, and the second operating element B of the first planetary gear unit 4 is variably connected to the first and second operating elements E and F of the second planetary gear unit 18.

In the sixth embodiment, only the structure of the first planetary gear unit 4 is changed from the first embodiment. As the operation of the operating elements in each shift range is identical to that of the first embodiment, an explanation thereof will be omitted herein.

Seventh Embodiment

Figure 12:
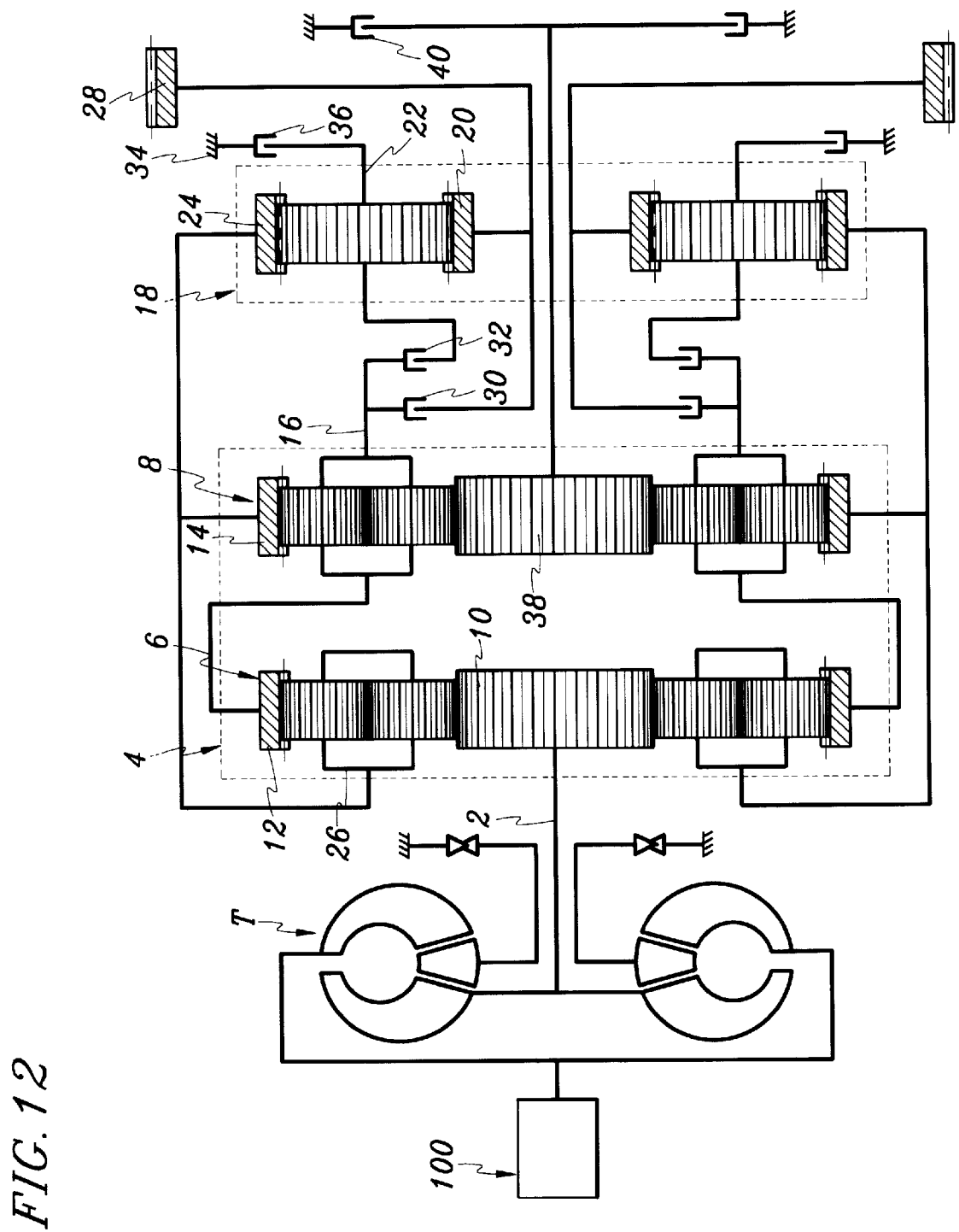
FIG. 12 is a schematic view of a powertrain according to a seventh preferred embodiment of the present invention.

Referring to FIG. 12, shown is a schematic view of a powertrain according to a seventh preferred embodiment of the present invention. In the drawing, the first planetary gear unit 4 is formed by a combination of the first simple planetary gearset 6, which is a double pinion planetary gearset as in the first embodiment, with the second simple planetary gearset 8, which is a double pinion planetary gearset in this embodiment. Namely, the planet carrier 26 and ring gear 12 of the first and second simple planetary gearsets 6 and 8 are fixedly connected respectively to the ring gear 14 and planet carrier 16 of the second simple planetary gearset 8.

Further, with regard to the combination of the first and second planetary gear units 4 and 18, the planet carrier 26 and ring gear 14 of the first and second simple planetary gearsets 6 and 8 is fixedly connected to the ring gear 24 of the second planetary gear unit 18, and both the ring gear 12 and planet carrier 16 of the first and second simple planetary gearsets 6 and 8 are variably connected to both the sun gear 20 of the second planetary gear unit 18 through the first clutch 30, and the planet carrier 22 of the second planetary gear unit 18 through the second clutch 32.

Also, the first brake 36 is interposed between the planet carrier 22 of the second planetary gear unit 18 and the transmission housing 34, and the second brake 40 is interposed between the sun gear 38 of the second simple planetary gearset 8 and the transmission housing 34 such that the planet carrier 22 and sun gear 38 selectively act as reacting elements. In addition, the sun gear 20 of the second planetary gear unit 18 is integrally formed with the output gear 28 such that the sun gear 20 acts as an output element.

According to the above structure, operating elements for the first planetary gear unit 4 in the lever analogies of FIGS. 2–5 are as follows: the first operating element A indicates the sun gear 10 of the first simple planetary gearset 6, the second operating element B indicates the ring gear 12 and planet carrier 16 of the first and second simple planetary gearsets 6 and 8, the third operating element C indicates the planet carrier 26 and ring gear 14 of the first and second simple planetary gearsets 6 and 8, and the fourth operating element D indicates the sun gear 38 of the second simple planetary gearset 8.

The operating elements of the first planetary gear unit 4 are connected to the operating elements of the second planetary gear unit 18 identically as in the first embodiment. Namely, the third operating element C of the first planetary gear unit 4 is fixedly connected to the third operating element G of the second planetary gear unit 18, and the second operating element B of the first planetary gear unit 4 is variably connected to the first and second operating elements E and F of the second planetary gear unit 18.

In the seventh embodiment, only the structure of the first planetary gear unit 4 is changed from the first embodiment.

As the operation of the operating elements in each shift range is identical to that of the first embodiment, an explanation thereof will be omitted herein.

Eighth Embodiment

Figure 13:
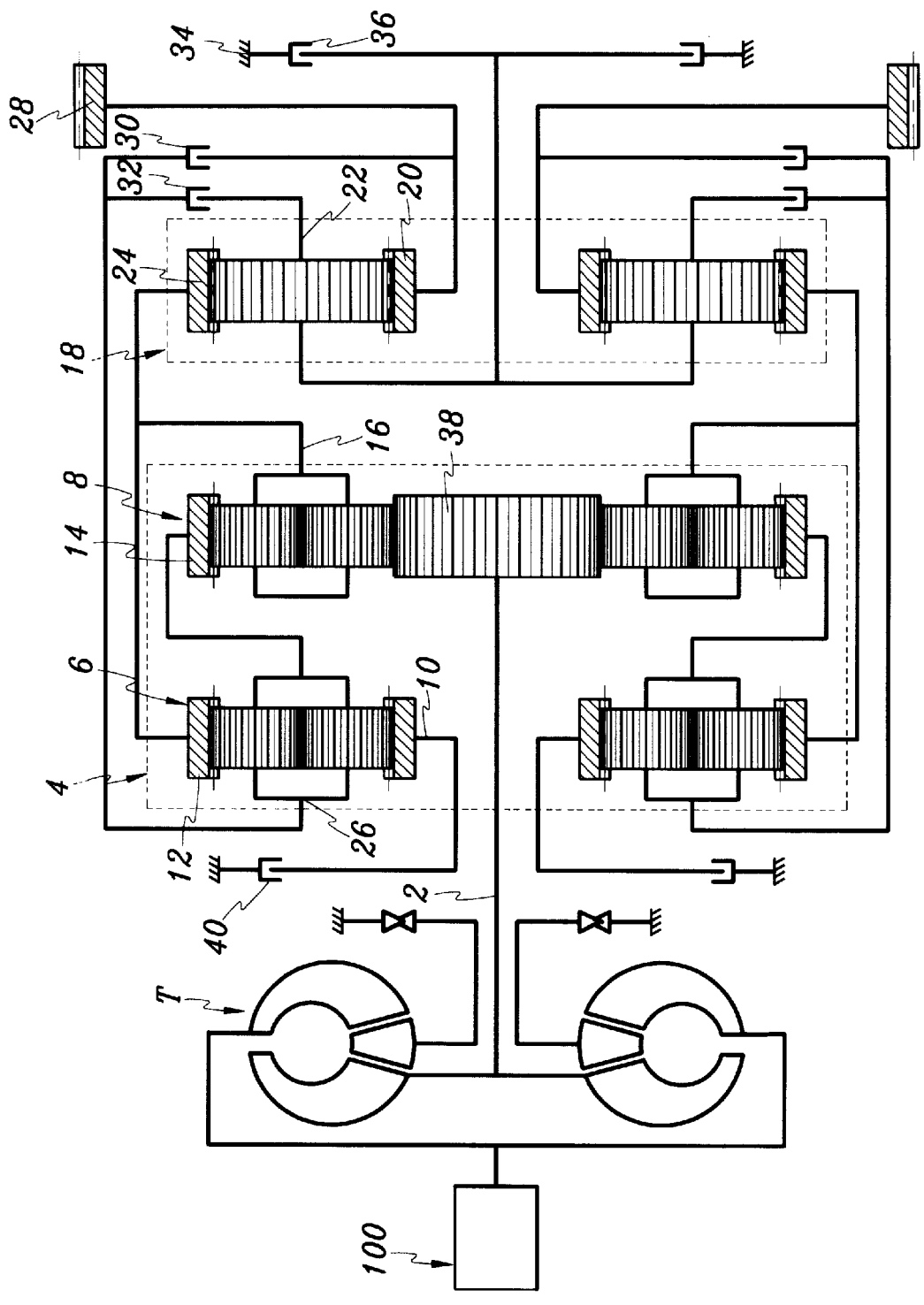
FIG. 13 is a schematic view of a powertrain according to a eighth preferred embodiment of the present invention.

Referring to FIG. 13, shown is a schematic view of a powertrain according to an eighth preferred embodiment of the present invention. In the drawing, the first planetary gear unit 4 is formed by a combination of the first simple planetary gearset 6, which is a double pinion planetary gearset as in the first embodiment, with the second simple planetary gearset 8, which is a double pinion planetary gearset in this embodiment. Namely, the planet carrier 26 and ring gear 12 of the first simple planetary gearset 6 are fixedly connected respectively to the ring gear 14 and planet carrier 16 of the second simple planetary gearset 8.

Further, with regard to the combination of the first and second planetary gear units 4 and 18, the ring gear 12 of the first simple planetary gearset 6 is fixedly connected to the ring gear 24 of the second planetary gear unit 18, and the planet carrier 26 of the first simple planetary gearset 6 is variably connected to both the sun gear 20 of the second planetary gear unit 18 through the first clutch 30, and the planet carrier 22 of the second planetary gear unit 18 through the second clutch 32.

Also, the first brake 36 is interposed between the planet carrier 22 of the second planetary gear unit 18 and the transmission housing 34, and the second brake 40 is interposed between the sun gear 10 of the first simple planetary gearset 6 and the transmission housing 34 such that the planet carrier 22 and sun gear 10 selectively act as reacting elements. In addition, the sun gear 20 of the second planetary gear unit 18 is integrally formed with the output gear 28 such that the sun gear 20 acts as an output element.

According to the above structure, operating elements for the first planetary gear unit 4 in the lever analogies of FIGS. 2–5 are as follows: the first operating element A indicates the sun gear 38 of the second simple planetary gearset 8, the second operating element B indicates the planet carrier 26 and ring gear 14 of the first and second simple planetary gearsets 6 and 8, the third operating element C indicates the ring gear 12 and planet carrier 16 of the first and second simple planetary gearsets 6 and 8, and the fourth operating element D indicates the sun gear 10 of the first simple planetary gearset 6.

The operating elements of the first planetary gear unit 4 are connected to the operating elements of the second planetary gear unit 18 identically as in the first embodiment. Namely, the third operating element C of the first planetary gear unit 4 is fixedly connected to the third operating element G of the second planetary gear unit 18, and the second operating element B of the first planetary gear unit 4 is variably connected to the first and second operating elements E and F of the second planetary gear unit 18.

In the eighth embodiment, only the structure of the first planetary gear unit 4 is changed from the first embodiment. As the operation of the operating elements in each shift range is identical to that of the first embodiment, an explanation thereof will be omitted herein.

Ninth Embodiment

Figure 14:
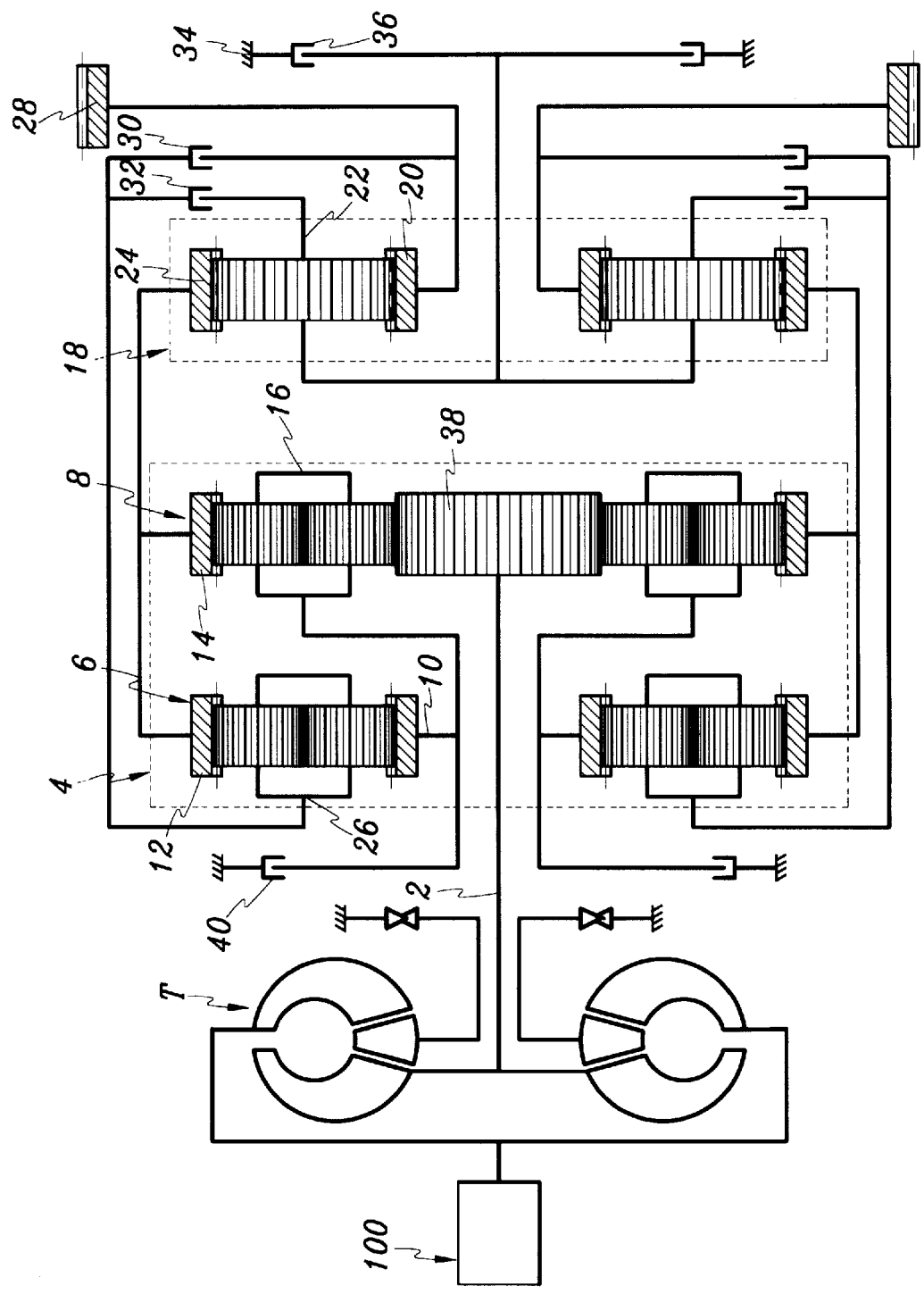
FIG. 14 is a schematic view of a powertrain according to a ninth preferred embodiment of the present invention.

Referring to FIG. 14, shown is a schematic view of a powertrain according to a ninth preferred embodiment of the present invention. In the drawing, the first planetary gear unit 4 is formed by a combination of the first simple planetary gearset 6, which is a double pinion planetary gearset as in the first embodiment, with the second simple planetary gearset 8, which is a double pinion planetary gearset in this embodiment. Namely, the sun gear 10 and ring gear 12 of the first simple planetary gearset 6 are fixedly connected respectively to the planet carrier 16 and ring gear 14 of the second simple planetary gearset 8.

Further, with regard to the combination of the first and second planetary gear units 4 and 18, the ring gear 14 of the second simple planetary gearset 8 is fixedly connected to the ring gear 24 of the second planetary gear unit 18, and the planet carrier 26 of the first simple planetary gearset 6 is variably connected to both the sun gear 20 of the second planetary gear unit 18 through the first clutch 30, and the planet carrier 22 of the second planetary gear unit 18 through the second clutch 32.

Also, the first brake 36 is interposed between the planet carrier 22 of the second planetary gear unit 18 and the transmission housing 34, and the second brake 40 is interposed between the sun gear 10 of the first simple planetary gearset 6 and the transmission housing 34 such that the planet carrier 22 and sun gear 10 selectively act as reacting elements. In addition, the sun gear 20 of the second planetary gear unit 18 is integrally formed with the output gear 28 such that the sun gear 20 acts as an output element.

According to the above structure, operating elements for the first planetary gear unit 4 in the lever analogies of FIGS. 2–5 are as follows: the first operating element A indicates the sun gear 38 of the second simple planetary gearset 8, the second operating element B indicates the planet carrier 26 of the first simple planetary gearset 6, the third operating element C indicates the ring gear 12 and planet carrier 14 of the first and second simple planetary gearsets 6 and 8, and the fourth operating element D indicates the sun gear 10 and ring gear 14 of the first and second simple planetary gearsets 6 and 8.

The operating elements of the first planetary gear unit 4 are connected to the operating elements of the second planetary gear unit 18 identically as in the first embodiment. Namely, the third operating element C of the first planetary gear unit 4 is fixedly connected to the third operating element G of the second planetary gear unit 18, and the second operating element B of the first planetary gear unit 4 is variably connected to the first and second operating elements E and F of the second planetary gear unit 18.

In the ninth embodiment, only the structure of the first planetary gear unit 4 is changed from the first embodiment. As the operation of the operating elements in each shift range is identical to that of the first embodiment, an explanation thereof will be omitted herein.

Tenth Embodiment

Figure 15:
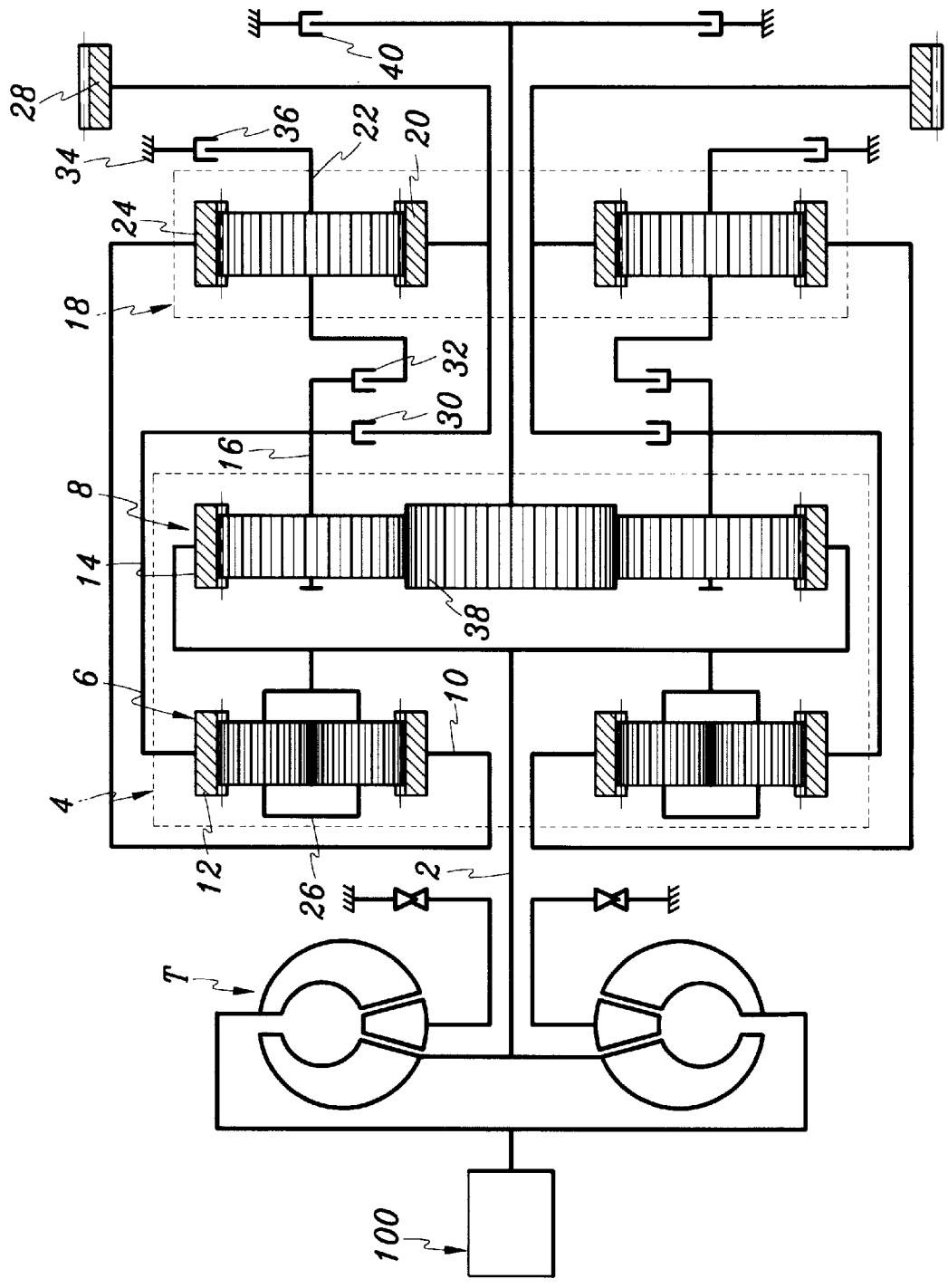
FIG. 15 is a schematic view of a powertrain according to a tenth preferred embodiment of the present invention.

Referring to FIG. 15, shown is a schematic view of a powertrain according to a tenth preferred embodiment of the present invention.

In the drawing, the first planetary gear unit 4 is formed by a combination of the first simple planetary gearset 6 with the second second simple planetary gearset 8, the first and second simple planetary gearsets 6 and 8 being respectively double and single pinion planetary gearsets as in the first embodiment. Namely, the planet carrier 26 and ring gear 12 of the first simple planetary gearset 6 are fixedly connected respectively to the ring gear 14 and planet carrier 16 of the second simple planetary gearset 8.

Further, with regard to the combination of the first and second planetary gear units 4 and 18, the sun gear 10 of the first simple planetary gearset 6 is fixedly is connected to the ring gear 24 of the second planetary gear unit 18, and the planet carrier 16 of the second simple planetary gearset 8 is variably connected to both the sun gear 20 of the second planetary gear unit 18 through the first clutch 30, and the planet carrier 22 of the second planetary gear unit 18 through the second clutch 32.

Also, the first brake 36 is interposed between the planet carrier 22 of the second planetary gear unit 18 and the transmission housing 34, and the second brake 40 is interposed between the sun gear 38 of the second simple planetary gearset 8 and the transmission housing 34 such that the planet carrier 22 and sun gear 38 selectively act as reacting elements. In addition, the sun gear 20 of the second planetary gear unit 18 is integrally formed with the output gear 28 such that the sun gear 20 acts as an output element.

According to the above structure, operating elements for the first planetary gear unit 4 in the lever analogies of FIGS. 2–5 are as follows: the first operating element A indicates the planet carrier 26 and ring gear 14 of the first and second simple planetary gearsets 6 and 8, the second operating element B indicates the ring gear 12 and planet carrier 16 of the first and second simple planetary gearsets 6 and 8, the third operating element C indicates the sun gear 10 of the first simple planetary gearset 6, and the fourth operating element D indicates the sun gear 38 of the second simple planetary gearset 8.

The operating elements of the first planetary gear unit 4 are connected to the operating elements of the second planetary gear unit 18 identically as in the first embodiment. Namely, the third operating element C of the first planetary gear unit 4 is fixedly connected to the third operating element G of the second planetary gear unit 18, and the second operating element B of the first planetary gear unit 4 is variably connected to the first and second operating elements E and F of the second planetary gear unit 18.

In the tenth embodiment, only the structure of the first planetary gear unit 4 is changed from the first embodiment. As the operation of the operating elements in each shift range is identical to that of the first embodiment, an explanation thereof will be omitted herein.

Eleventh Embodiment

Figure 16:
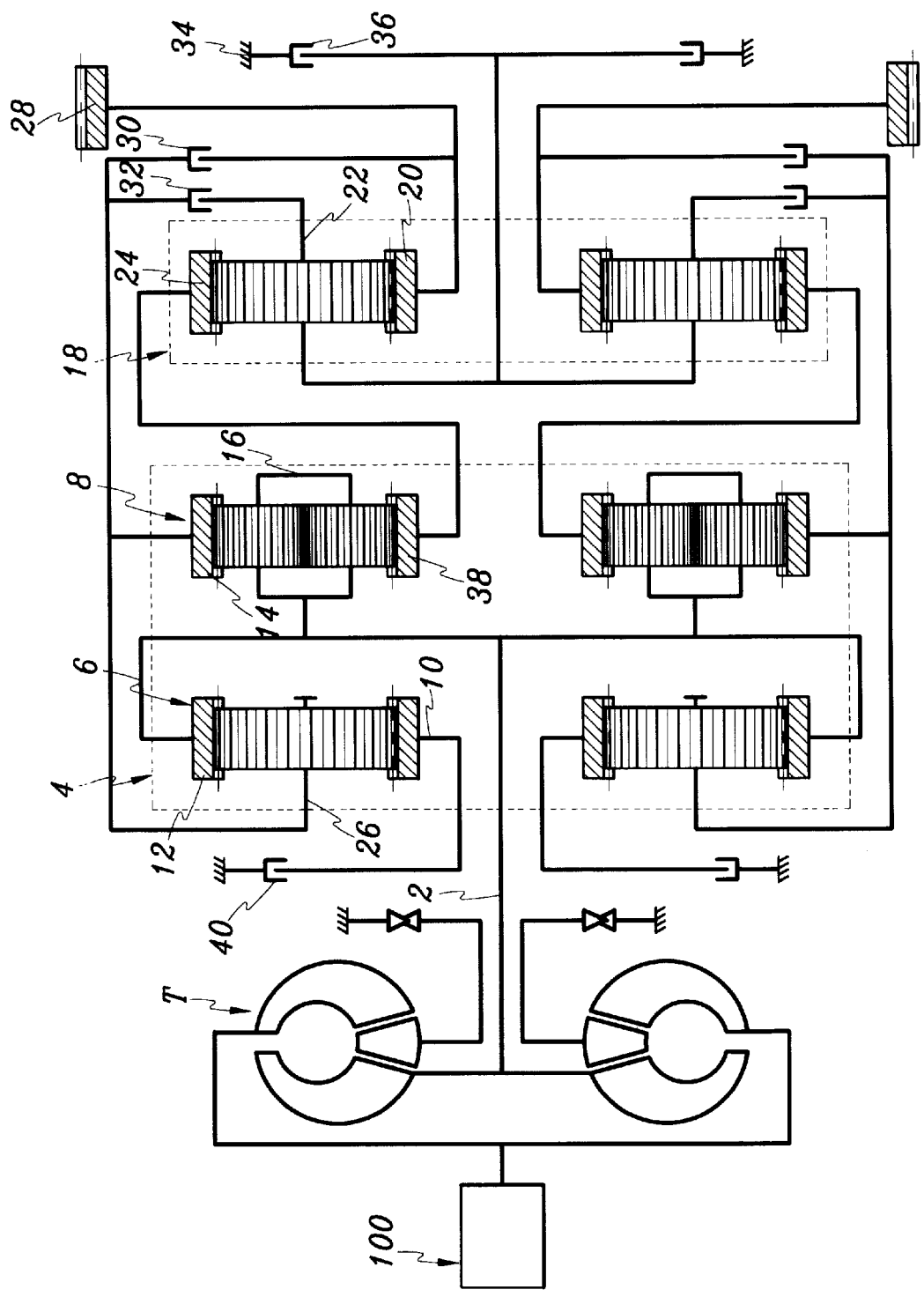
FIG. 16 is a schematic view of a powertrain according to a eleventh preferred embodiment of the present invention.

Referring to FIG. 16, shown is a schematic view of a powertrain according to an eleventh preferred embodiment of the present invention. In the drawing, the first planetary gear unit 4 is formed by a combination of the first simple planetary gearset 6, which is a single pinion planetary gearset in this embodiment, with the second simple planetary gearset 8, which is a double pinion planetary gearset in this embodiment. Namely, the planet carrier 26 and ring gear 12 of the first simple planetary gearset 6 are fixedly connected respectively to the ring gear 14 and planet carrier 16 of the second simple planetary gearset 8.

Further, with regard to the combination of the first and second planetary gear units 4 and 18, the sun gear 38 of the second simple planetary gearset 8 is fixedly connected to the ring gear 24 of the second planetary gear unit 18, and both the planet carrier 26 and ring gear 14 of the first and second simple planetary gearsets 6 and 8 are variably connected to the sun gear 20 of the second planetary gear unit 18 through the first clutch 30, and the planet carrier 22 of the second planetary gear unit 18 through the second clutch 32.

Also, the first brake 36 is interposed between the planet carrier 22 of the second planetary gear unit 18 and the transmission housing 34, and the second brake 40 is interposed between the sun gear 10 of the first simple planetary gearset 6 and the transmission housing 34 such that the planet carrier 22 and sun gear 10 selectively act as reacting elements. In addition, the sun gear 20 of the second planetary gear unit 18 is integrally formed with the output gear 28 such that the sun gear 20 acts as an output element.

According to the above structure, operating elements for the first planetary gear unit 4 in the lever analogies of FIGS. 2–5 are as follows: the first operating element A indicates the ring gear 12 and planet carrier 16 of the first and second simple planetary gearsets 6 and 8, the second operating element B indicates the planet carrier 26 and ring gear 14 of the first and second simple planetary gearsets 6 and 8, the third operating element C indicates the sun gear 38 of the second simple planetary gearset 8, and the fourth operating element D indicates the sun gear 10 of the first simple planetary gearset 6.

The operating elements of the first planetary gear unit 4 are connected to the operating elements of the second planetary gear unit 18 identically as in the first embodiment. Namely, the third operating element C of the first planetary gear unit 4 is fixedly connected to the third operating element G of the second planetary gear unit 18, and the second operating element B of the first planetary gear unit 4 is variably connected to the first and second operating elements E and F of the second planetary gear unit 18.

In the eleventh embodiment, only the structure of the first planetary gear unit 4 is changed from the first embodiment. As the operation of the operating elements in each shift range is identical to that of the first embodiment, an explanation thereof will be omitted herein.

Twelfth Embodiment

Figure 17:
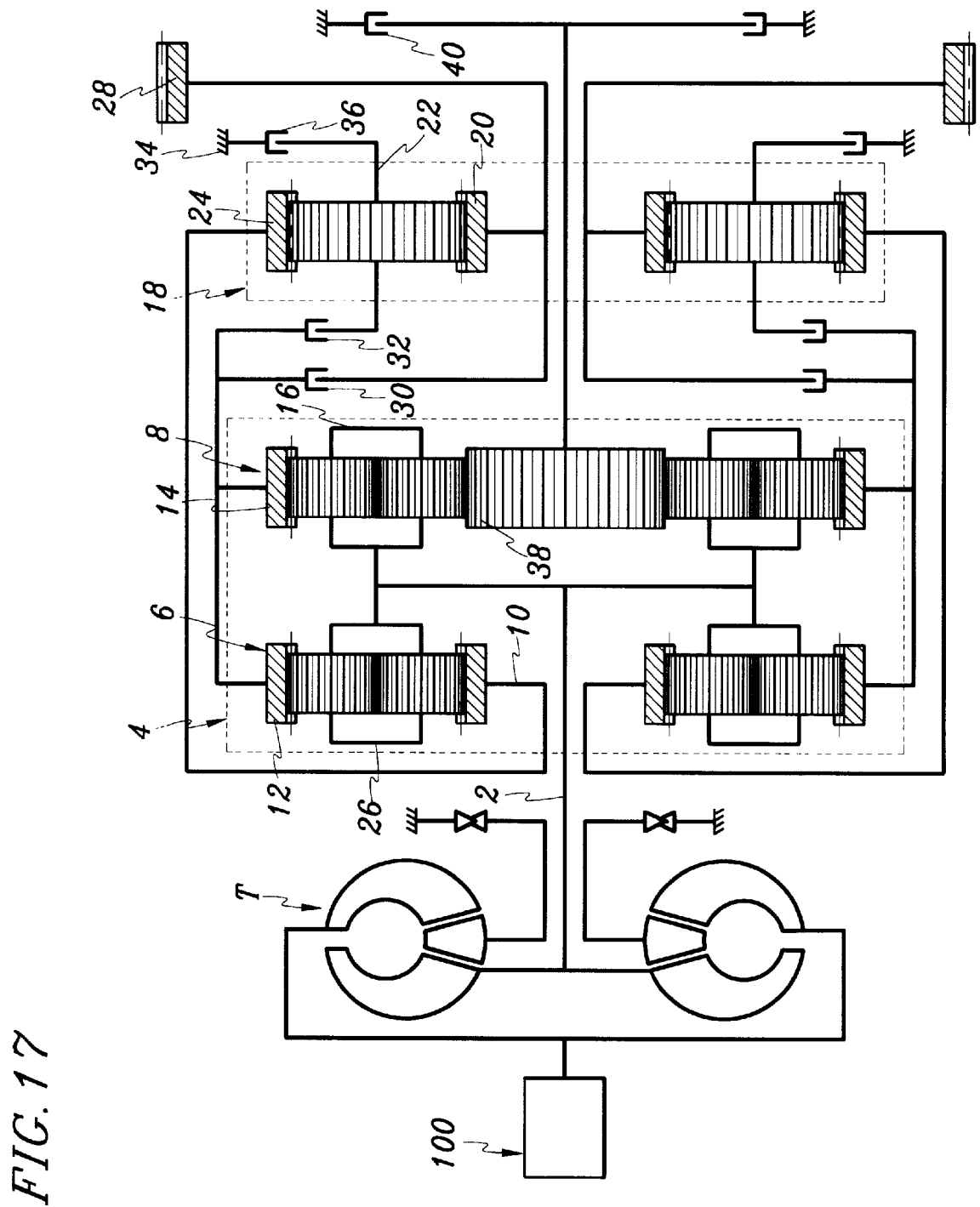
FIG. 17 is a schematic view of a powertrain according to a twelfth preferred embodiment of the present invention.

Referring to FIG. 17, shown is a schematic view of a powertrain according to a twelfth preferred embodiment of the present invention. In the drawing, the first planetary gear unit 4 is formed by a combination of the first simple planetary gearset 6, which is a double pinion planetary gearset as in the first embodiment, with the second simple planetary gearset 8, which is a double pinion planetary gearset in this embodiment. Namely, the planet carrier 26 and ring gear 12 of the first simple planetary gearset 6 are fixedly connected respectively to the planet carrier 16 and ring gear 14 of the second simple planetary gearset 8.

Further, with regard to the combination of the first and second planetary gear units 4 and 18, the sun gear 10 of the first simple planetary gearset 6 is fixedly connected to the ring gear 24 of the second planetary gear unit 18, and both the ring gears 12 and 14 of the first and second simple planetary gearsets 6 and 8 are variably connected to the sun gear 20 of the second planetary gear unit 18 through the first clutch 30, and the planet carrier 22 of the second planetary gear unit 18 through the second clutch 32.

Also, the first brake 36 is interposed between the planet carrier 22 of the second planetary gear unit 18 and the transmission housing 34, and the second brake 40 is interposed between the sun gear 38 of the second simple planetary gearset 8 and the transmission housing 34 such that the planet carrier 22 and sun gear 38 selectively act as reacting elements. In addition, the sun gear 20 of the second planetary gear unit 18 is integrally formed with the output gear 28 such that the sun gear 20 acts as an output element.

According to the above structure, operating elements for the first planetary gear unit 4 in the lever analogies of FIGS. 2–5 are as follows: the first operating element A indicates the planet carriers 26 and 16 of the first and second simple planetary gearsets 6 and 8, the second operating element B indicates the ring gears 12 and 14 of the first and second simple planetary gearsets 6 and 8, the third operating element C indicates the sun gear 10 of the first simple planetary gearset 6, and the fourth operating element D indicates the sun gear 38 of the second simple planetary gearset 8.

The operating elements of the first planetary gear unit 4 are connected to the operating elements of the second planetary gear unit 18 identically as in the first embodiment. Namely, the third operating element C of the first planetary gear unit 4 is fixedly connected to the third operating element G of the second planetary gear unit 18, and the second operating element B of the first planetary gear unit 4 is variably connected to the first and second operating elements E and F of the second planetary gear unit 18.

In the twelfth embodiment, only the structure of the first planetary gear unit 4 is changed from the first embodiment. As the operation of the operating elements in each shift range is identical to that of the first embodiment, an explanation thereof will be omitted herein.

Thirteenth Embodiment

Figure 18:
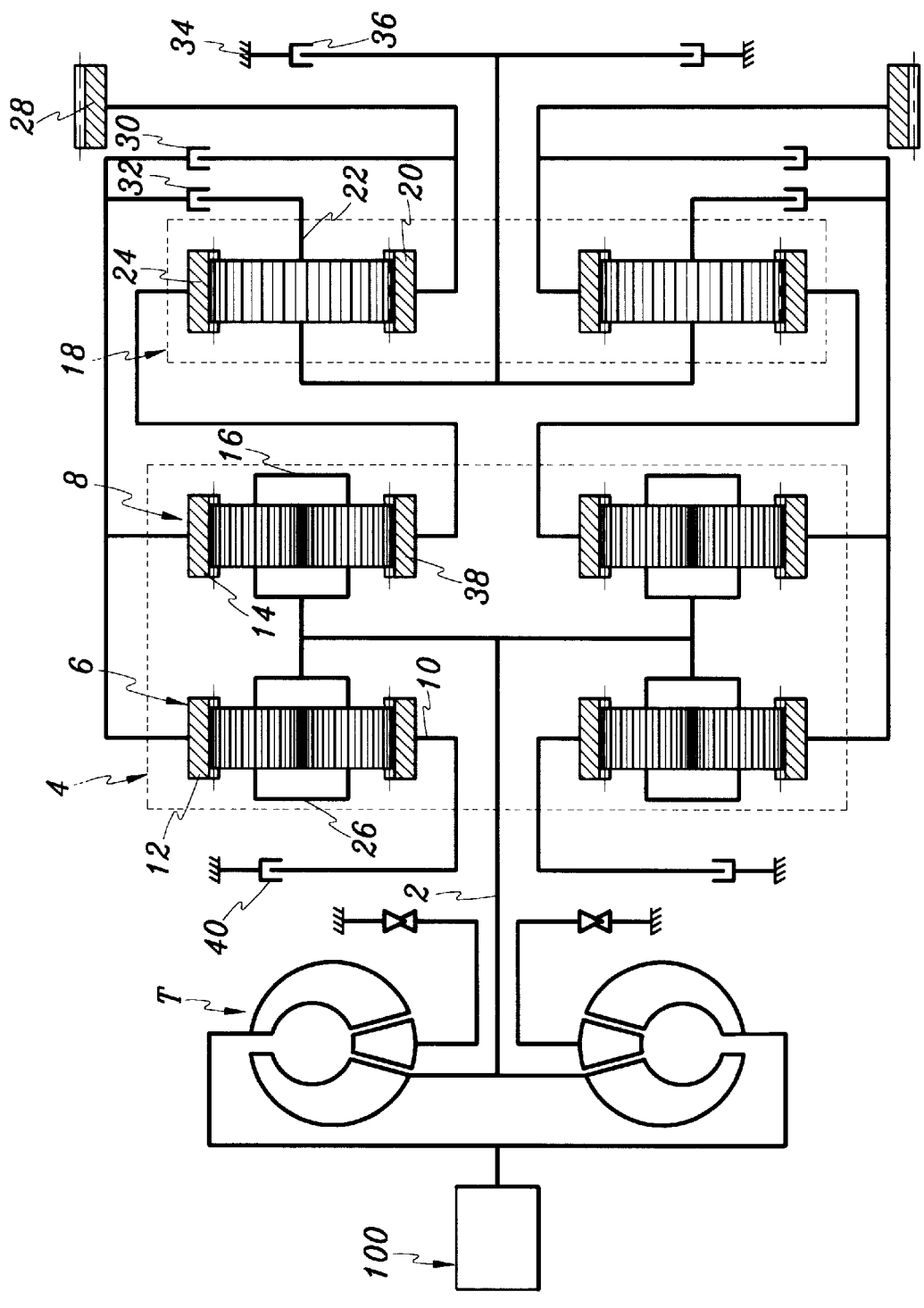
FIG. 18 is a schematic view of a powertrain according to a thirteenth preferred embodiment of the present invention.

Referring to FIG. 18, shown is a schematic view of a powertrain according to a thirteenth preferred embodiment of the present invention. In the drawing, the first planetary gear unit 4 is formed by a combination of the first simple planetary gearset 6, which is a double pinion planetary gearset as in the first embodiment, with the second simple planetary gearset 8, which is a double pinion planetary gearset in this embodiment. Namely, the planet carrier 26 and ring gear 12 of the first simple planetary gearset 6 are fixedly connected respectively to the planet carrier 16 and ring gear 14 of the second simple planetary gearset 8.

Further, with regard to the combination of the first and second planetary gear units 4 and 18, the sun gear 38 of the second simple planetary gearset 8 is fixedly connected to the ring gear 24 of the second planetary gear unit 18, and both the ring gears 12 and 14 of the first and second simple planetary gearsets 6 and 8 are variably connected to the sun gear 20 of the second planetary gear unit 18 through the first clutch 30, and the planet carrier 22 of the second planetary gear unit 18 through the second clutch 32.

Also, the first brake 36 is interposed between the planet carrier 22 of the second planetary gear unit 18 and the transmission housing 34, and the second brake 40 is interposed between the sun gear 10 of the first simple planetary gearset 6 and the transmission housing 34 such that the planet carrier 22 and sun gear 10 selectively act as reacting elements. In addition, the sun gear 20 of the second planetary gear unit 18 is integrally formed with the output gear 28 such that the sun gear 20 acts as an output element.

According to the above structure, operating elements for the first planetary gear unit 4 in the lever analogies of FIGS. 2–5 are as follows: the first operating element A indicates the planet carriers 26 and 16 of the first and second simple planetary gearsets 6 and 8, the second operating element B indicates the ring gears 12 and 14 of the first and second simple planetary gearsets 6 and 8, the third operating element C indicates the sun gear 38 of the second simple planetary gearset 8, and the fourth operating element D indicates the sun gear 10 of the second simple planetary gearset 8.

The operating elements of the first planetary gear unit 4 are connected to the operating elements of the second planetary gear unit 18 identically as in the first embodiment. Namely, the third operating element C of the first planetary gear unit 4 is fixedly connected to the third operating element G of the second planetary gear unit 18, and the second operating element B of the first planetary gear unit 4 is variably connected to the first and second operating elements E and F of the second planetary gear unit 18.

In the thirteenth embodiment, only the structure of the first planetary gear unit 4 is changed from the first embodiment. As the operation of the operating elements in each shift range is identical to that of the first embodiment, an explanation thereof will be omitted herein.

Fourteenth Embodiment

Figure 19:
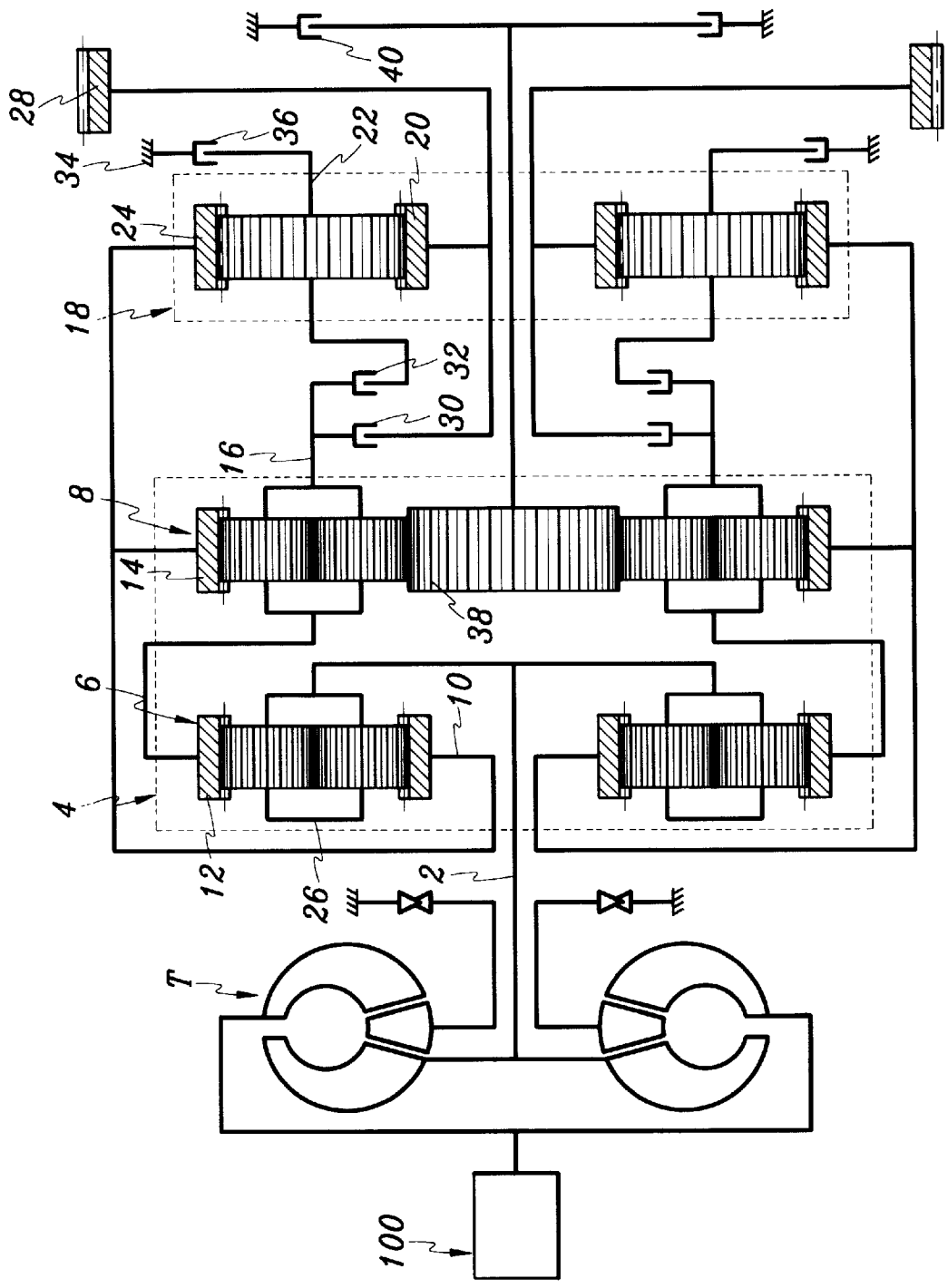
FIG. 19 is a schematic view of a powertrain according to a fourteenth preferred embodiment of the present invention.

Referring to FIG. 19, shown is a schematic view of a powertrain according to a fourteenth preferred embodiment of the present invention. In the drawing, the first planetary gear unit 4 is formed by a combination of the first simple planetary gearset 6, which is a double pinion planetary gearset as in the first embodiment, with the second simple planetary gearset 8, which is a double pinion planetary gearset in this embodiment. Namely, the sun gear 10 and ring gear 12 of the first simple planetary gearset 6 are fixedly connected respectively to the ring gear 14 and planet carrier 16 of the second simple planetary gearset 8.

Further, with regard to the combination of the first and second planetary gear units 4 and 18, the sun gear 10 and ring gear 14 of the first and second simple planetary gearsets 6 and 8 are fixedly connected to the ring gear 24 of the second planetary gear unit 18, and both the ring gear 12 and planet carrier 16 of the first and second simple planetary gearsets 6 and 8 are variably connected to the sun gear 20 of the second planetary gear unit 18 through the first clutch 30, and the planet carrier 22 of the second planetary gear unit 18 through the second clutch 32.

Also, the first brake 36 is interposed between the planet carrier 22 of the second planetary gear unit 18 and the transmission housing 34, and the second brake 40 is interposed between the sun gear 38 of the second simple planetary gearset 8 and the transmission housing 34 such that the planet carrier 22 and sun gear 38 selectively act as reacting elements. In addition, the sun gear 20 of the second planetary gear unit 18 is integrally formed with the output gear 28 such that the sun gear 20 acts as an output element.

According to the above structure, operating elements for the first planetary gear unit 4 in the lever analogies of FIGS. 2–5 are as follows: the first operating element A indicates the planet carrier 26 of the first simple planetary gearset 6, the second operating element B indicates the ring gear 12 and planet carrier 16 of the first and second simple planetary gearsets 6 and 8, the third operating element C indicates the sun gear 10 and ring gear 14 of the first and second simple planetary gearsets 6 and 8, and the fourth operating element D indicates the sun gear 38 of the second simple planetary gearset 8.

The operating elements of the first planetary gear unit 4 are connected to the operating elements of the second planetary gear unit 18 identically as in the first embodiment. Namely, the third operating element C of the first planetary gear unit 4 is fixedly connected to the third operating element G of the second planetary gear unit 18, and the second operating element B of the first planetary gear unit 4 is variably connected to the first and second operating elements E and F of the second planetary gear unit 18.

In the fourteenth embodiment, only the structure of the first planetary gear unit 4 is changed from the first embodiment. As the operation of the operating elements in each shift range is identical to that of the first embodiment, an explanation thereof will be omitted herein.

Fifteenth Embodiment

Figure 20:
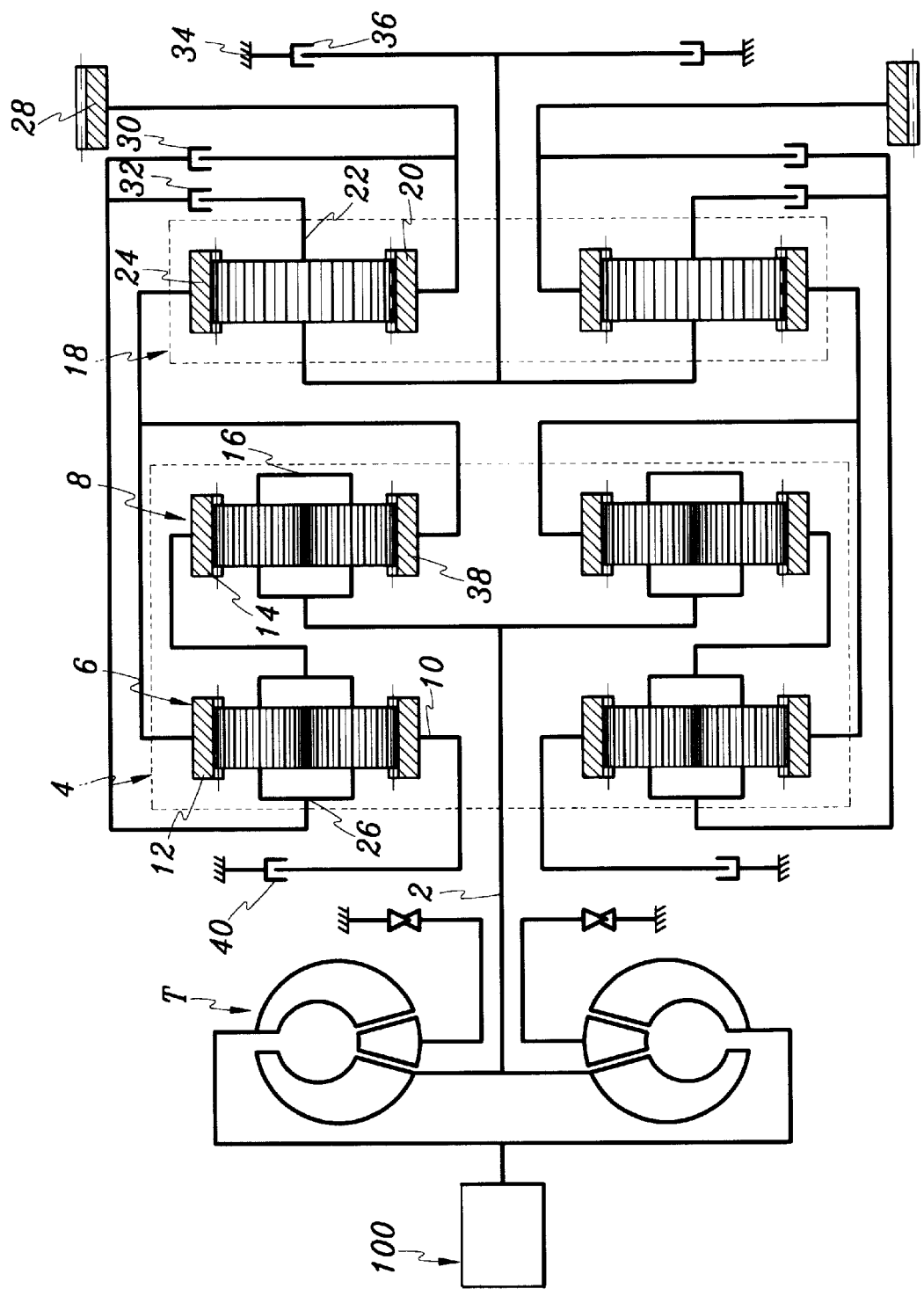
FIG. 20 is a schematic view of a powertrain according to a fifteenth preferred embodiment of the present invention.

Referring to FIG. 20, shown is a schematic view of a powertrain according to a fifteenth preferred embodiment of the present invention. In the drawing, the first planetary gear unit 4 is formed by a combination of the first simple planetary gearset 6, which is a double pinion planetary gearset as in the first embodiment, with the second simple planetary gearset 8, which is a double pinion planetary gearset in this embodiment. Namely, the planet carrier 26 and ring gear 12 of the first simple planetary gearset 6 are fixedly connected respectively to the ring gear 14 and sun gear 38 of the second simple planetary gearset 8.

Further, with regard to the combination of the first and second planetary gear units 4 and 18, the sun gear 38 of the second simple planetary gearset 8 is fixedly connected to the ring gear 24 of the second planetary gear unit 18, and the planet carrier 26 of the first simple planetary gearset 6 is variably connected to both the sun gear 20 of the second planetary gear unit 18 through the first clutch 30, and to the planet carrier 22 of the second planetary gear unit 18 through the second clutch 32.

Also, the first brake 36 is interposed between the planet carrier 22 of the second planetary gear unit 18 and the transmission housing 34, and the second brake 40 is interposed between the sun gear 10 of the first simple planetary gearset 6 and the transmission housing 34 such that the planet carrier 22 and sun gear 10 selectively act as reacting elements. In addition, the sun gear 20 of the second planetary gear unit 18 is integrally formed with the output gear 28 such that the sun gear 20 acts as an output element.

According to the above structure, operating elements for the first planetary gear unit 4 in the lever analogies of FIGS. 2–5 are as follows: the first operating element A indicates the planet carrier 16 of the second simple planetary gearset 8, the second operating element B indicates the planet carrier 26 and ring gear 14 of the first and second simple planetary gearsets 6 and 8, the third operating element C indicates the ring gear 12 and sun gear 38 of the first and second simple planetary gearsets 6 and 8, and the fourth operating element D indicates the sun gear 10 of the first simple planetary gearset 6.

The operating elements of the first planetary gear unit 4 are connected to the operating elements of the second planetary gear unit 18 identically as in the first embodiment. Namely, the third operating element C of the first planetary gear unit 4 is fixedly connected to the third operating element G of the second planetary gear unit 18, and the second operating element B of the first planetary gear unit 4 is variably connected to the first and second operating elements E and F of the second planetary gear unit 18.

In the fifteenth embodiment, only the structure of the first planetary gear unit 4 is changed from the first embodiment. As the operation of the operating elements in each shift range is identical to that of the first embodiment, an explanation thereof will be omitted herein.

Sixteenth Embodiment

Figure 21:
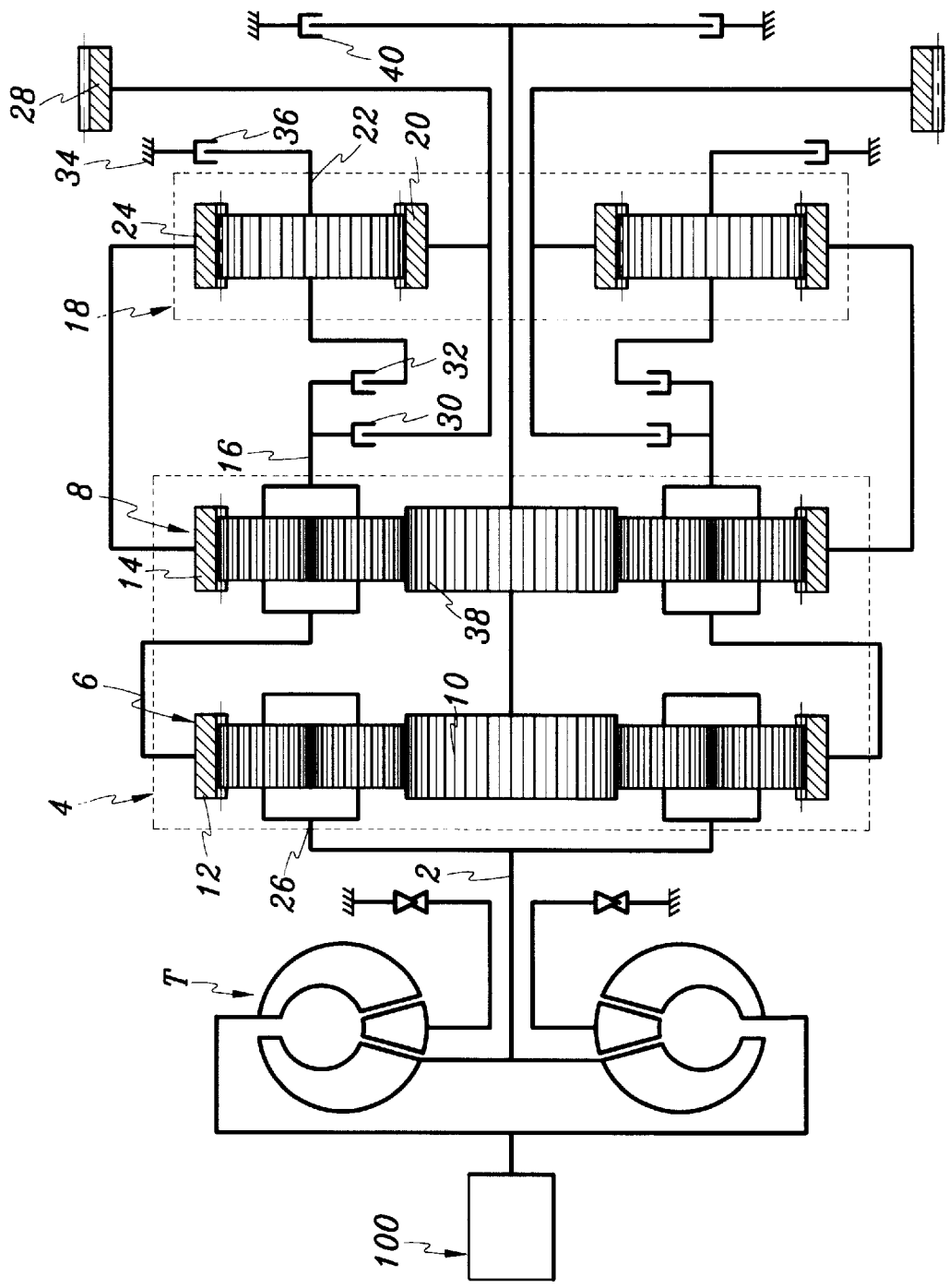
FIG. 21 is a schematic view of a powertrain according to a sixteenth preferred embodiment of the present invention.

Referring to FIG. 21, shown is a schematic view of a powertrain according to a sixteenth preferred embodiment of the present invention. In the drawing, the first planetary gear unit 4 is formed by a combination of the first simple planetary gearset 6, which is a double pinion planetary gearset as in the first embodiment, with the second simple planetary gearset 8, which is a double pinion planetary gearset in this embodiment. Namely, the sun gear 10 and ring gear 12 of the first simple planetary gearset 6 are fixedly connected respectively to the sun gear 38 and planet carrier 16 of the second simple planetary gearset 8.

Further, with regard to the combination of the first and second planetary gear units 4 and 18, the ring gear 14 of the second simple planetary gearset 8 is fixedly connected to the ring gear 24 of the second planetary gear unit 18, and the planet carrier 16 of the second simple planetary gearset 8 is variably connected to both the sun gear 20 of the second planetary gear unit 18 through the first clutch 30, and to the planet carrier 22 of the second planetary gear unit 18 through the second clutch 32.

Also, the first brake 36 is interposed between the planet carrier 22 of the second planetary gear unit 18 and the transmission housing 34, and the second brake 40 is interposed between the sun gears 10 and 38 of the first and second simple planetary gearsets 6 and 8 and the transmission housing 34 such that the planet carrier 22 and sun gears 10 and 38 selectively act as reacting elements. In addition, the sun gear 20 of the second planetary gear unit 18 is integrally formed with the output gear 28 such that the sun gear 20 acts as an output element.

According to the above structure, operating elements for the first planetary gear unit 4 in the lever analogies of FIGS. 2–5 are as follows: the first operating element A indicates the planet carrier 26 of the first simple planetary gearset 6, the second operating element B indicates the ring gear 12 and planet carrier 16 of the first and second simple planetary gearsets 6 and 8, the third operating element C indicates the ring gear 14 of the second simple planetary gearset 8, and the fourth operating element D indicates the sun gears 10 and 38 of the first and second simple planetary gearsets 6 and 8.

The operating elements of the first planetary gear unit 4 are connected to the operating elements of the second planetary gear unit 18 identically as in the first embodiment. Namely, the third operating element C of the first planetary gear unit 4 is fixedly connected to the third operating element G of the second planetary gear unit 18, and the second operating element B of the first planetary gear unit 4 is variably connected to the first and second operating elements E and F of the second planetary gear unit 18.

In the sixteenth embodiment, only the structure of the first planetary gear unit 4 is changed from the first embodiment. As the operation of the operating elements in each shift range is identical to that of the first embodiment, an explanation thereof will be omitted herein.

Seventeenth Embodiment

Figure 22:
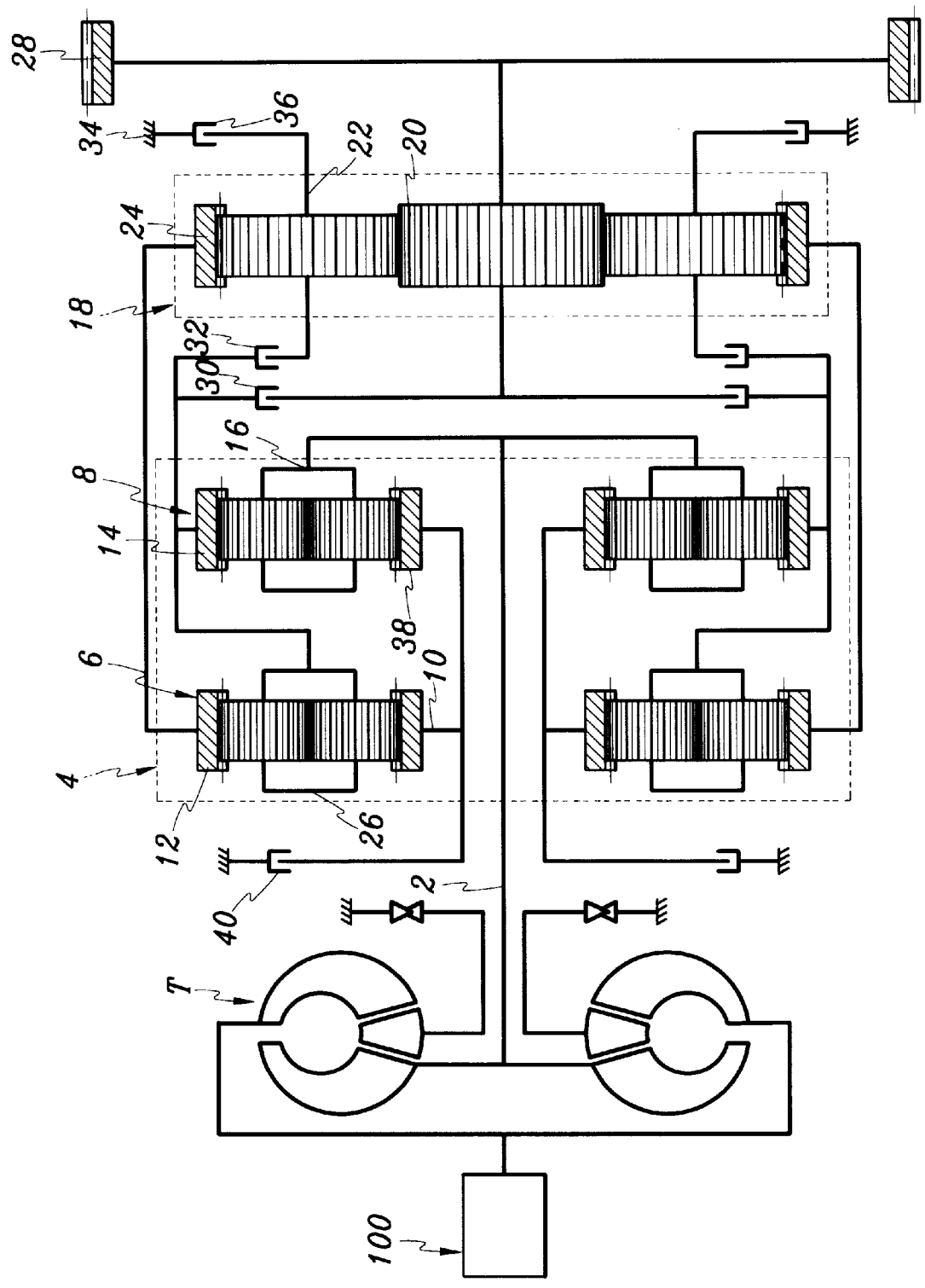
FIG. 22 is a schematic view of a powertrain according to a seventeenth preferred embodiment of the present invention.

Referring to FIG. 22, shown is a schematic view of a powertrain according to a seventeenth preferred embodiment of the present invention. In the drawing, the first planetary gear unit 4 is formed by a combination of the first simple planetary gearset 6, which is a double pinion planetary gearset as in the first embodiment, with the second simple planetary gearset 8, which is a double pinion planetary gearset in this embodiment. Namely, the sun gear 10 and planet carrier 26 of the first simple planetary gearset 6 are fixedly connected respectively to the sun gear 38 and ring gear 14 of the second simple planetary gearset 8.

Further, with regard to the combination of the first and second planetary gear units 4 and 18, the ring gear 12 of the first simple planetary gearset 6 is fixedly connected to the ring gear 24 of the second planetary gear unit 18, and the ring gear 14 of the second simple planetary gearset 8 is variably connected to both the sun gear 20 of the second planetary gear unit 18 through the first clutch 30, and to the planet carrier 22 of the second planetary gear unit 18 through the second clutch 32.

Also, the first brake 36 is interposed between the planet carrier 22 of the second planetary gear unit 18 and the transmission housing 34, and the second brake 40 is interposed between the sun gears 10 and 38 of the first and second simple planetary gearsets 6 and 8 and the transmission housing 34 such that the planet carrier 22 and sun gears 10 and 38 selectively act as reacting elements. In addition, the sun gear 20 of the second planetary gear unit 18 is integrally formed with the output gear 28 such that the sun gear 20 acts as an output element.

According to the above structure, operating elements for the first planetary gear unit 4 in the lever analogies of FIGS.

2–5 are as follows: the first operating element A indicates the planet carrier 16 of the second simple planetary gearset 8, the second operating element B indicates the planet carrier 26 and ring gear 14 of the first and second simple planetary gearsets 6 and 8, the third operating element C indicates the ring gear 12 of the first simple planetary gearset 6, and the fourth operating element D indicates the sun gears 10 and 38 of the first and second simple planetary gearsets 6 and 8.

The operating elements of the first planetary gear unit 4 are connected to the operating elements of the second planetary gear unit 18 identically as in the first embodiment. Namely, the third operating element C of the first planetary gear unit 4 is fixedly connected to the third operating element G of the second planetary gear unit 18, and the second operating element B of the first planetary gear unit 4 is variably connected to the first and second operating elements E and F of the second planetary gear unit 18.

In the seventeenth embodiment, only the structure of the first planetary gear unit 4 is changed from the first embodiment. As the operation of the operating elements in each shift range is identical to that of the first embodiment, an explanation thereof will be omitted herein.

Also, the first brake 36 acts to operate the planet carrier 22 of the second planetary gear unit 18 as a reacting element, while the second brake 40 acts to operate at least one of the sun gears 10 and 38 of the first and second simple planetary gearsets 6 and 8 either as a reacting element or to independently operate.

Eighteenth Embodiment

Figure 23:
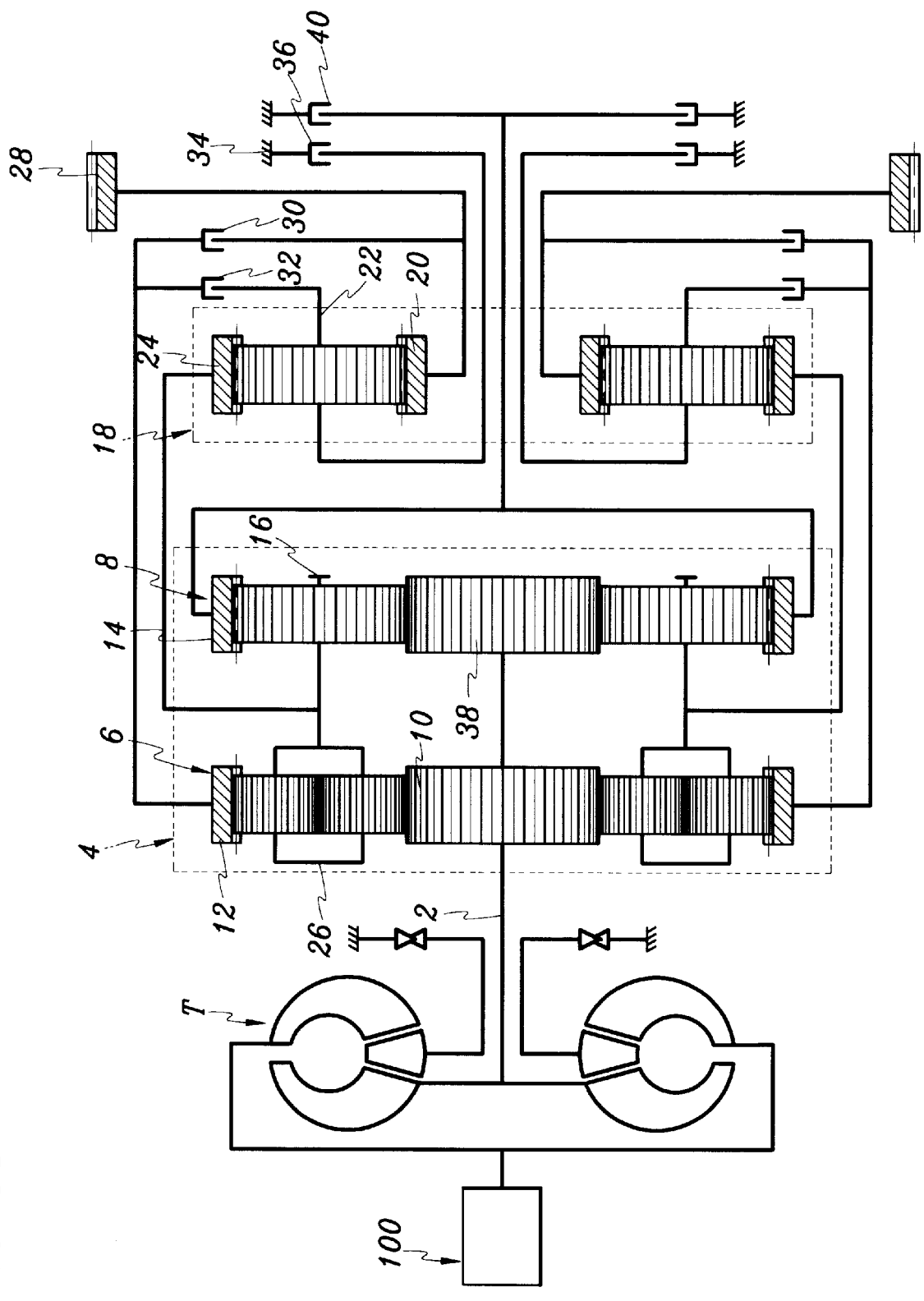
FIG. 23 is a schematic view of a powertrain according to an eighteenth preferred embodiment of the present invention.

Referring to FIG. 23, shown is a schematic view of a powertrain according to an eighteenth preferred embodiment of the present invention. In the drawing, the first planetary gear unit 4 is formed by a combination of the first simple planetary gearset 6 with the second simple planetary gearset 8, which are respectively double and single pinion planetary gearsets as in the first embodiment. Namely, the sun gear 10 and planet carrier 26 of the first simple planetary gearset 6 are fixedly connected respectively to the sun gear 38 and planet carrier 16 of the second simple planetary gearset 8.

Further, with regard to the combination of the first and second planetary gear units 4 and 18, the planet carrier 26 of the first simple planetary gearset 6 is fixedly connected to the ring gear 24 of the second planetary gear unit 18, and the ring gear 12 of the first simple planetary gearset 6 is variably connected to both the sun gear 20 of the second planetary gear unit 18 through the first clutch 30, and to the planet carrier 22 of the second planetary gear unit 18 through the second clutch 32.

Also, the first brake 36 is interposed between the planet carrier 22 of the second planetary gear unit 18 and the transmission housing 34, and the second brake 40 is interposed between the ring gear 14 of the second simple planetary gearset 8 and the transmission housing 34 such that the planet carrier 22 and ring gear 14 selectively act as reacting elements. In addition, the sun gear 20 of the second planetary gear unit 18 is integrally formed with the output gear 28 such that the sun gear 20 acts as an output element.

According to the above structure, operating elements for the first planetary gear unit 4 in the lever analogies of FIGS. 2–5 are as follows: the first operating element A indicates the sun gears 10 and 38 of the first and second simple planetary gearset 6 and 8, the second operating element B indicates the ring gear 12 of the first simple planetary gearset 6, the third operating element C indicates the planet carriers 26 and 16 of the first and second simple planetary gearsets 6 and 8, and the fourth operating element D indicates the ring gear 14 of the second simple planetary gearset 8.

The operating elements of the first planetary gear unit 4 are connected to the operating elements of the second planetary gear unit 18 identically as in the first embodiment. Namely, the third operating element C of the first planetary gear unit 4 is fixedly connected to the third operating element G of the second planetary gear unit 18, and the second operating element B of the first planetary gear unit 4 is variably connected to the first and second operating elements E and F of the second planetary gear unit 18.

In the eighteenth embodiment, only the structure of the first planetary gear unit 4 is changed from the first embodiment. As the operation of the operating elements in each shift range is identical to that of the first embodiment, an explanation thereof will be omitted herein.

Nineteenth Embodiment

Figure 24:
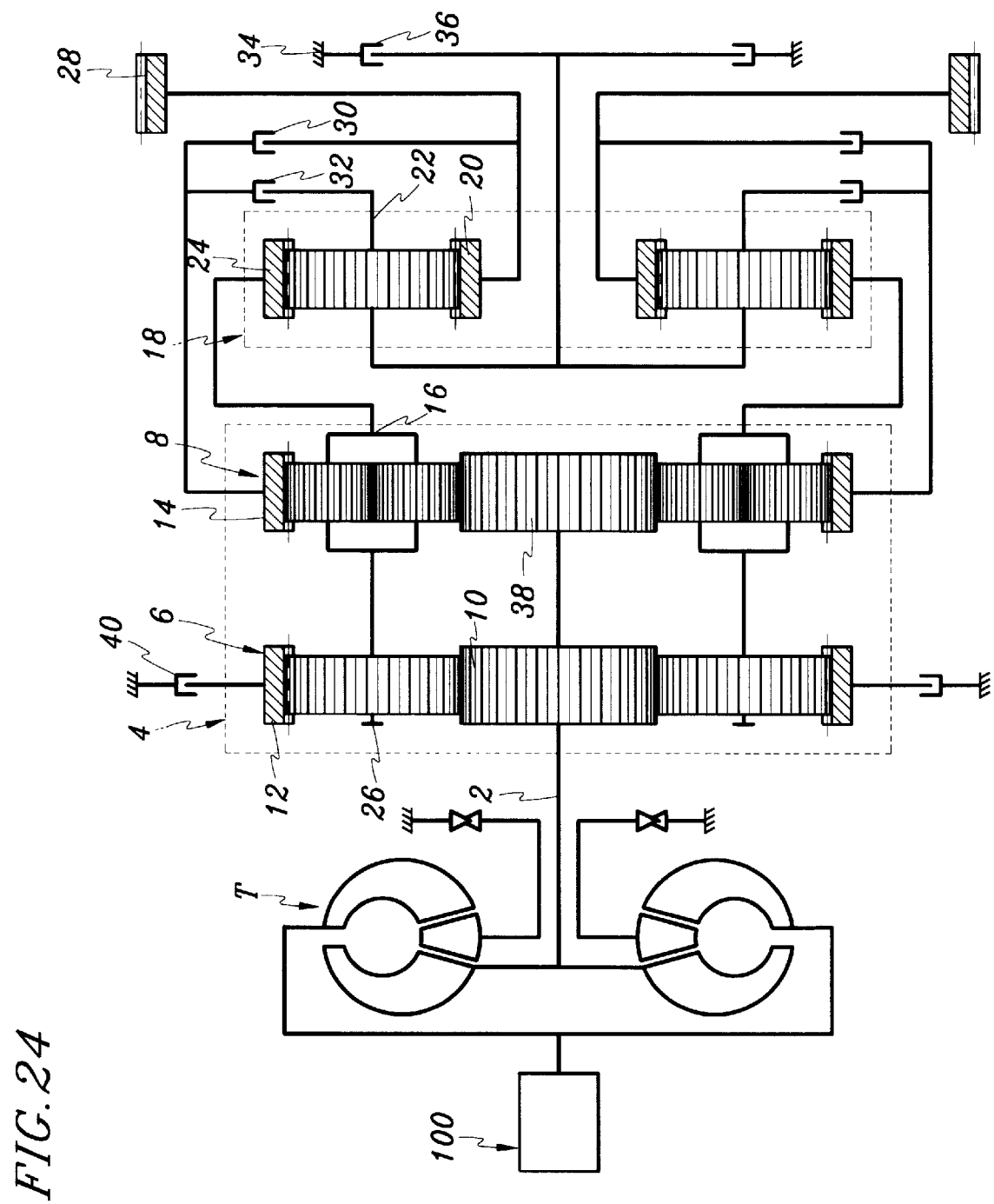
FIG. 24 is a schematic view of a powertrain according to a nineteenth preferred embodiment of the present -invention.

Referring to FIG. 24, shown is a schematic view of a powertrain according to a nineteenth preferred embodiment of the present invention. In the drawing, the first planetary gear unit 4 is formed by a combination of the first simple planetary gearset 6, which is a single pinion planetary gearset in this embodiment, with the second simple planetary gearset 8, which is a double pinion planetary gearset in this embodiment. Namely, the sun gear 10 and planet carrier 26 of the first simple planetary gearset 6 are fixedly connected respectively to the sun gear 38 and planet carrier 16 of the second simple planetary gearset 8.

Further, with regard to the combination of the first and second planetary gear units 4 and 18, the planet carrier 16 of the second simple planetary gearset 8 is fixedly connected to the ring gear 24 of the second planetary gear unit 18, and the ring gear 14 of the second simple planetary gearset 8 is variably connected to both the sun gear 20 of the second planetary gear unit 18 through the first clutch 30, and to the planet carrier 22 of the second planetary gear unit 18 through the second clutch 32.

Also, the first brake 36 is interposed between the planet carrier 22 of the second planetary gear unit 18 and the transmission housing 34, and the second brake 40 is interposed between the ring gear 12 of the first simple planetary gearset 8 and the transmission housing 34 such that the planet carrier 16 and ring gear 12 selectively act as reacting elements. In addition, the sun gear 20 of the second planetary gear unit 18 is integrally formed with the output gear 28 such that the sun gear 20 acts as an output element.

According to the above structure, operating elements for the first planetary gear unit 4 in the lever analogies of FIGS. 2–5 are as follows: the first operating element A indicates the sun gears 10 and 38 of the first and second simple planetary gearsets 6 and 8, the second operating element B indicates the ring gear 14 of the second simple planetary gearset 8, the third operating element C indicates the planet carriers 26 and 16 of the first and second simple planetary gearsets 6 and 8, and the fourth operating element D indicates the ring gear 12 of the first simple planetary gearset 6.

The operating elements of the first planetary gear unit 4 are connected to the operating elements of the second planetary gear unit 18 identically as in the first embodiment. Namely, the third operating element C of the first planetary gear unit 4 is fixedly connected to the third operating element G of the second planetary gear unit 18, and the second operating element B of the first planetary gear unit 4 is variably connected to the first and second operating elements E and F of the second planetary gear unit 18.

In the nineteenth embodiment, only the structure of the first planetary gear unit 4 is changed from the first embodiment. As the operation of the operating elements in each shift range is identical to that of the first embodiment, an explanation thereof will be omitted herein.

In the eighteenth and nineteenth embodiments, the sun gears 10 and 38 of the first and second simple planetary gearsets 6 and 8 act as input elements. Further, the first and second brakes 36 and 40 operate the ring gears 12 and 14 of the first and second simple planetary gearsets 6 and 8 such that at least one independently operates or both act as reacting elements.

Twentieth Embodiment

Figure 25:
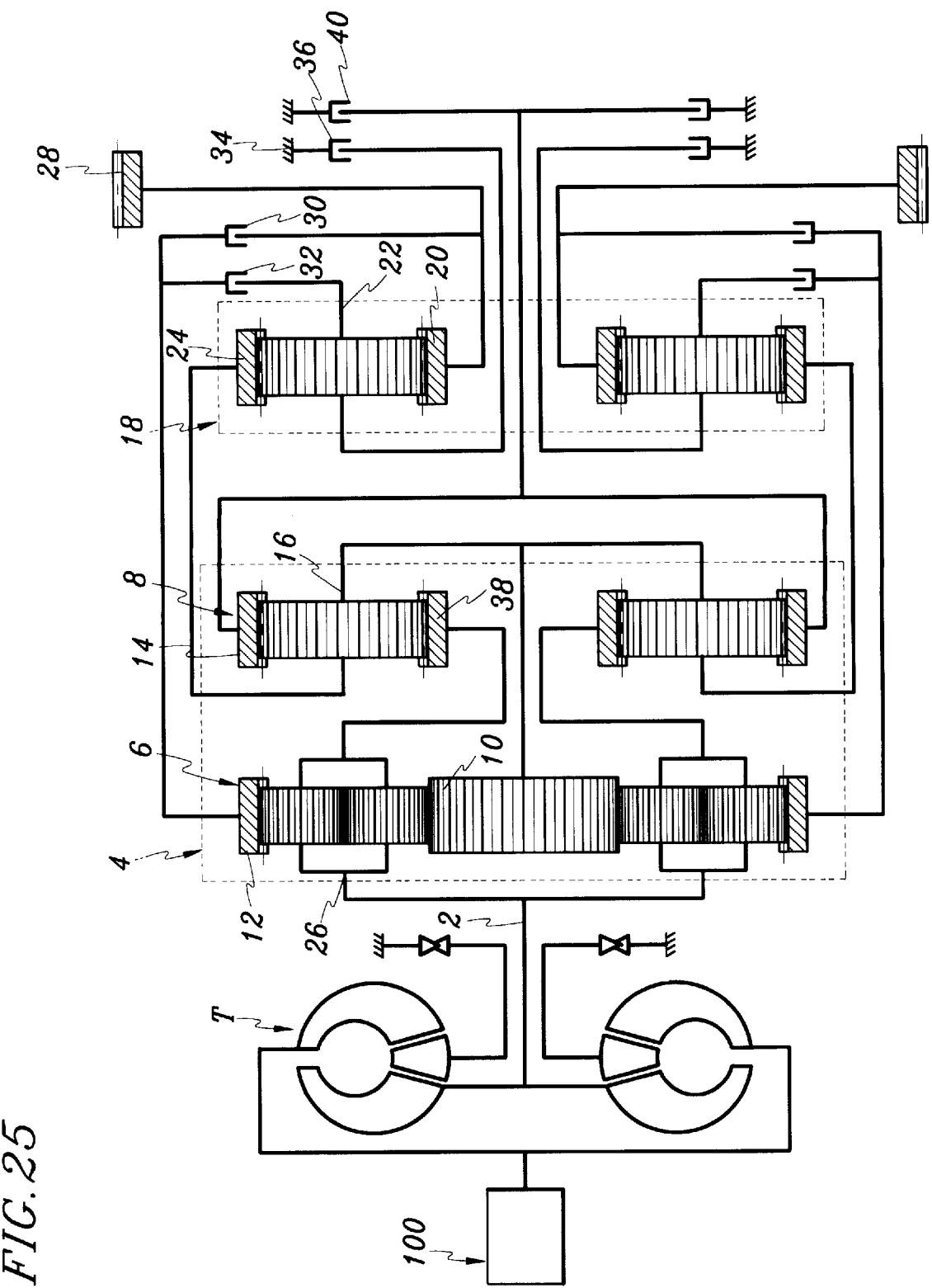
FIG. 25 is a schematic view of a powertrain according to a twentieth preferred embodiment of the present invention.

Referring to FIG. 25, shown is a schematic view of a powertrain according to a twentieth preferred embodiment of the present invention. In the drawing, the first planetary gear unit 4 is formed by a combination of the first simple planetary gearset 6 with the second simple planetary gearset 8, which are double and single pinion planetary gearsets, respectively, as in the first embodiment. Namely, the sun gear 10 and planet carrier 26 of the first simple planetary gearset 6 are fixedly connected respectively to the planet carrier 16 and sun gear 38 of the second simple planetary gearset 8.

Further, with regard to the combination of the first and second planetary gear units 4 and 18, the planet carrier 16 of the second simple planetary gearset 8 is fixedly connected to the ring gear 24 of the second planetary gear unit 18, and the ring gear 12 of the first simple planetary gearset 6 is variably connected to both the sun gear 20 of the second planetary gear unit 18 through the first clutch 30, and to the planet carrier 22 of the second planetary gear unit 18 through the second clutch 32.

Also, the, first brake 36 is interposed between the planet carrier 22 of the second planetary gear unit 18 and the transmission housing 34, and the second brake 40 is interposed between the ring gear 14 of the second simple planetary gearset 8 and the transmission housing 34 such that the planet carrier 22 and ring gear 14 selectively act as reacting elements. In addition, the sun gear 20 of the second planetary gear unit 18 is integrally formed with the output gear 28 such that the sun gear 20 acts as an output element.

According to the above structure, operating elements for the first planetary gear unit 4 in the lever analogies of FIGS. 2–5 are as follows: the first operating element A indicates the planet carrier 26 and sun gear 38 of the first and second simple planetary gearsets 6 and 8, the second operating element B indicates the ring gear 12 of the first simple planetary gearset 6, the third operating element C indicates the sun gear 10 and planet carrier 16 of the first and second simple planetary gearsets 6 and 8, and the fourth operating element D indicates the ring gear 14 of the second simple planetary gearset 8.

The operating elements of the first planetary gear unit 4 are connected to the operating elements of the second planetary gear unit 18 identically as in the first embodiment. Namely, the third operating element C of the first planetary gear unit 4 is fixedly connected to the third operating element G of the second planetary gear unit 18, and the second operating element B of the first planetary gear unit 4 is variably connected to the first and second operating elements E and F of the second planetary gear unit 18.

In the twentieth embodiment, only the structure of the first planetary gear unit 4 is changed from the first embodiment. As the operation of the operating elements in each shift range is identical to that of the first embodiment, an explanation thereof will be omitted herein.

Twenty-first Embodiment

Figure 26:
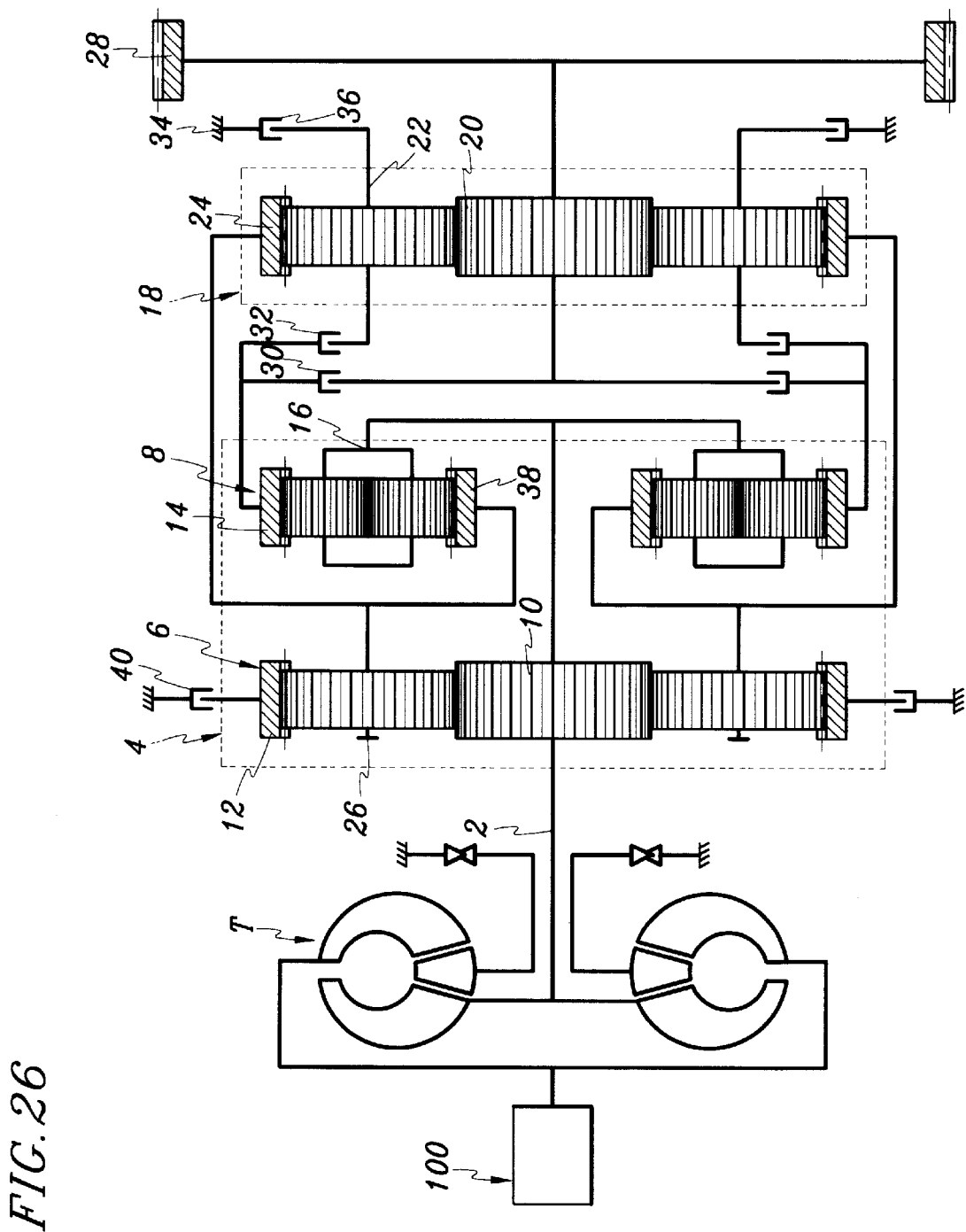
FIG. 26 is a schematic view of a powertrain according to a twenty-first preferred embodiment of the present invention.

Referring to FIG. 26, shown is a schematic view of a powertrain according to a twenty-first preferred embodiment of the present invention. In the drawing, the first planetary gear unit 4 is formed by a combination of the first simple planetary gearset 6 with the second simple planetary gearset 8, which are single and double pinion planetary gearsets, respectively, in this embodiment. Namely, the sun gear 10 and planet carrier 26 of the first simple planetary gearset 6 are fixedly connected respectively to the planet carrier 16 and sun gear 38 of the second simple planetary gearset 8.

Further, with regard to the combination of the first and second planetary gear units 4 and 18, the planet carrier 26 of the first simple planetary gearset 6 is fixedly connected to the ring gear 24 of the second planetary gear unit 18, and the ring gear 14 of the second simple planetary gearset 8 is variably connected to both the sun gear 20 of the second planetary gear unit 18 through the first clutch 30, and to the planet carrier 22 of the second planetary gear unit 18 through the second clutch 32.

Also, the first brake 36 is interposed between the planet carrier 22 of the second planetary gear unit 18 and the transmission housing 34, and the second brake 40 is interposed between the ring gear 12 of the first simple planetary gearset 6 and the transmission housing 34 such that the planet carrier 22 and ring gear 12 selectively act as reacting elements. In addition, the sun gear 20 of the second planetary gear unit 18 is integrally formed with the output gear 28 such that the sun gear 20 acts as an output element.

According to the above structure, operating elements for the first planetary gear unit 4 in the lever analogies of FIGS. 2–5 are as follows: the first operating element A indicates the sun gear 10 and planet carrier 16 of the first and second simple planetary gearsets 6 and 8, the second operating element B indicates the ring gear 14 of the second simple planetary gearset 8, the third operating element C indicates the planet carrier 26 and sun gear 38 of the first and second simple planetary gearsets 6 and 8, and the fourth operating element D indicates the ring gear 12 of the first simple planetary gearset 6.

The operating elements of the first planetary gear unit 4 are connected to the operating elements of the second planetary gear unit 18 identically as in the first embodiment. Namely, the third operating element C of the first planetary gear unit 4 is fixedly connected to the third operating element G of the second planetary gear unit 18, and the second operating element B of the first planetary gear unit 4 is variably connected to the first and second operating elements E and F of the second planetary gear unit 18.

In the twenty-first embodiment, only the structure of the first planetary gear unit 4 is changed from the first embodiment. As the operation of the operating elements in each shift range is identical to that of the first embodiment, an explanation thereof will be omitted herein.

Twenty-second Embodiment

Figure 27:
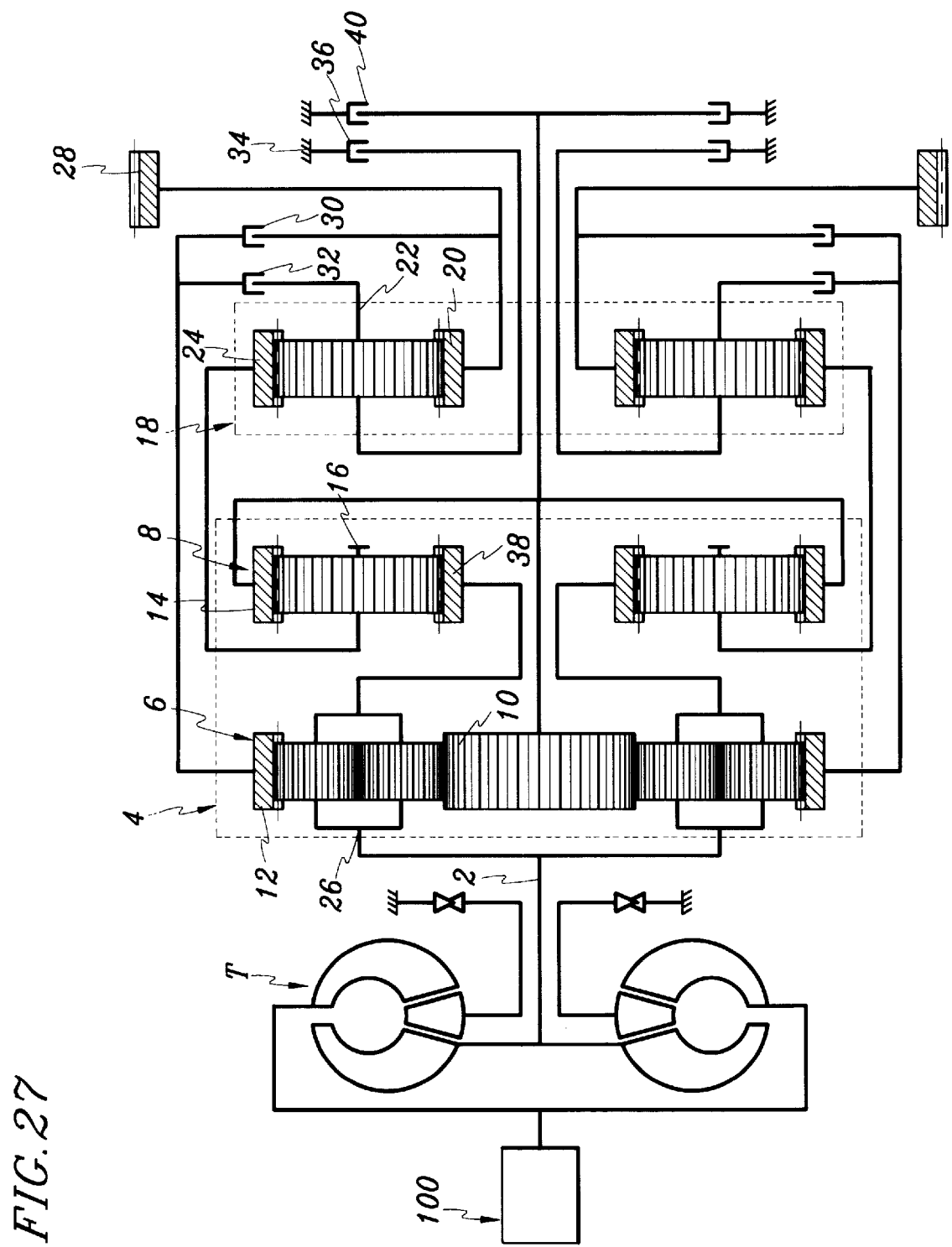
FIG. 27 is a schematic view of a powertrain according to a twenty-second preferred embodiment of the present invention.

Referring to FIG. 27, shown is a schematic view of a powertrain according to a twenty-second preferred embodiment of the present invention. In the drawing, the first planetary gear unit 4 is formed by a combination of the first simple planetary gearset 6 with the second simple planetary gearset 8, which are double and single pinion planetary gearsets, respectively, as in the first embodiment. Namely, the sun gear 10 and planet carrier 26 of the first simple planetary gearset 6 are fixedly connected respectively to the ring gear 14 and sun gear 38 of the second simple planetary gearset 8.

Further, with regard to the combination of the first and second planetary gear units 4 and 18, the planet carrier 16 of the second simple planetary gearset 8 is fixedly connected to the ring gear 24 of the second planetary gear unit 18, and the ring gear 12 of the first simple planetary gearset 6 is variably connected to both the sun gear 20 of the second planetary gear unit 18 through the first clutch 30, and to the planet carrier 22 of the second planetary gear unit 18 through the second clutch 32.

Also, the first brake 36 is interposed between the planet carrier 22 of the second planetary gear unit 18 and the transmission housing 34, and the second brake 40 is interposed between the sun gear 10 and ring gear 14 of the first and second simple planetary gearsets 6 and 8 and the transmission housing 34 such that the planet carrier 22, sun gear 10, and ring gear 14 selectively act as reacting elements. In addition, the sun gear 20 of the second planetary gear unit 18 is integrally formed with the output gear 28 such that the sun gear 20 acts as an output element.

According to the above structure, operating elements for the first planetary gear unit 4 in the lever analogies of FIGS. 2–5 are as follows: the first operating element A indicates the planet carrier 26 and sun gear 38 of the first and second simple planetary gearsets 6 and 8, the second operating element B indicates the ring gear 12 of the first simple planetary gearset 6, the third operating element C indicates the planet carrier 16 of the second simple planetary gearset 8, and the fourth operating element D indicates the sun gear 10 and ring gear 14 of the first and second simple planetary gearsets 6 and 8.

The operating elements of the first planetary gear unit 4 are connected to the operating elements of the second planetary gear unit 18 identically as in the first embodiment. Namely, the third operating element C of the first planetary gear unit 4 is fixedly connected to the third operating element G of the second planetary gear unit 18, and the second operating element B of the first planetary gear unit 4 is variably connected to the first and second operating elements E and F of the second planetary gear unit 18.

In the twenty-second embodiment, only the structure of the first planetary gear unit 4 is changed from the first embodiment. As the operation of the operating elements in each shift range is identical to that of the first embodiment, an explanation thereof will be omitted herein.

In the twentieth through twenty-second embodiments, one of the planet carriers 26 and 16 of the first and second simple planetary gearsets 6 and 8 operates either independently, or together with another operating to act as in input element. Also, the first brake 36 engages to operate the planet carrier 22 of the second simple planetary gearset 8, and the second brake 40 engages either to operate one of the ring gears 12 and 14 of the first and second simple planetary gearsets 6 and 8 to act independently, or to operate as a reacting element jointly with another operating element.

Twenty-third Embodiment

Figure 28:
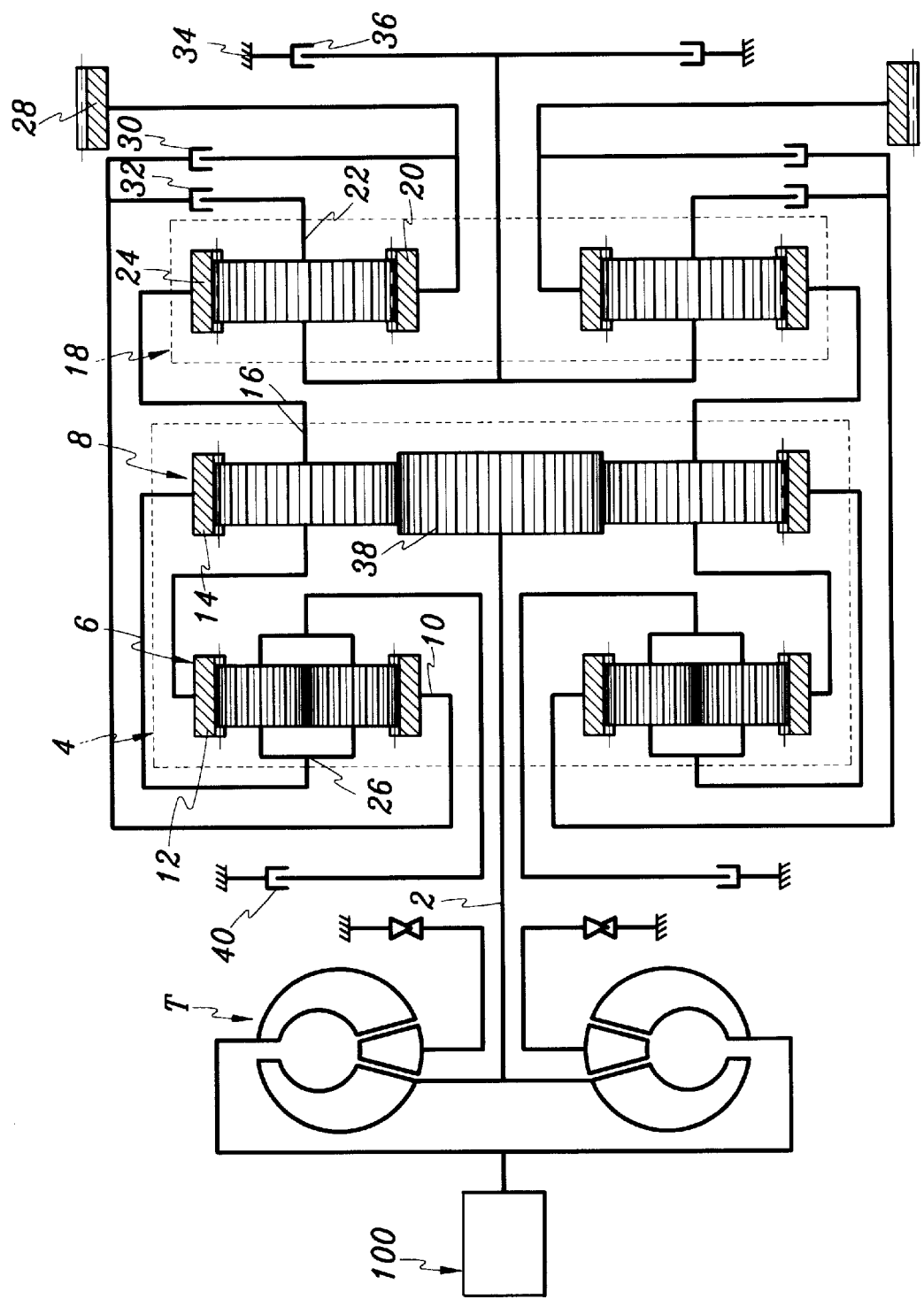
FIG. 28 is a schematic view of a powertrain according to a twenty-third preferred embodiment of the present invention.

Referring to FIG. 28, shown is a schematic view of a powertrain according to a twenty-third preferred embodiment of the present invention. In the drawing, the first planetary gear unit 4 is formed by a combination of the first simple planetary gearset 6 with the second simple planetary gearset 8, which are double and single pinion planetary gearsets, respectively, as in the first embodiment. Namely, the planet carrier 26 and ring gear 12 of the first simple planetary gearset 6 are fixedly connected respectively to the ring gear 14 and planet carrier 16 of the second simple planetary gearset 8.

Further, with regard to the combination of the first and second planetary gear units 4 and 18, the planet carrier 16 of the second simple planetary gearset 8 is fixedly connected to the ring gear 24 of the second planetary gear unit 18, and the sun gear 10 of the first simple planetary gearset 6 is variably connected to both the sun gear 20 of the second planetary gear unit 18 through the first clutch 30, and to the planet carrier 22 of the second planetary gear unit 18 through the second clutch 32.

Also, the first brake 36 is interposed between the planet carrier 22 of the second planetary gear unit 18 and the transmission housing 34, and the second brake 40 is interposed between the planet carrier 26 of the first simple planetary gearset 6 and the transmission housing 34 such that the planet carriers 22 and 26 selectively act as reacting elements. In addition, the sun gear 20 of the second planetary gear unit 18 is integrally formed with the output gear 28 such that the sun gear 20 acts as an output element.

According to the above structure, operating elements for the first planetary gear unit 4 in the lever analogies of FIGS. 2–5 are as follows: the first operating element A indicates the sun gear 38 of the second simple planetary gearset 8, the second operating element B indicates the sun gear 10 of the first simple planetary gearset 6, the third operating element C indicates the ring gear 12 and planet carrier 16 of the first and second simple planetary gearsets 6 and 8, and the fourth operating element D indicates the planet carrier 26 and ring gear 14 of the first and second simple planetary gearsets 6 and 8.

The operating elements of the first planetary gear unit 4 are connected to the operating elements of the second planetary gear unit 18 identically as in the first embodiment. Namely, the third operating element C of the first planetary gear unit 4 is fixedly connected to the third operating element G of the second planetary gear unit 18, and the second operating element B of the first planetary gear unit 4 is variably connected to the first and second operating elements E and F of the second planetary gear unit 18.

In the twenty-third embodiment, only the structure of the first planetary gear unit 4 is changed from the first embodiment. As the operation of the operating elements in each shift range is identical to that of the first embodiment, an explanation thereof will be omitted herein.

Twenty-fourth Embodiment

Figure 29:
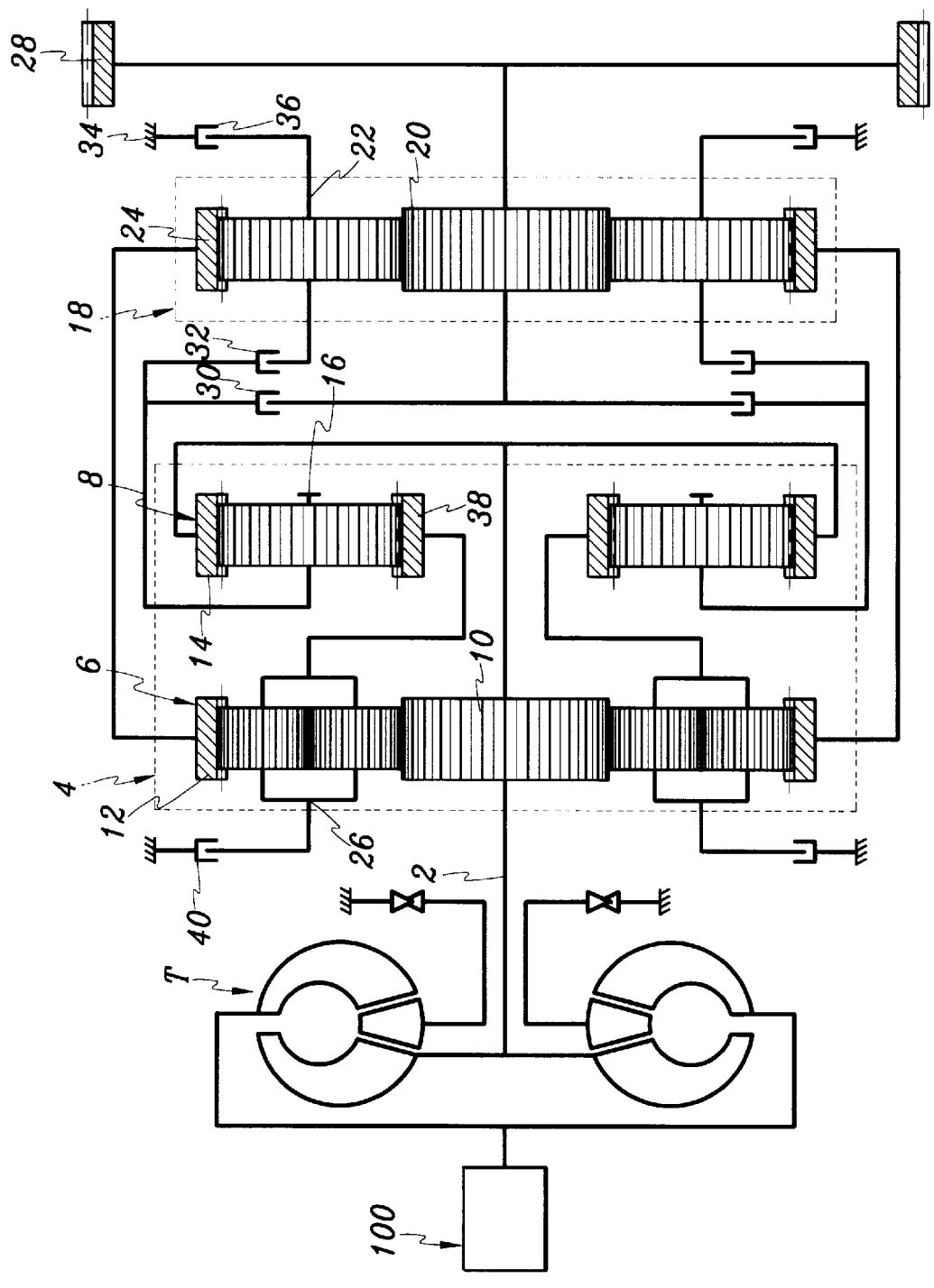
FIG. 29 is a schematic view of a powertrain according to a twenty-fourth preferred embodiment of the present invention.

Referring to FIG. 29, shown is a schematic view of a powertrain according to a twenty-fourth preferred embodiment of the present invention. In the drawing, the first planetary gear unit 4 is formed by a combination of the first simple planetary gearset 6 with the second simple planetary gearset 8, which are double and single pinion planetary gearsets, respectively, as in the first embodiment. Namely, the sun gear 10 and planet carrier 26 of the first simple planetary gearset 6 are fixedly connected respectively to the ring gear 14 and sun gear 38 of the second simple planetary gearset 8.

Further, with regard to the combination of the first and second planetary gear units 4 and 18, the ring gear 12 of the first simple planetary gearset 6 is fixedly connected to the ring gear 24 of the second planetary gear unit 18, and the planet carrier 16 of the second simple planetary gearset 8 is variably connected to both the sun gear 20 of the second planetary gear unit 18 through the first clutch 30, and to the planet carrier 22 of the second planetary gear unit 18 through the second clutch 32.

Also, the first brake 36 is interposed between the planet carrier 22 of the second planetary gear unit 18 and the transmission housing 34, and the second brake 40 is interposed between the planet carrier 26 of the first simple planetary gearset 6 and the transmission housing 34 such that the planet carriers 22 and 26 selectively act as reacting elements. In addition, the sun gear 20 of the second planetary gear unit 18 is integrally formed with the output gear 28 such that the sun gear 20 acts as an output element.

According to the above structure, operating elements for the first planetary gear unit 4 in the lever analogies of FIGS. 2–5 are as follows: the first operating element A indicates the sun gear 10 and ring gear 14 of the first and second simple planetary gearsets 6 and 8, the second operating element B indicates the planet carrier 16 of the second simple planetary gearset 8, the third operating element C indicates the ring gear 12 of the first simple planetary gearset 6, and the fourth operating element D indicates the planet carrier 26 and sun gear 38 of the first and second simple planetary gearsets 6 and 8.

The operating elements of the first planetary gear unit 4 are connected to the operating elements of the second planetary gear unit 18 identically as in the first embodiment. Namely, the third operating element C of the first planetary gear unit 4 is fixedly connected to the third operating element G of the second planetary gear unit 18, and the second operating element B of the first planetary gear unit 4 is variably connected to the first and second operating elements E and F of the second planetary gear unit 18.

In the twenty-fourth embodiment, only the structure of the first planetary gear unit 4 is changed from the first embodiment. As the operation of the operating elements in each shift range is identical to that of the first embodiment, an explanation thereof will be omitted herein.

Twenty-fifth Embodiment

Figure 30:
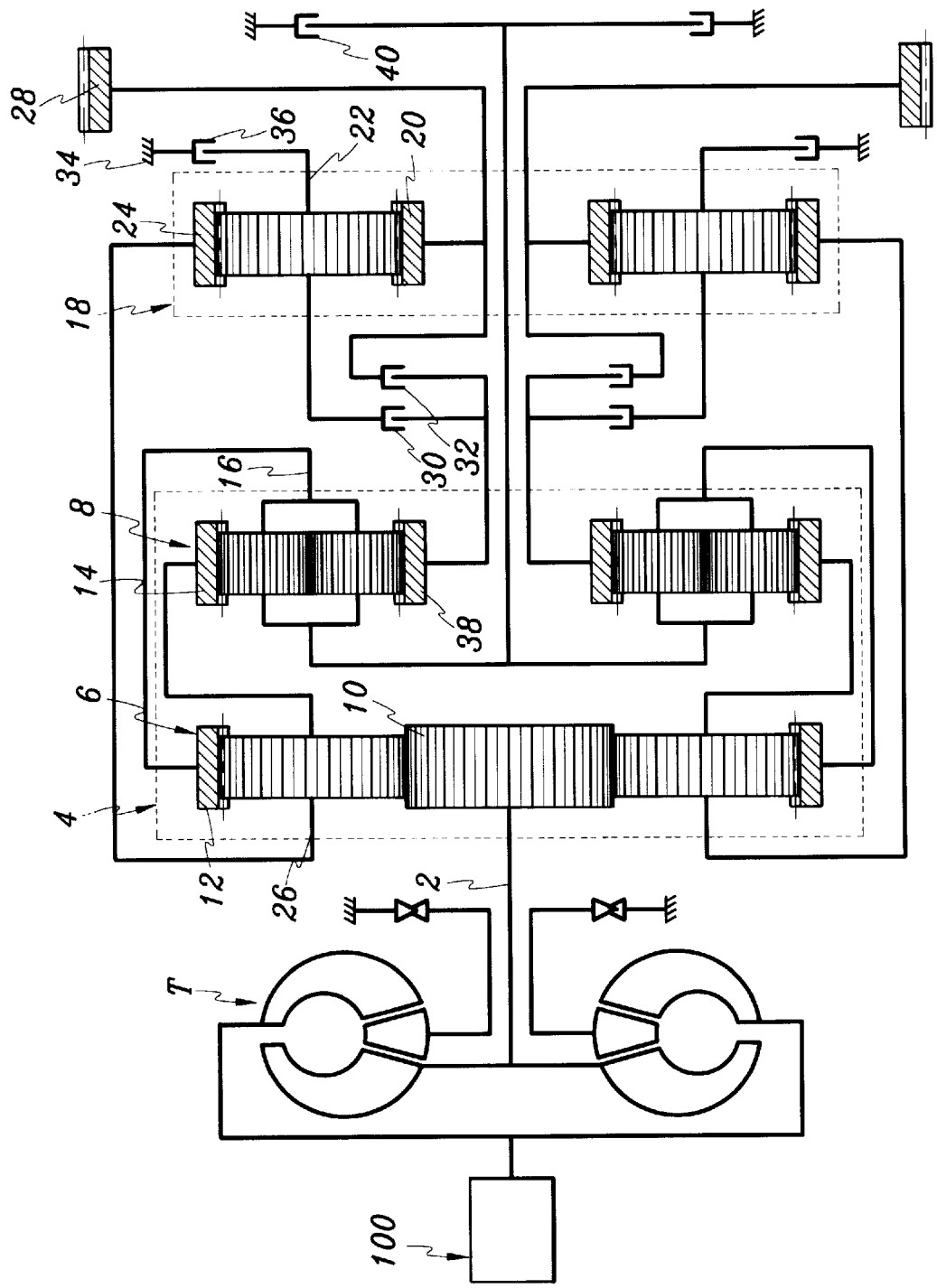
FIG. 30 is a schematic view of a powertrain according to a twenty-fifth preferred embodiment of the present invention.

Referring to FIG. 30, shown is a schematic view of a powertrain according to a twenty-fifth preferred embodiment of the present invention. In the drawing, the first planetary gear unit 4 is formed by a combination of the first simple planetary gearset 6, which is a single pinion planetary gearset in this embodiment, with the second simple planetary gearset 8, which is a double pinion planetary gearset in this embodiment. Namely, the planet carrier 26 and ring gear 12 of the first simple planetary gearset 6 are fixedly connected respectively to the ring gear 14 and planet carrier 16 of the second simple planetary gearset 8.

Further, with regard to the combination of the first and second planetary gear units 4 and 18, the planet carrier 26 of the first simple planetary gearset 6 is fixedly connected to the ring gear 24 of the second planetary gear unit 18, and the sun gear 38 of the second simple planetary gearset 8 is variably connected to both the sun gear 20 of the second planetary gear unit 18 through the first clutch 30, and to the planet carrier 22 of the second planetary gear unit 18 through the second clutch 32.

Also, the first brake 36 is interposed between the planet carrier 22 of the second planetary gear unit 18 and the transmission housing 34, and the second brake 40 is interposed between the planet carrier 16 of the second simple planetary gearset 8 and the transmission housing 34 such that the planet carriers 22 and 16 selectively act as reacting elements. In addition, the sun gear 20 of the second planetary gear unit 18 is integrally formed with the output gear 28 such that the sun gear 20 acts as an output element.

According to the above structure, operating elements for the first planetary gear unit 4 in the lever analogies of FIGS. 2–5 are as follows: the first operating element A indicates the sun gear 10 of the first simple planetary gearset 6, the second operating element B indicates the sun gear 38 of the second simple planetary gearset 8, the third operating element C indicates the planet carrier 26 and ring gear 14 of the first and second simple planetary gearsets 6 and 8, and the fourth operating element D indicates the ring gear 12 and planet carrier 16 of the first and second simple planetary gearsets 6 and 8.

The operating elements of the first planetary gear unit 4 are connected to the operating elements of the second planetary gear unit 18 identically as in the first embodiment. Namely, the third operating element C of the first planetary gear unit 4 is fixedly connected to the third operating element G of the second planetary gear unit 18, and the second operating element B of the first planetary gear unit 4 is variably connected to the first and second operating elements E and F of the second planetary gear unit 18.

In the twenty-fifth embodiment, only the structure of the first planetary gear unit 4 is changed from the first embodiment. As the operation of the operating elements in each shift range is identical to that of the first embodiment, an explanation thereof will be omitted herein.

Twenty-sixth Embodiment

Figure 31:
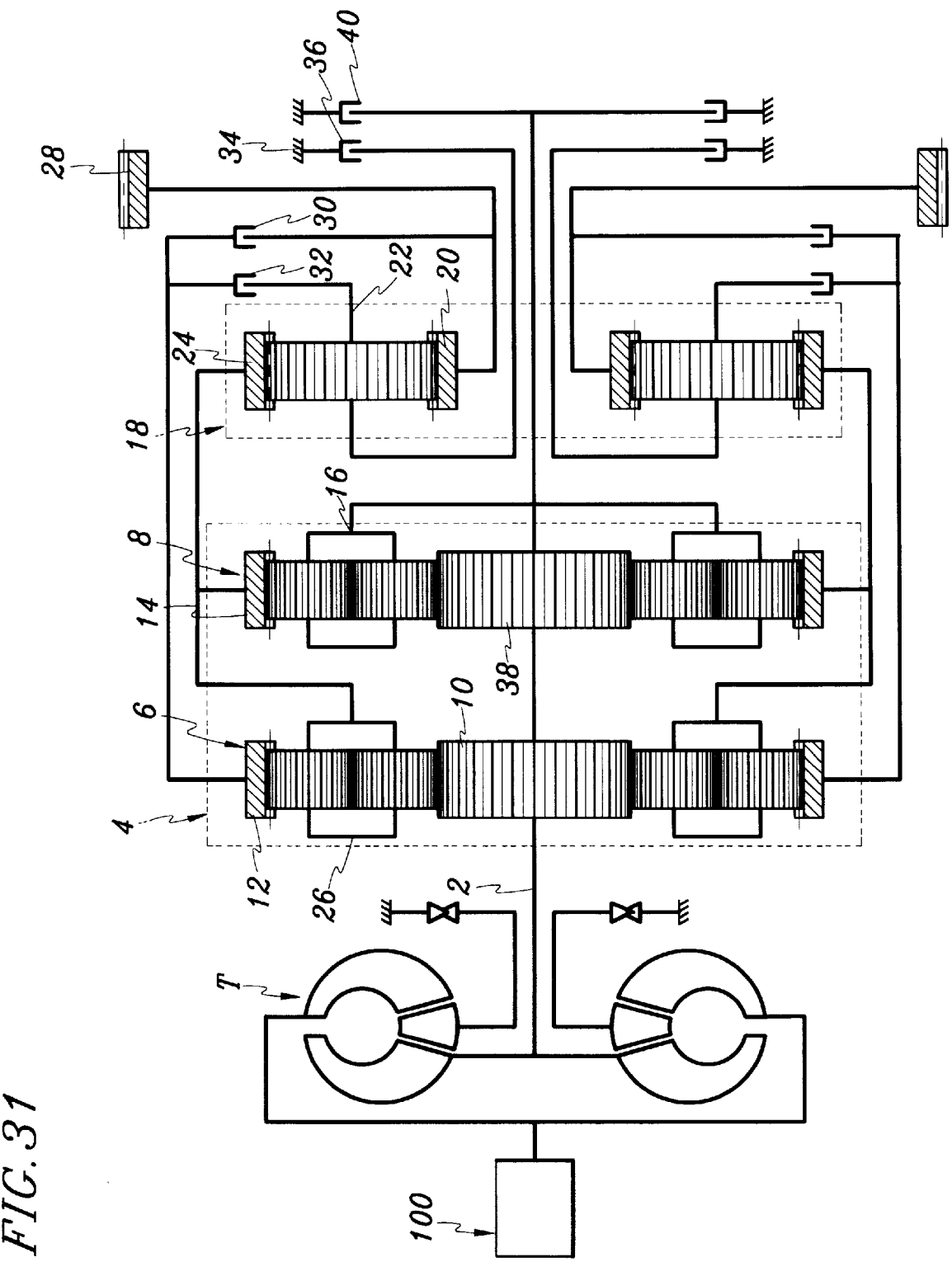
FIG. 31 is a schematic view of a powertrain according to a twenty-sixth preferred embodiment of the present invention.

Referring to FIG. 31, shown is a schematic view of a powertrain according to a twenty-sixth preferred embodiment of the present invention. In the drawing, the first planetary gear unit 4 is formed by a combination of the first simple planetary gearset 6, which is a double pinion planetary gearset as in the first embodiment, with the second simple planetary gearset 8, which is a double pinion planetary gearset in this embodiment. Namely, the sun gear 10 and planet carrier 26 of the first simple planetary gearset 6 are fixedly connected respectively to the sun gear 38 and ring gear 14 of the second simple planetary gearset 8.

Further, with regard to the combination of the first and second planetary gear units 4 and 18, the ring gear 14 of the second simple planetary gearset 6 is fixedly connected to the ring gear 24 of the second planetary gear unit 18, and the ring gear 12 of the first simple planetary gearset 6 is variably connected to both the sun gear 20 of the second planetary gear unit 18 through the first clutch 30, and to the planet carrier 22 of the second planetary gear unit 18 through the second clutch 32.

Also, the first brake 36 is interposed between the planet carrier 22 of the second planetary gear unit 18 and the transmission housing 34, and the second brake 40 is interposed between the planet carrier 16 of the second simple planetary gearset 8 and the transmission housing 34 such that the planet carriers 22 and 16 selectively act as reacting elements. In addition, the sun gear 20 of the second planetary gear unit 18 is integrally formed with the output gear 28 such that the sun gear 20 acts as an output element.

According to the above structure, operating elements for the first planetary gear unit 4 in the lever analogies of FIGS. 2–5 are as follows: the first operating element A indicates the sun gears 10 and 38 of the first and second simple planetary gearsets 6 and 8, the second operating element B indicates the ring gear 12 of the first simple planetary gearset 6, the third operating element C indicates the planet carrier 26 and ring gear 14 of the first and second simple planetary gearsets 6 and 8, and the fourth operating element D indicates the planet carrier 16 of the second simple planetary gearset 8.

The operating elements of the first planetary gear unit 4 are connected to the operating elements of the second planetary gear unit 18 identically as in the first embodiment. Namely, the third operating element C of the first planetary gear unit 4 is fixedly connected to the third operating element G of the second planetary gear unit 18, and the second operating element B of the first planetary gear unit 4 is variably connected to the first and second operating elements E and F of the second planetary gear unit 18.

In the twenty-sixth embodiment, only the structure of the first planetary gear unit 4 is changed from the first embodiment. As the operation of the operating elements in each shift range is identical to that of the first embodiment, an explanation thereof will be omitted herein.

Twenty-seventh Embodiment

Figure 32:
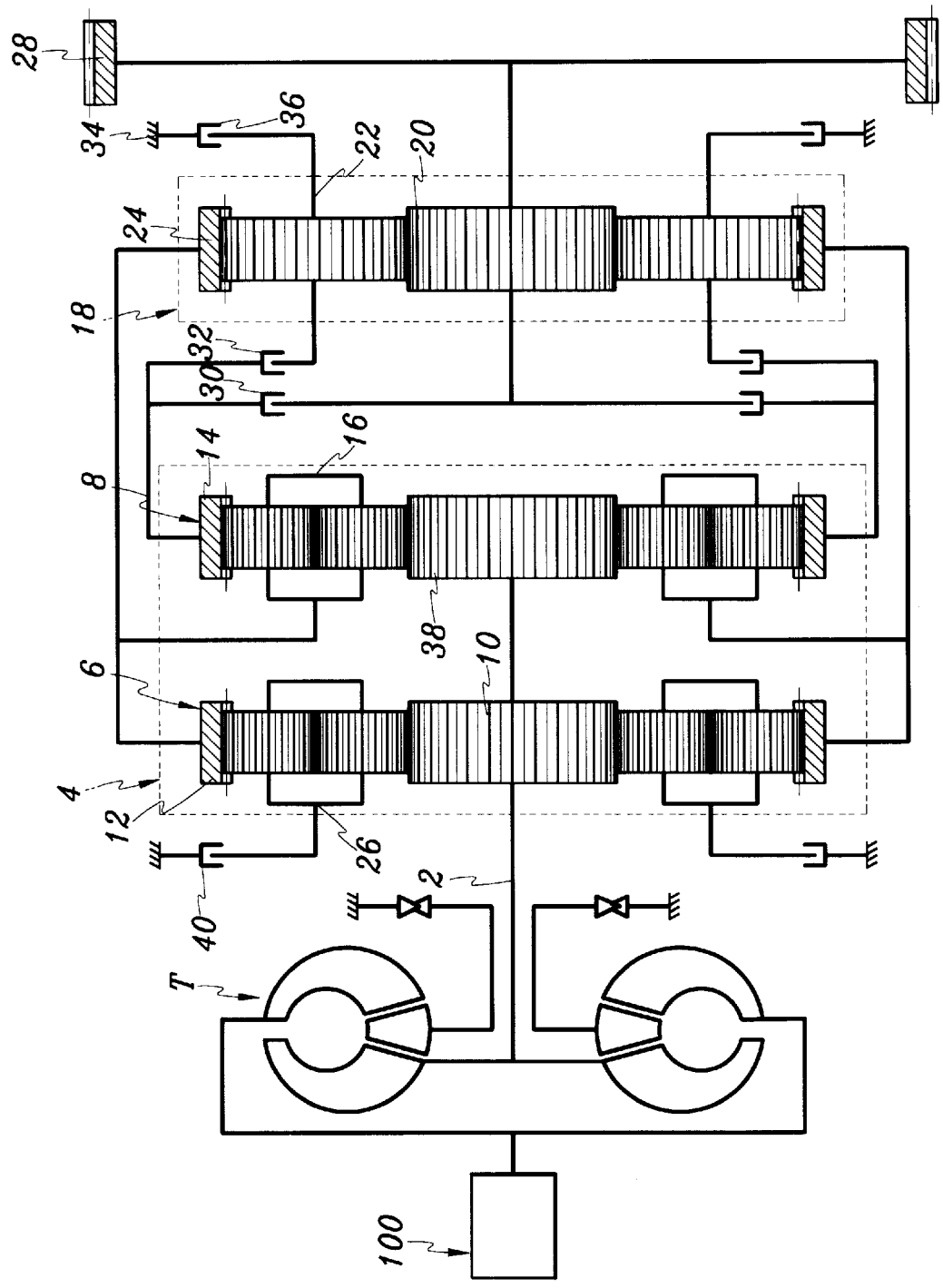
FIG. 32 is a schematic view of a powertrain according to a twenty-seventh preferred embodiment of the present invention.

Referring to FIG. 32, shown is a schematic view of a powertrain according to a twenty-seventh preferred embodiment of the present invention. In the drawing, the first planetary gear unit 4 is formed by a combination of the first simple planetary gearset 6, which is a double pinion planetary gearset as in the first embodiment, with the second simple planetary gearset 8, which is a double pinion planetary gearset in this embodiment. Namely, the sun gear 10 and ring gear 12 of the first simple planetary gearset 6 are fixedly connected respectively to the sun gear 38 and planet carrier 16 of the second simple planetary gearset 8.

Further, with regard to the combination of the first and second planetary gear units 4 and 18, the ring gear 12 of the first simple planetary gearset 6 is fixedly connected to the ring gear 24 of the second planetary gear unit 18, and the ring gear 14 of the second simple planetary gearset 8 is variably connected to both the sun gear 20 of the second planetary gear unit 18 through the first clutch 30, and to the planet carrier 22 of the second planetary gear unit 18 through the second clutch 32.

Also, the first brake 36 is interposed between the planet carrier 22 of the second planetary gear unit 18 and the transmission housing 34, and the second brake 40 is interposed between the planet carrier 26 of the first simple planetary gearset 6 and the transmission housing 34 such that the planet carriers 22 and 26 selectively act as reacting elements. In addition, the sun gear 20 of the second planetary gear unit 18 is integrally formed with the output gear 28 such that the sun gear 20 acts as an output element.

According to the above structure, operating elements for the first planetary gear unit 4 in the lever analogies of FIGS. 2–5 are as follows: the first operating element A indicates the sun gears 10 and 38 of the first and second simple planetary gearsets 6 and 8, the second operating element B indicates the ring gear 14 of the second simple planetary gearset 8, the third operating element C indicates the ring gear 12 and planet carrier 16 of the first and second simple planetary gearsets 6 and 8, and the fourth operating element D indicates the planet carrier 26 of the first simple planetary gearset 6.

The operating elements of the first planetary gear unit 4 are connected to the operating elements of the second planetary gear unit 18 identically as in the first embodiment. Namely, the third operating element C of the first planetary gear unit 4 is fixedly connected to the third operating element G of the second planetary gear unit 18, and the second operating element B of the first planetary gear unit 4 is variably connected to the first and second operating elements E and F of the second planetary gear unit 18.

In the twenty-seventh embodiment, only the structure of the first planetary gear unit 4 is changed from the first embodiment. As the operation of the operating elements in each shift range is identical to that of the first embodiment, an explanation thereof will be omitted herein.

Twenty-eighth Embodiment

Figure 33:
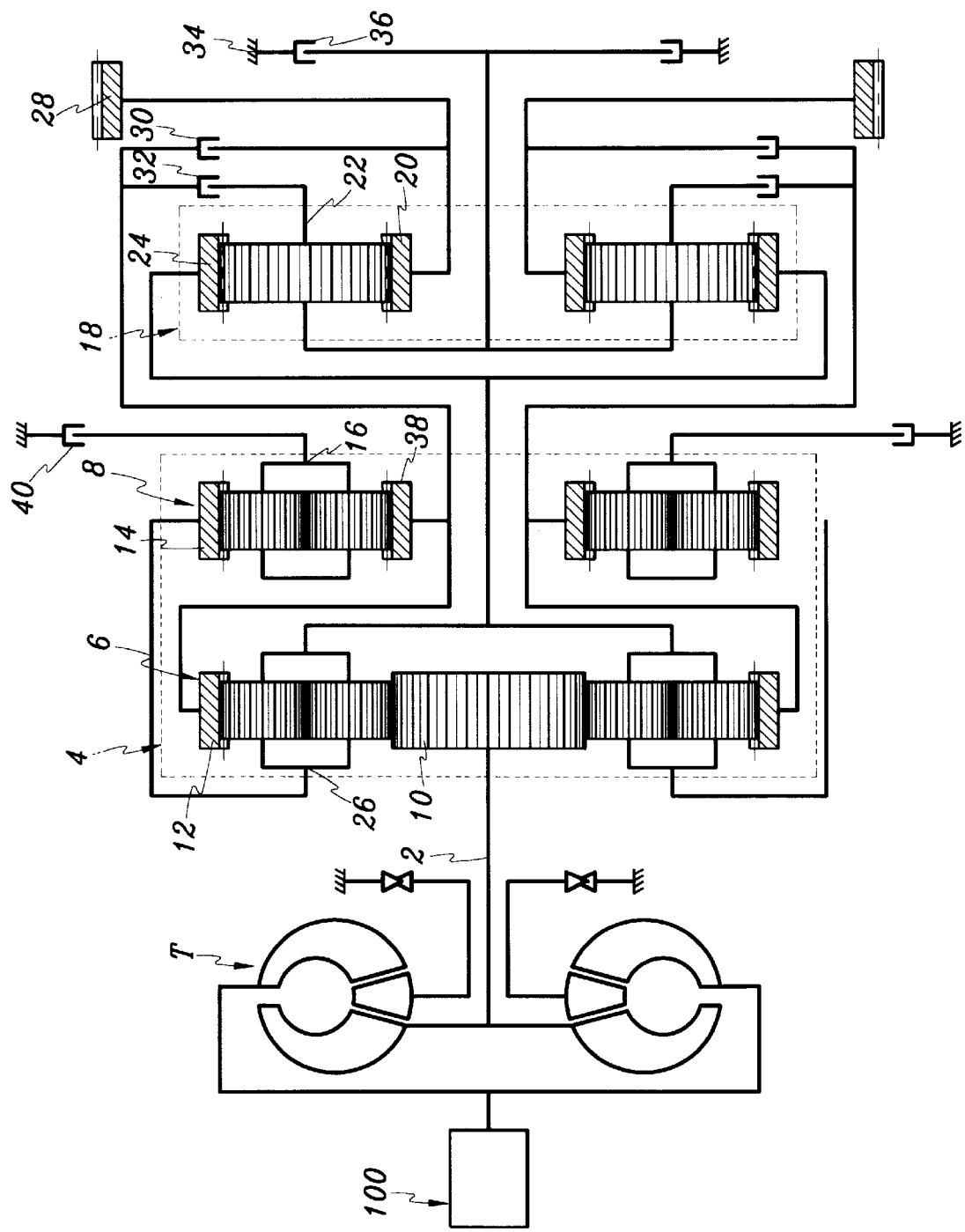
FIG. 33 is a schematic view of a powertrain according to a twenty-eighth preferred embodiment of the present invention.

Referring to FIG. 33, shown is a schematic view of a powertrain according to a twenty-eighth preferred embodiment of the present invention. In the drawing, the first planetary gear unit 4 is formed by a combination of the first simple planetary gearset 6, which is a double pinion planetary gearset as in the first embodiment, with the second simple planetary gearset 8, which is a double pinion planetary gearset in this embodiment. Namely, the planet carrier 26 and ring gear 12 of the first simple planetary gearset 6 are fixedly connected respectively to the ring gear 14 and sun gear 38 of the second simple planetary gearset 8.

Further, with regard to the combination of the first and second planetary gear units 4 and 18, the planet carrier 26 of the first simple planetary gearset 6 is fixedly connected to the ring gear 24 of the second planetary gear unit 18, and both the ring gear 12 and sun gear 38 of the first and second simple planetary gearsets 6 and 8 are variably connected to both the sun gear 20 of the second planetary gear unit 18 through the first clutch 30, and to the planet carrier 22 of the second planetary gear unit 18 through the second clutch 32.

Also, the first brake 36 is interposed between the planet carrier 22 of the second planetary gear unit 18 and the transmission housing 34, and the second brake 40 is interposed between the planet carrier 16 of the second simple planetary gearset 8 and the transmission housing 34 such that the planet carriers 22 and 16 selectively act as reacting elements. In addition, the sun gear 20 of the second planetary gear unit 18 is integrally formed with the output gear 28 such that the sun gear 20 acts as an output element.

According to the above structure, operating elements for the first planetary gear unit 4 in the lever analogies of FIGS. 2–5 are as follows: the first operating element A indicates the sun gear 10 of the first simple planetary gearset 6, the second operating element B indicates the ring gear 12 and sun gear 38 of the first and second simple planetary gearsets 6 and 8, the third operating element C indicates the planet carrier 26 and ring gear 14 of the first and second simple planetary gearsets 6 and 8, and the fourth operating element D indicates the planet carrier 16 of the second simple planetary gearset 6.

The operating elements of the first planetary gear unit 4 are connected to the operating elements of the second planetary gear unit 18 identically as in the first embodiment. Namely, the third operating element C of the first planetary gear unit 4 is fixedly connected to the third operating element G of the second planetary gear unit 18, and the second operating element B of the first planetary gear unit 4 is variably connected to the first and second operating elements E and F of the second planetary gear unit 18.

In the twenty-eighth embodiment, only the structure of the first planetary gear unit 4 is changed from the first embodiment. As the operation of the operating elements in each shift range is identical to that of the first embodiment, an explanation thereof will be omitted herein.

Twenty-ninth Embodiment

Figure 34:
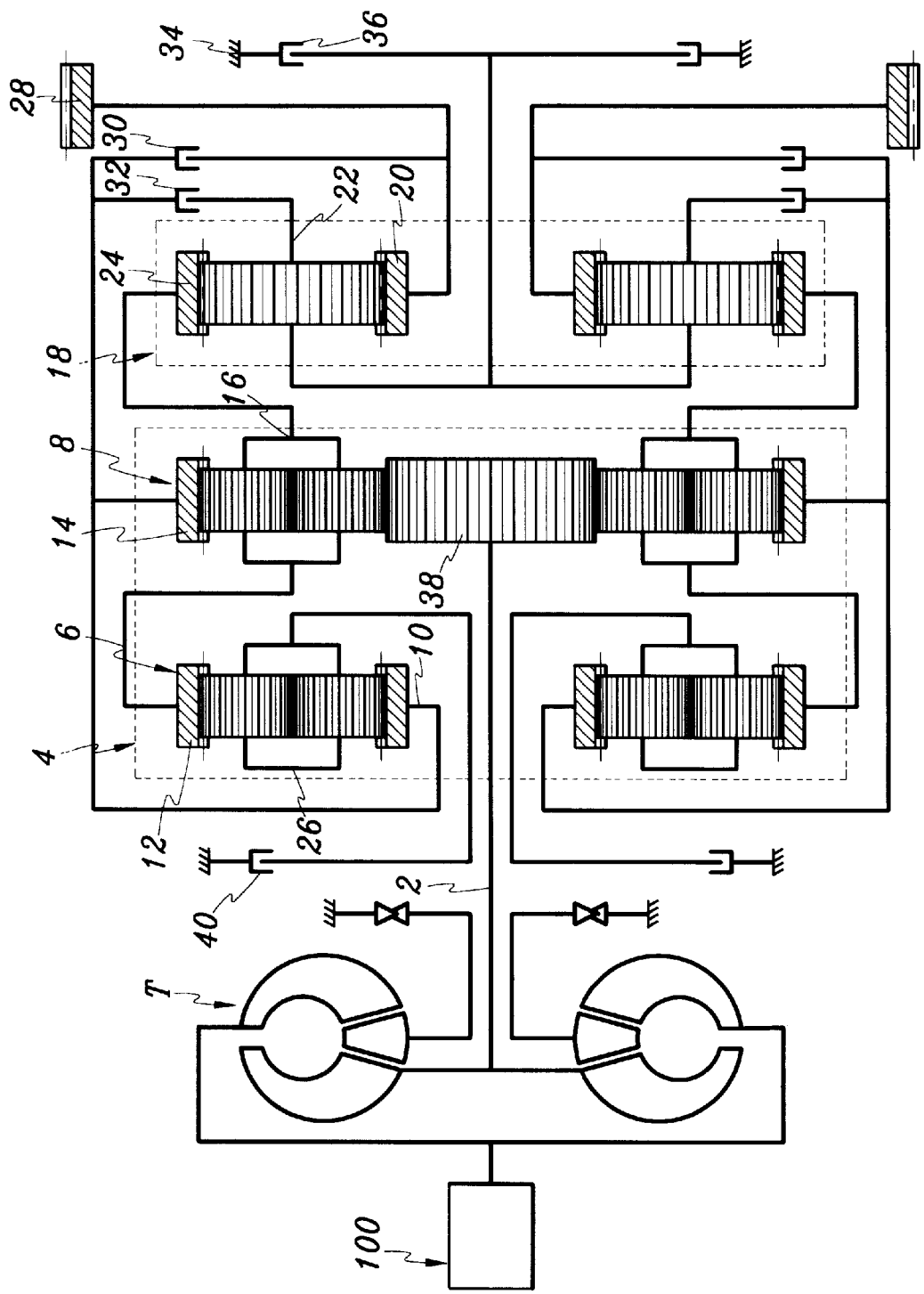
FIG. 34 is a schematic view of a powertrain according to a twenty-ninth preferred embodiment of the present invention.

Referring to FIG. 34, shown is a schematic view of a powertrain according to a twenty-ninth preferred embodiment of the present invention. In the drawing, the first planetary gear unit 4 is formed by a combination of the first simple planetary gearset 6, which is a double pinion planetary gearset as in the first embodiment, with the second simple planetary gearset 8, which is a double pinion planetary gearset in this embodiment. Namely, the sun gear 10 and ring gear 12 of the first simple planetary gearset 6 are fixedly connected respectively to the ring gear 14 and planet carrier 16 of the second simple planetary gearset 8.

Further, with regard to the combination of the first and second planetary gear units 4 and 18, the planet carrier 16 of the second simple planetary gearset 8 is fixedly connected to the ring gear 24 of the second planetary gear unit 18, and the ring gear 14 of the second simple planetary gearset 8 is variably connected to both the sun gear 20 of the second planetary gear unit 18 through the first clutch 30, and to the planet carrier 22 of the second planetary gear unit 18 through the second clutch 32.

Also, the first brake 36 is interposed between the planet carrier 22 of the second planetary gear unit 18 and the transmission housing 34, and the second brake 40 is interposed between the planet carrier 26 of the first simple planetary gearset 6 and the transmission housing 34 such that the planet carriers 22 and 26 selectively act as reacting elements. In addition, the sun gear 20 of the second planetary gear unit 18 is integrally formed with the output gear 28 such that the sun gear 20 acts as an output element.

According to the above structure, operating elements for the first planetary gear unit 4 in the lever analogies of FIGS. 2–5 are as follows: the first operating element A indicates the sun gear 38 of the second simple planetary gearset 8, the second operating element B indicates the sun gear 10 and ring gear 14 of the first and second simple planetary gearsets 6 and 8, the third operating element C indicates the ring gear 12 and planet carrier 16 of the first and second simple planetary gearsets 6 and 8, and the fourth operating element D indicates the planet carrier 26 of the first simple planetary gearset 6.

The operating elements of the first planetary gear unit 4 are connected to the operating elements of the second planetary gear unit 18 identically as in the first embodiment. Namely, the third operating element C of the first planetary gear unit 4 is fixedly connected to the third operating element G of the second planetary gear unit 18, and the second operating element B of the first planetary gear unit 4 is variably connected to the first and second operating elements E and F of the second planetary gear unit 18.

In the twenty-ninth embodiment, only the structure of the first planetary gear unit 4 is changed from the first embodiment. As the operation of the operating elements in each shift range is identical to that of the first embodiment, an explanation thereof will be omitted herein.

Thirtieth Embodiment

Figure 35:
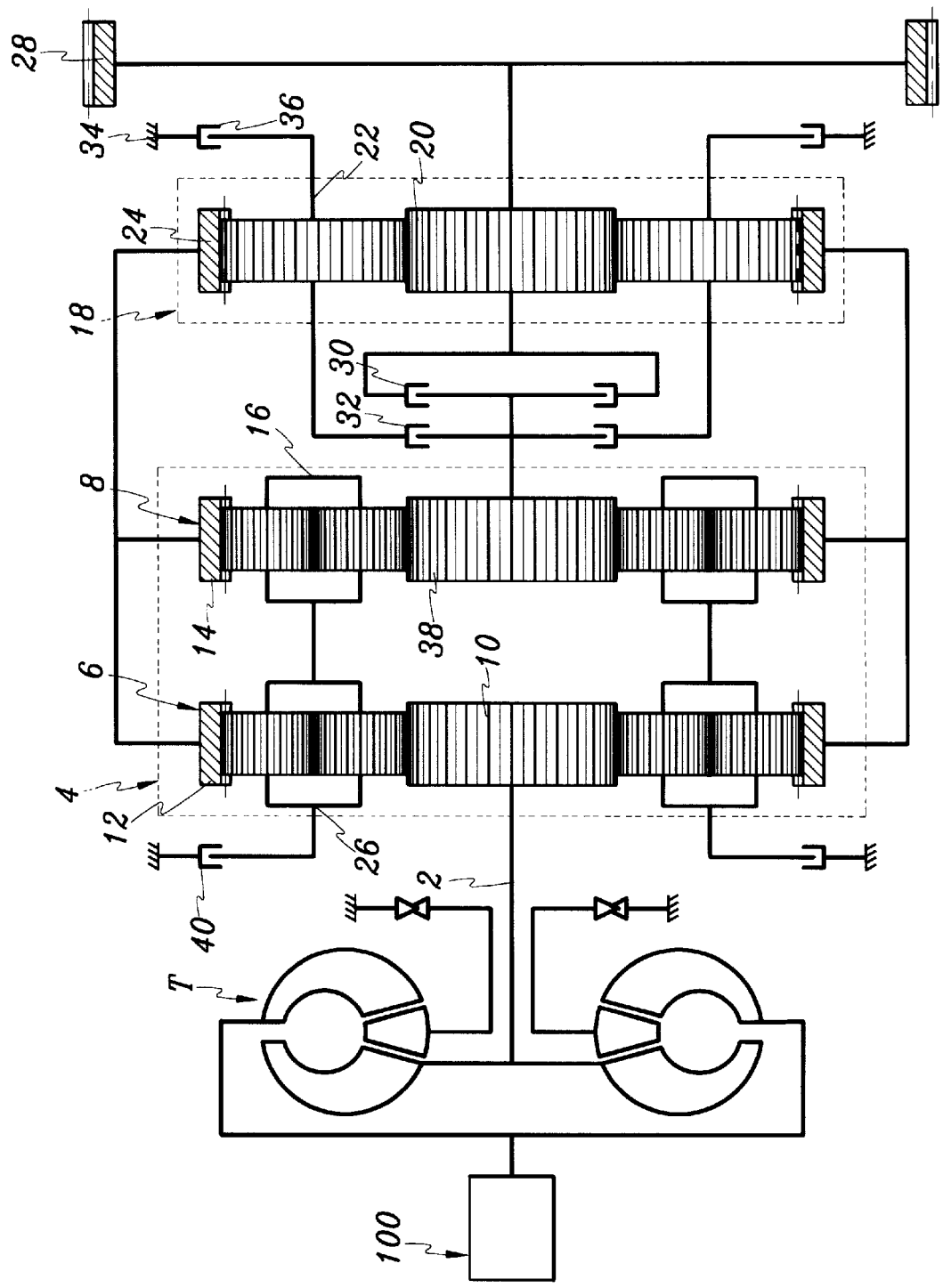
FIG. 35 is a schematic view of a powertrain according to a thirtieth preferred embodiment of the present invention.

Referring to FIG. 35, shown is a schematic view of a powertrain according to a thirtieth preferred embodiment of the present invention. In the drawing, the first planetary gear unit 4 is formed by a combination of the first simple planetary gearsets 6, which is a double pinion planetary gearset as in the first embodiment, with the second simple planetary gearset 8, which is a double pinion planetary gearset in this embodiment. Namely, the planet carrier 26 and ring gear 12 of the first simple planetary gearset 6 are fixedly connected respectively to the planet carrier 16 and ring gear 14 of the second simple planetary gearset 8.

Further, with regard to the combination of the first and second planetary gear units 4 and 18, the ring gear 14 of the second simple planetary gearset 8 is fixedly connected to the ring gear 24 of the second planetary gear unit 18, and the sun gear 38 of the second simple planetary gearset 8 is variably connected to both the sun gear 20 of the second planetary gear unit 18 through the first clutch 30, and to the planet carrier 22 of the second planetary gear unit 18 through the second clutch 32.

Also, the first brake 36 is interposed between the planet carrier 22 of the second planetary gear unit 18 and the transmission housing 34, and the second brake 40 is interposed between the planet carrier 26 of the first simple planetary gearset 6 and the transmission housing 34 such that the planet carriers 22 and 26 selectively act as reacting elements. In addition, the sun gear 20 of the second planetary gear unit 18 is integrally formed with the output gear 28 such that the sun gear 20 acts as an output element.

According to the above structure, operating elements for the first planetary gear unit 4 in the lever analogies of FIGS. 2–5 are as follows: the first operating element A indicates the sun gear 10 of the first simple planetary gearset 6, the second operating element B indicates the sun gear 38 of the second simple planetary gearsets 6 and 8, the third operating element C indicates the ring gears 12 and 14 of the first and second simple planetary gearsets 6 and 8, and the fourth operating element D indicates the planet carriers 26 and 16 of the first and second simple planetary gearsets 6 and 8.

The operating elements of the first planetary gear unit 4 are connected to the operating elements of the second planetary gear unit 18 identically as in the first embodiment. Namely, the third operating element C of the first planetary gear unit 4 is fixedly connected to the third operating element G of the second planetary gear unit 18, and the second operating element B of the first planetary gear unit 4 is variably connected to the first and second operating elements E and F of the second planetary gear unit 18.

In the thirtieth embodiment, only the structure of the first planetary gear unit 4 is changed from the first embodiment. As the operation of the operating elements in each shift range is identical to that of the first embodiment, an explanation thereof will be omitted herein.

Thirty-first Embodiment

Figure 36:
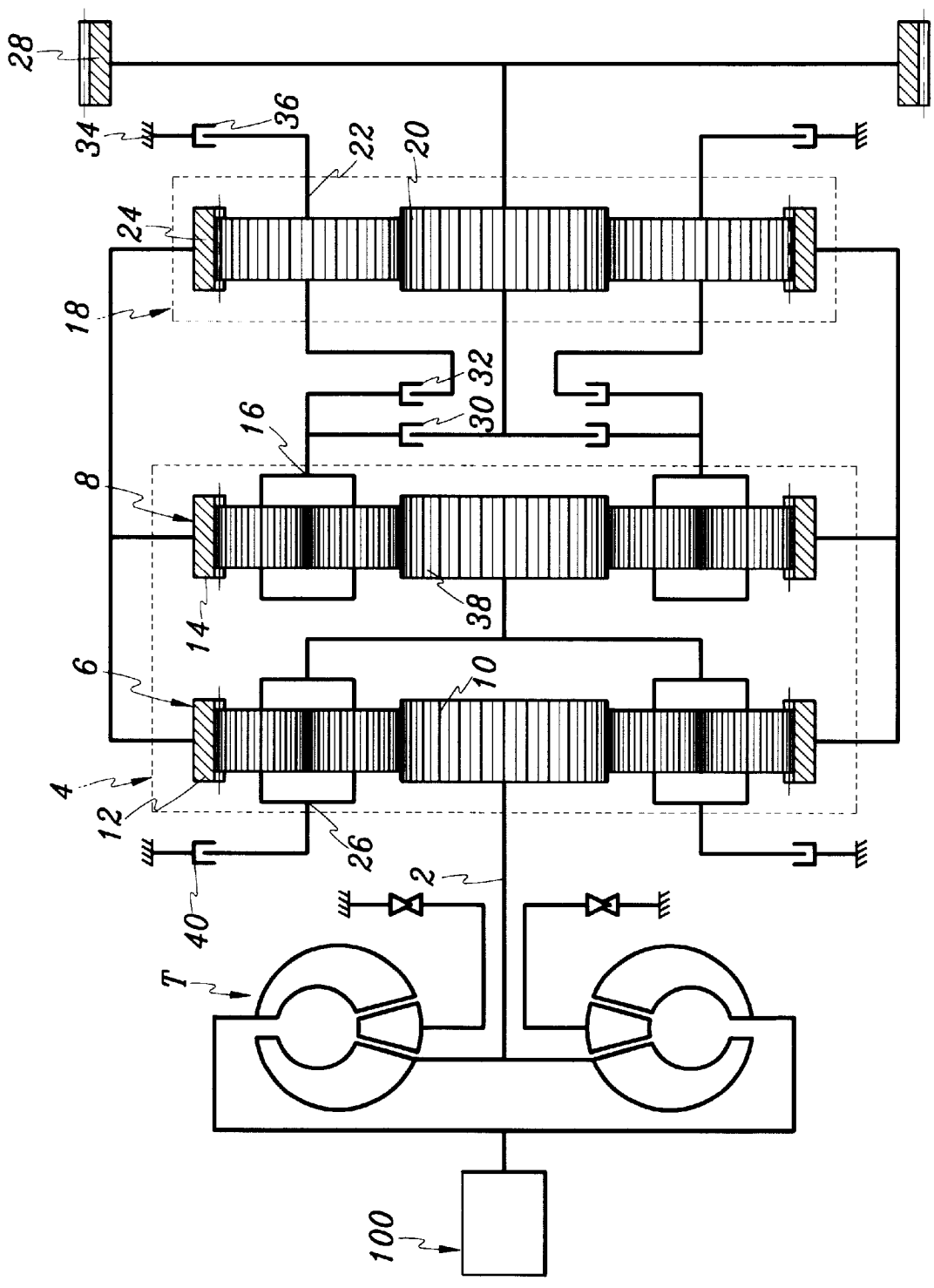
FIG. 36 is a schematic view of a powertrain according to a thirty-first preferred embodiment of the present invention.

Referring to FIG. 36, shown is a schematic view of a powertrain according to a thirty-first preferred embodiment of the present invention. In the drawing, the first planetary gear unit 4 is formed by a combination of the first simple planetary gearsets 6, which is a double pinion planetary gearset as in the first embodiment, with the second simple planetary gearset 8, which is a double pinion planetary gearset in this embodiment. Namely, the planet carrier 26 and ring gear 12 of the first simple planetary gearset 6 are fixedly connected respectively to the sun gear 38 and ring gear 14 of the second simple planetary gearset 8.

Further, with regard to the combination of the first and second planetary gear units 4 and 18, the ring gear 14 of the second simple planetary gearset 8 is fixedly connected to the ring gear 24 of the second planetary gear unit 18, and the planet carrier 16 of the second simple planetary gearset 8 is variably connected to both the sun gear 20 of the second planetary gear unit 18 through the first clutch 30, and to the planet carrier 22 of the second planetary gear unit 18 through the second clutch 32.

Also, the first brake 36 is interposed between the planet carrier 22 of the second planetary gear unit 18 and the transmission housing 34, and the second brake 40 is interposed between the planet carrier 26 of the first simple planetary gearset 6 and the transmission housing 34 such that the planet carriers 22 and 26 selectively act as reacting elements. In addition, the sun gear 20 of the second planetary gear unit 18 is integrally formed with the output gear 28 such that the sun gear 20 acts as an output element.

According to the above structure, operating elements for the first planetary gear unit 4 in the lever analogies of FIGS. 2–5 are as follows: the first operating element A indicates the sun gear 10 of the first simple planetary gearset 6, the second operating element B indicates the planet carrier 16 of the second simple planetary gearset 8, the third operating element C indicates the ring gears 12 and 14 of the first and second simple planetary gearsets 6 and 8, and the fourth operating element D indicates the planet carrier 26 and sun gear 38 of the first and second simple planetary gearsets 6 and 8.

The operating elements of the first planetary gear unit 4 are connected to the operating elements of the second planetary gear unit 18 identically as in the first embodiment. Namely, the third operating element C of the first planetary gear unit 4 is fixedly connected to the third operating element G of the second planetary gear unit 18, and the second operating element B of the first planetary gear unit 4 is variably connected to the first and second operating elements E and F of the second planetary gear unit 18.

In the thirty-first embodiment, only the structure of the first planetary gear unit 4 is changed from the first embodiment. As the operation of the operating elements in each shift range is identical to that of the first embodiment, an explanation thereof will be omitted herein.

Thirty-second Embodiment

Figure 37:
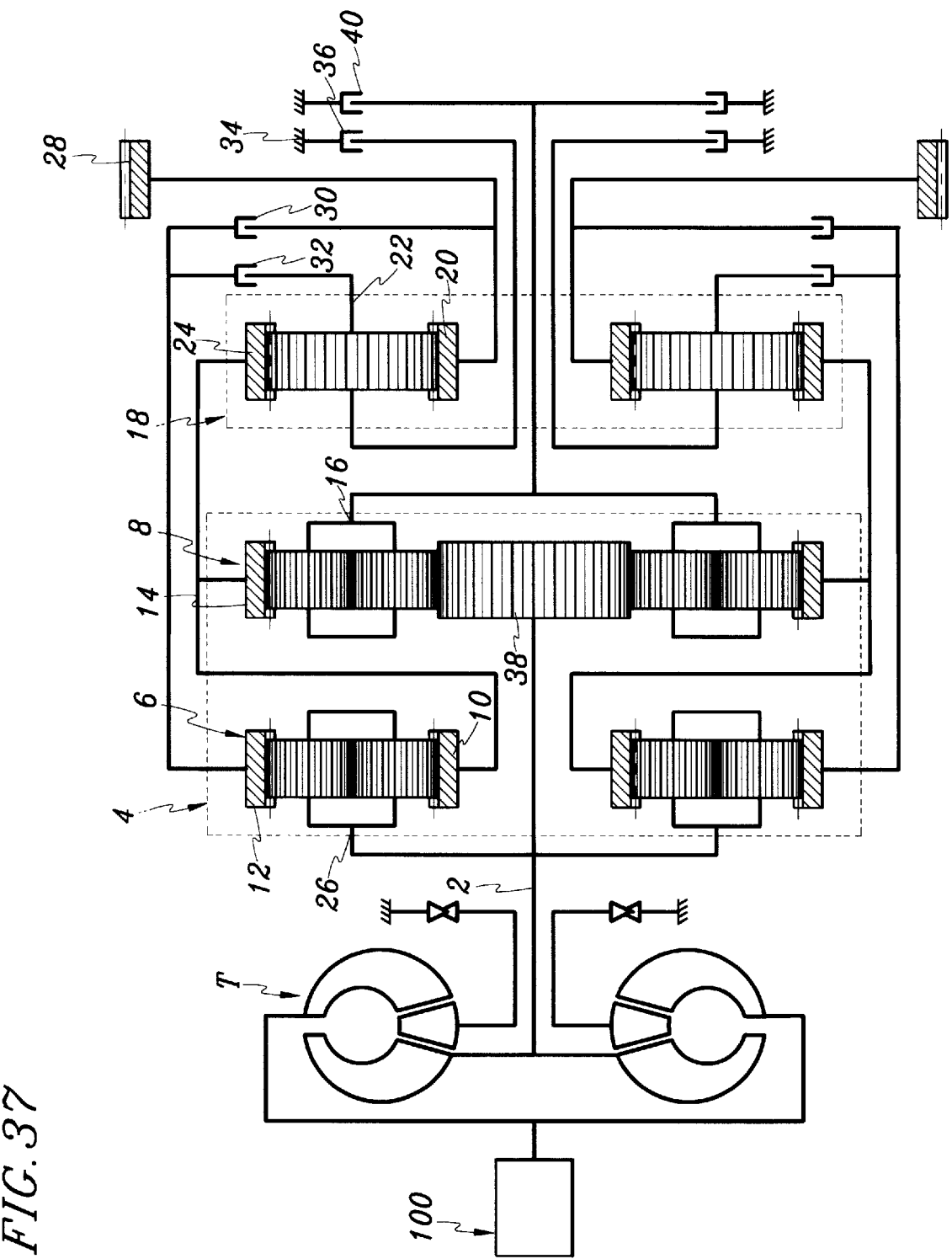
FIG. 37 is a schematic view of a powertrain according to a thirty-second preferred embodiment of the present invention.

Referring to FIG. 37, shown is a schematic view of a powertrain according to a thirty-second preferred embodiment of the present invention. In the drawing, the first planetary gear unit 4 is formed by a combination of the first simple planetary gearsets 6, which is a double pinion planetary gearset as in the first embodiment, with the second simple planetary gearset 8, which is a double pinion planetary gearset in this embodiment. Namely, the sun gear 10 and planet carrier 26 of the first simple planetary gearset 6 are fixedly connected respectively to the ring gear 14 and sun gear 38 of the second simple planetary gearset 8.

Further, with regard to the combination of the first and second planetary gear units 4 and 18, the ring gear 14 of the second simple planetary gearset 8 is fixedly connected to the ring gear 24 of the second planetary gear unit 18, and the ring gear 12 of the first simple planetary gearset 6 is variably connected to both the Bun gear 20 of the second planetary gear unit 18 through the first clutch 30, and to the planet carrier 22 of the second planetary gear unit 18 through the second clutch 32.

Also, the first brake 36 is interposed between the planet carrier 22 of the second planetary gear unit 18 and the transmission housing 34, and the second brake 40 is interposed between the planet carrier 16 of the second simple planetary gearset 8 and the transmission housing 34 such that the planet carriers 22 and 16 selectively act as reacting elements. In addition, the sun gear 20 of the second planetary gear unit 18 is integrally formed with the output gear 28 such that the sun gear 20 acts as an output element.

According to the above structure, operating elements for the first planetary gear unit 4 in the lever analogies of FIGS. 2–5 are as follows: the first operating element A indicates the sun gear 10 and planet carrier 26 of the first simple planetary gearset 6, the second operating element B indicates the ring gear 12 of the first simple planetary gearset 6, the third operating element C indicates the sun gear 10 and ring gear 14 of the first and second simple planetary gearsets 6 and 8, and the fourth operating element D indicates the planet carrier 16 of the second simple planetary gearset 8.

The operating elements of the first planetary gear unit 4 are connected to the operating elements of the second planetary gear unit 18 identically as in the first embodiment. Namely, the third operating element C of the first planetary gear unit 4 is fixedly connected to the third operating element G of the second planetary gear unit 18, and the second operating element B of the first planetary gear unit 4 is variably connected to the first and second operating elements E and F of the second planetary gear unit 18.

In the thirty-second embodiment, only the structure of the first planetary gear unit 4 is changed from the first embodiment. As the operation of the operating elements in each shift range is identical to that of the first embodiment, an explanation thereof will be omitted herein.

Thirty-third Embodiment

Figure 38:
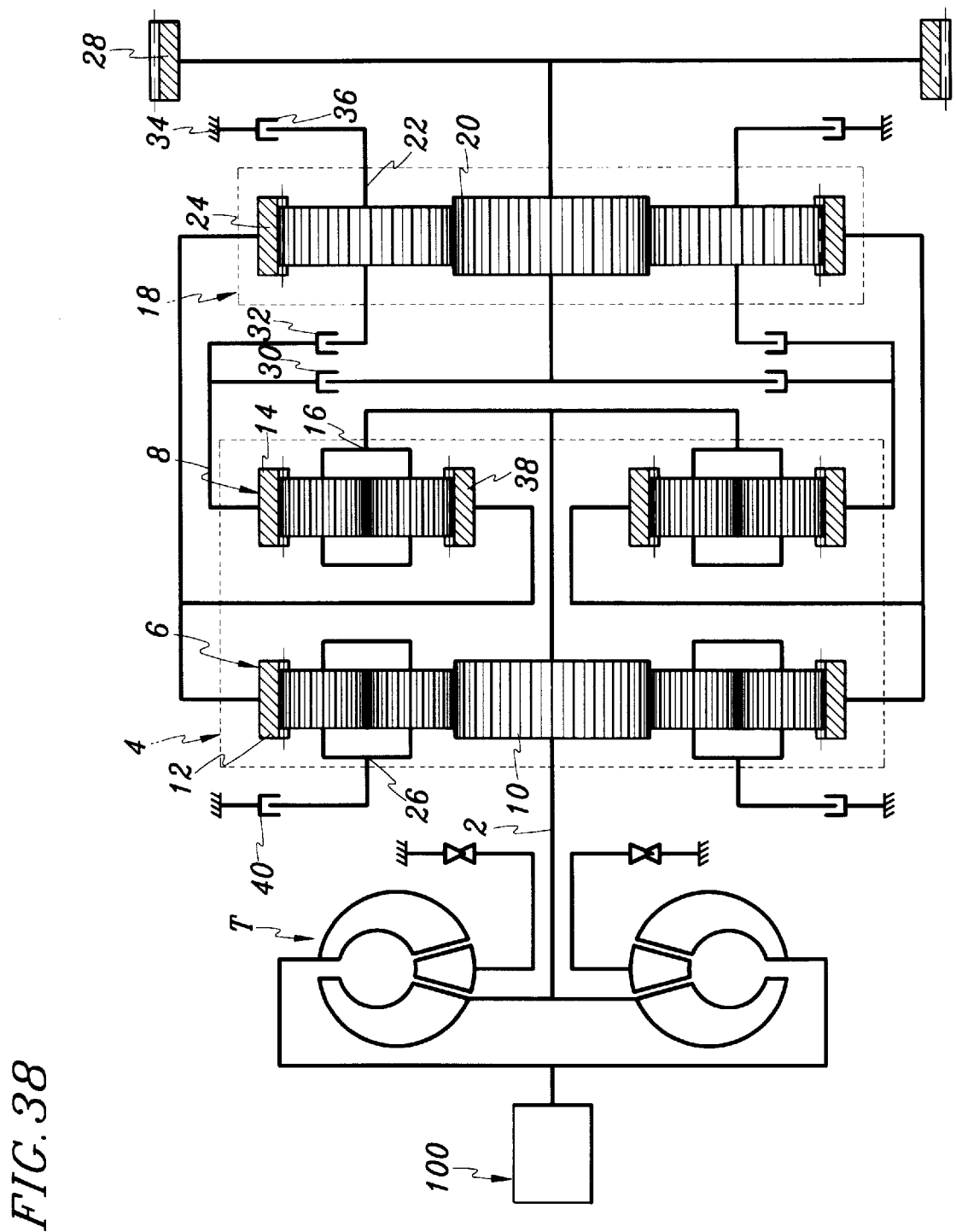
FIG. 38 is a schematic view of a powertrain according to a thirty-third preferred embodiment of the present invention.

Referring to FIG. 38, shown is a schematic view of a powertrain according to a thirty-third preferred embodiment of the present invention. In the drawing, the first planetary gear unit 4 is formed by a combination of the first simple planetary gearsets 6, which is a double pinion planetary gearset as in the first embodiment, with the second simple planetary gearset 8, which is a double pinion planetary gearset in this embodiment. Namely, the sun gear 10 and ring gear 12 of the first simple planetary gearset 6 are fixedly connected respectively to the planet carrier 16 and sun gear 38 of the second simple planetary gearset 8.

Further, with regard to the combination of the first and second planetary gear units 4 and 18, the sun gear 38 of the second simple planetary gearset 8 is fixedly connected to the ring gear 24 of the second planetary gear unit 18, and the ring gear 14 of the second simple planetary gearset 8 is variably connected to both the sun gear 20 of the second planetary gear unit 18 through the first clutch 30, and to the planet carrier 22 of the second planetary gear unit 18 through the second clutch 32.

Also, the first brake 36 is interposed between the planet carrier 22 of the second planetary gear unit 18 and the transmission housing 34, and the second brake 40 is interposed between the planet carrier 26 of the first simple planetary gearset 6 and the transmission housing 34 such that the planet carriers 22 and 26 selectively act as reacting elements. In addition, the sun gear 20 of the second planetary gear unit 18 is integrally formed with the output gear 28 such that the sun gear 20 acts as an output element.

According to the above structure, operating elements for the first planetary gear unit 4 in the lever analogies of FIGS. 2–5 are as follows: the first operating element A indicates the sun gear 10 and planet carrier 16 of the first and second simple planetary gearsets 6 and 8, the second operating element B indicates the ring gear 14 of the second simple planetary gearset 8, the third operating element C indicates the ring gear 12 and sun gear 38 of the first and second simple planetary gearsets 6 and 8, and the fourth operating element D indicates the planet carrier 26 of the first simple planetary gearset 6.

The operating elements of the first planetary gear unit 4 are connected to the operating elements of the second planetary gear unit 18 identically as in the first embodiment. Namely, the third operating element C of the first planetary gear unit 4 is fixedly connected to the third operating element G of the second planetary gear unit 18, and the second operating element B of the first planetary gear unit 4 is variably connected to the first and second operating elements E and F of the second planetary gear unit 18.

In the thirty-third embodiment, only the structure of the first planetary gear unit 4 is changed from the first embodiment. As the operation of the operating elements in each shift range is identical to that of the first embodiment, an explanation thereof will be omitted herein.

Thirty-fourth Embodiment

Figure 39:
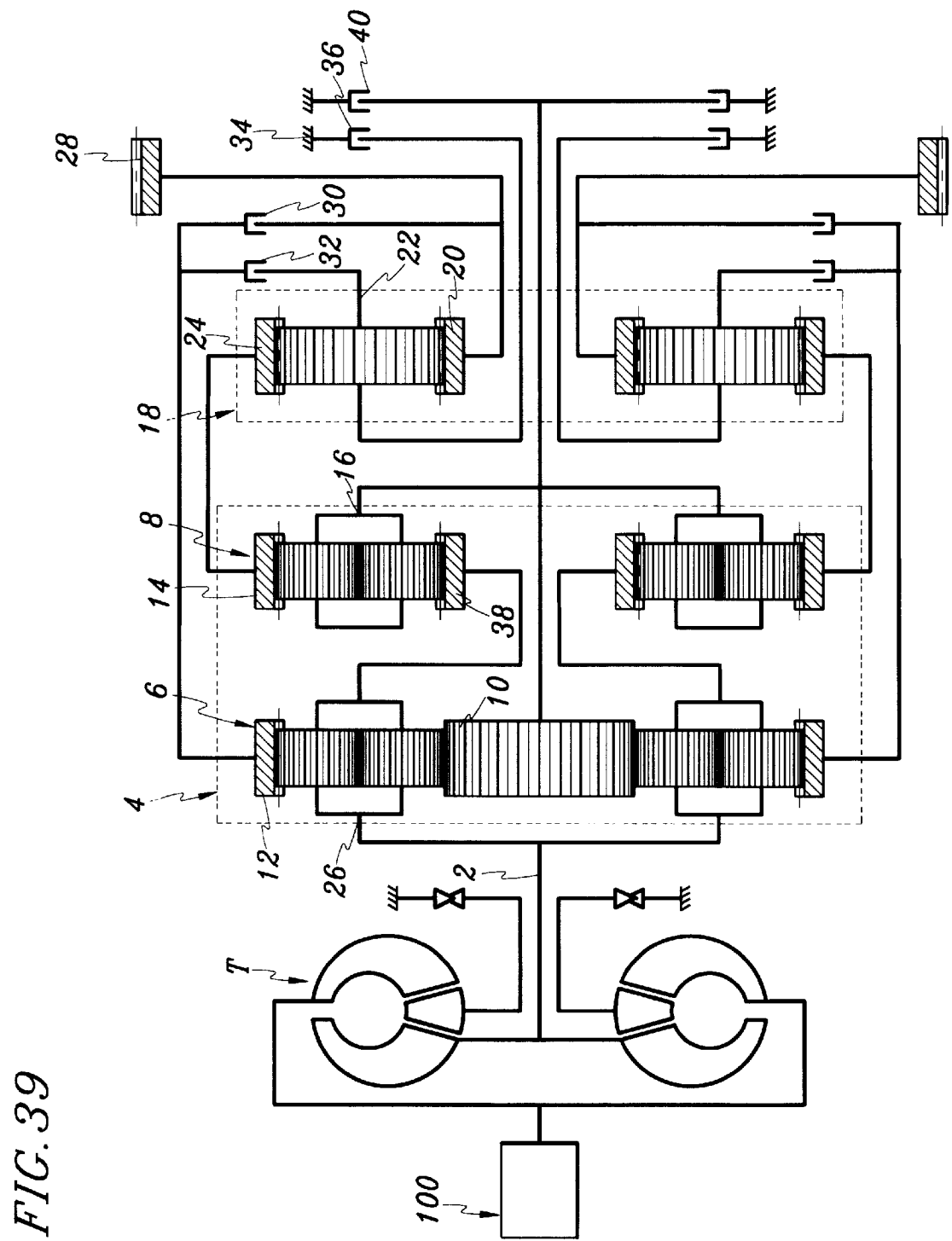
FIG. 39 is a schematic view of a powertrain according to a thirty-fourth preferred embodiment of the present invention.

Referring to FIG. 39, shown is a schematic view of a powertrain according to a thirty-fourth preferred embodiment of the present invention. In the drawing, the first planetary gear unit 4 is formed by a combination of the first simple planetary gearsets 6, which is a double pinion planetary gearset as in the first embodiment, with the second simple planetary gearset 8, which is a double pinion planetary gearset in this embodiment. Namely, the sun gear 10 and planet carrier 26 of the first simple planetary gearset 6 are fixedly connected respectively to the planet carrier 16 and sun gear 38 of the second simple planetary gearset 8.

Further, with regard to the combination of the first and second planetary gear units 4 and 18, the ring gear 14 of the second simple planetary gearset 8 is fixedly connected to the ring gear 24 of the second planetary gear unit 18, and the ring gear 12 of the first simple planetary gearset 6 is variably connected to both the sun gear 20 of the second planetary gear unit 18 through the first clutch 30, and to the planet carrier 22 of the second planetary gear unit 18 through the second clutch 32.

Also, the first brake 36 is interposed between the planet carrier 22 of the second planetary gear unit 18 and the transmission housing 34, and the second brake 40 is interposed between the planet carrier 16 of the second simple planetary gearset 8 and the transmission housing 34 such that the planet carriers 22 and 16 selectively act as reacting elements. In addition, the sun gear 20 of the second planetary gear unit 18 is integrally formed with the output gear 28 such that the sun gear 20 acts as an output element.

According to the above structure, operating elements for the first planetary gear unit 4 in the lever analogies of FIGS. 2–5 are as follows: the first operating element A indicates the planet carrier 26 and sun gear 38 of the first and second simple planetary gearsets 6 and 8, the second operating element B indicates the ring gear 12 of the first simple planetary gearset 6, the third operating element C indicates the ring gear 14 of the second simple planetary gearset 8, and the fourth operating element D indicates the sun gear 10 and planet carrier 16 of the first and second simple planetary gearsets 6 and 8.

The operating elements of the first planetary gear unit 4 are connected to the operating elements of the second planetary gear unit 18 identically as in the first embodiment. Namely, the third operating element C of the first planetary gear unit 4 is fixedly connected to the third operating element G of the second planetary gear unit 18, and the second operating element B of the first planetary gear unit 4 is variably connected to the first and second operating elements E and F of the second planetary gear unit 18.

In the thirty-fourth embodiment, only the structure of the first planetary gear unit 4 is changed from the first embodiment. As the operation of the operating elements in each shift range is identical to that of the first embodiment, an explanation thereof will be omitted herein.

Thirty-fifth Embodiment

Figure 40:
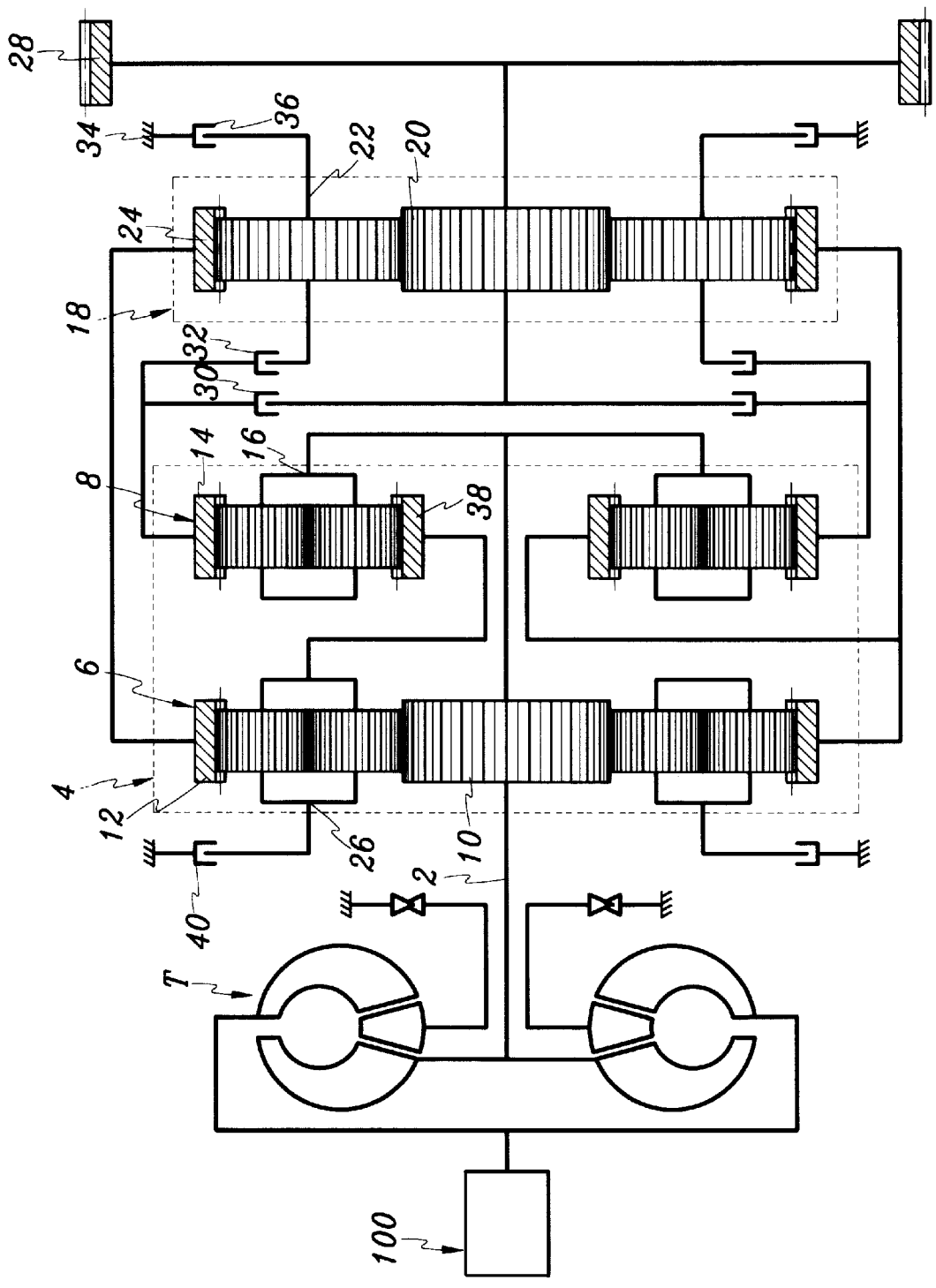
FIG. 40 is a schematic view of a powertrain according to an thirty-fifth preferred embodiment of the present invention.

Referring to FIG. 40, shown is a schematic view of a powertrain according to a thirty-fifth preferred embodiment of the present invention. In the drawing, the first planetary gear unit 4 is formed by a combination of the first simple planetary gearsets 6, which is a double pinion planetary gearset as in the first embodiment, with the second simple planetary gearset 8, which is a double pinion planetary gearset in this embodiment. Namely, the sun gear 10 and planet carrier 26 of the first simple planetary gearset 6 are fixedly connected respectively to the planet carrier 16 and sun gear 38 of the second simple planetary gearset 8.

Further, with regard to the combination of the first and second planetary gear units 4 and 18, the ring gear 12 of the first simple planetary gearset 6 is fixedly connected to the ring gear 24 of the second planetary gear unit 18, and the ring gear 14 of the second simple planetary gearset 8 is variably connected to both the sun gear 20 of the second planetary gear unit 18 through the first clutch 30, and to the planet carrier 22 of the second planetary gear unit 18 through the second clutch 32.

Also, the first brake 36 is interposed between the planet carrier 22 of the second planetary gear unit 18 and the transmission housing 34, and the second brake 40 is interposed between the planet carrier 26 of the first simple planetary gearset 6 and the transmission housing 34 such that the planet carriers 22 and 26 selectively act as reacting elements. In addition, the sun gear 20 of the second planetary gear unit 18 is integrally formed with the output gear 28 such that the sun gear 20 acts as an output element.

According to the above structure, operating elements for the first planetary gear unit 4 in the lever analogies of FIGS. 2–5 are as follows: the first operating element A indicates the sun gear 10 and planet carrier 16 of the first and second simple planetary gearsets 6 and 8, the second operating element B indicates the ring gear 14 of the second simple planetary gearset 8, the third operating element C indicates the ring gear 12 of the first simple planetary gearset 6, and the fourth operating element D indicates the planet carrier 26 and sun gear 38 of the first and second simple planetary gearsets 6 and 8.

The operating elements of the first planetary gear unit 4 are connected to the operating elements of the second planetary gear unit 18 identically as in the first embodiment. Namely, the third operating element C of the first planetary gear unit 4 is fixedly connected to the third operating element G of the second planetary gear unit 18, and the second operating element B of the first planetary gear unit 4 is variably connected to the first and second operating elements E and F of the second planetary gear unit 18.

In the thirty-fifth embodiment, only the structure of the first planetary gear unit 4 is changed from the first embodiment. As the operation of the operating elements in each shift range is identical to that of the first embodiment, an explanation thereof will be omitted herein.

Thirty-sixth Embodiment

Figure 41:
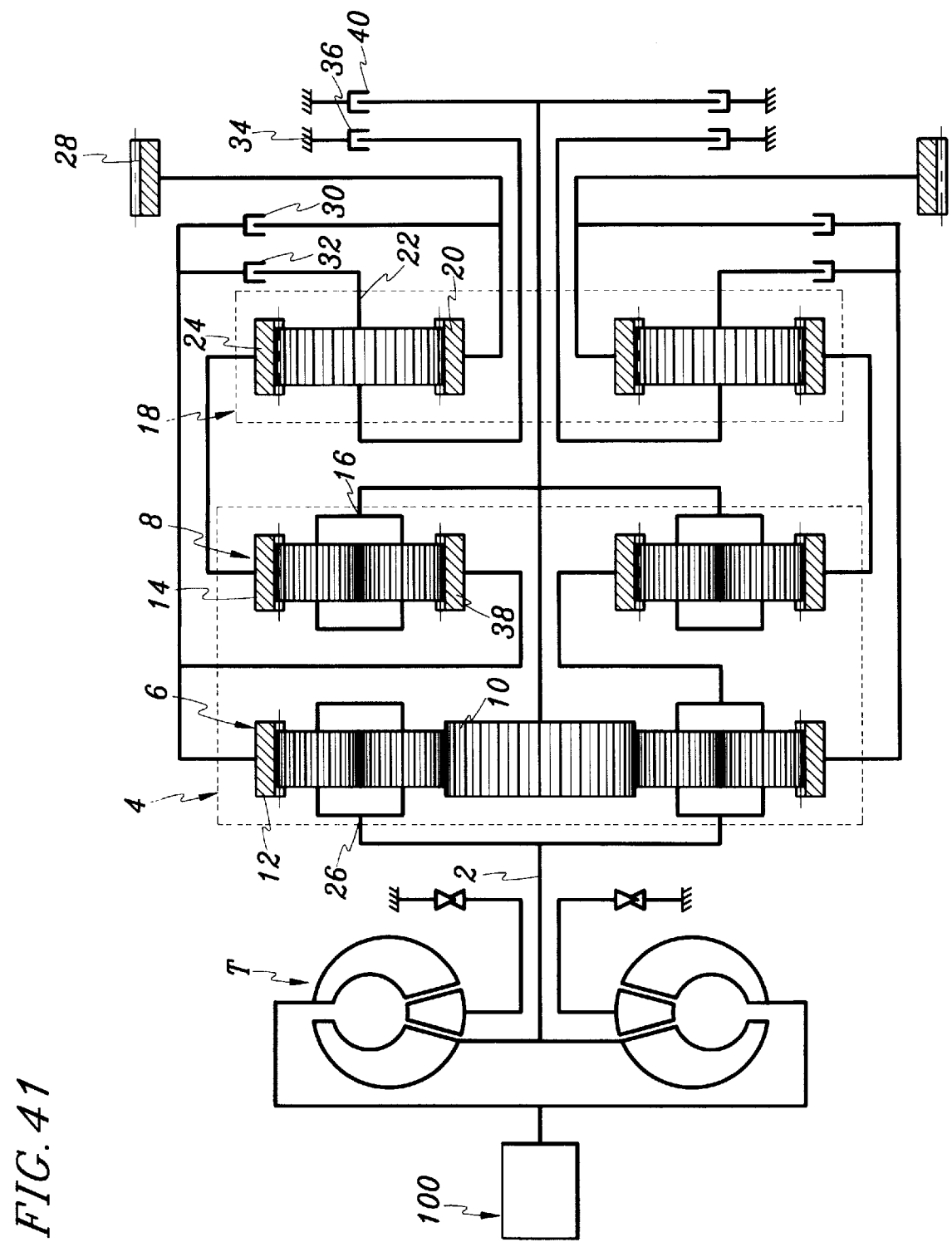
FIG. 41 is a schematic view of a powertrain according to a thirty-sixth preferred embodiment of the present invention.

Referring to FIG. 41, shown is a schematic view of a powertrain according to a thirty-sixth preferred embodiment of the present invention. In the drawing, the first planetary gear unit 4 is formed by a combination of the first simple planetary gearsets 6, which is a double pinion planetary gearset as in the first embodiment, with the second simple planetary gearset 8, which is a double pinion planetary gearset in this embodiment. Namely, the sun gear 10 and ring gear 12 of the first simple planetary gearset 6 are fixedly connected respectively to the planet carrier 16 and sun gear 38 of the second simple planetary gearset 8.

Further, with regard to the combination of the first and second planetary gear units 4 and 18, the ring gear 14 of the second simple planetary gearset 8 is fixedly connected to the ring gear 24 of the second planetary gear unit 18, and the sun gear 38 of the second simple planetary gearset 8 is variably connected to both the sun gear 20 of the second planetary gear unit 18 through the first clutch 30, and to the planet carrier 22 of the second planetary gear unit 18 through the second clutch 32.

Also, the first brake 36 is interposed between the planet carrier 22 of the second planetary gear unit 18 and the transmission housing 34, and the second brake 40 is interposed between the planet carrier 16 of the second simple planetary gearset 8 and the transmission housing 34 such that the planet carriers 22 and 16 selectively act as reacting elements. In addition, the sun gear 20 of the second planetary gear unit 18 is integrally formed with the output gear 28 such that the Bun gear 20 acts as an output element.

According to the above structure, operating elements for the first planetary gear unit 4 in the lever analogies of FIGS. 2–5 are as follows: the first operating element A indicates the planet carrier 26 of the first simple planetary gearset 6, the second operating element B indicates the ring gear 12 and sun gear 38 of the first and second simple planetary gearsets 6 and 8, the third operating element C indicates the ring gear 14 of the second simple planetary gearset 8, and the fourth operating element D indicates the sun gear 10 and planet carrier 16 of the first and second simple planetary gearsets 6 and 8.

The operating elements of the first planetary gear unit 4 are connected to the operating elements of the second planetary gear unit 18 identically as in the first embodiment. Namely, the third operating element C of the first planetary gear unit 4 is fixedly connected to the third operating element G of the second planetary gear unit 18, and the second operating element B of the first planetary gear unit 4 is variably connected to the first and second operating elements E and F of the second planetary gear unit 18.

In the thirty-sixth embodiment, only the structure of the first planetary gear unit 4 is changed from the first embodiment. As the operation of the operating elements in each shift range is identical to that of the first embodiment, an explanation thereof will be omitted herein.

Thirty-seventh Embodiment

Figure 42:
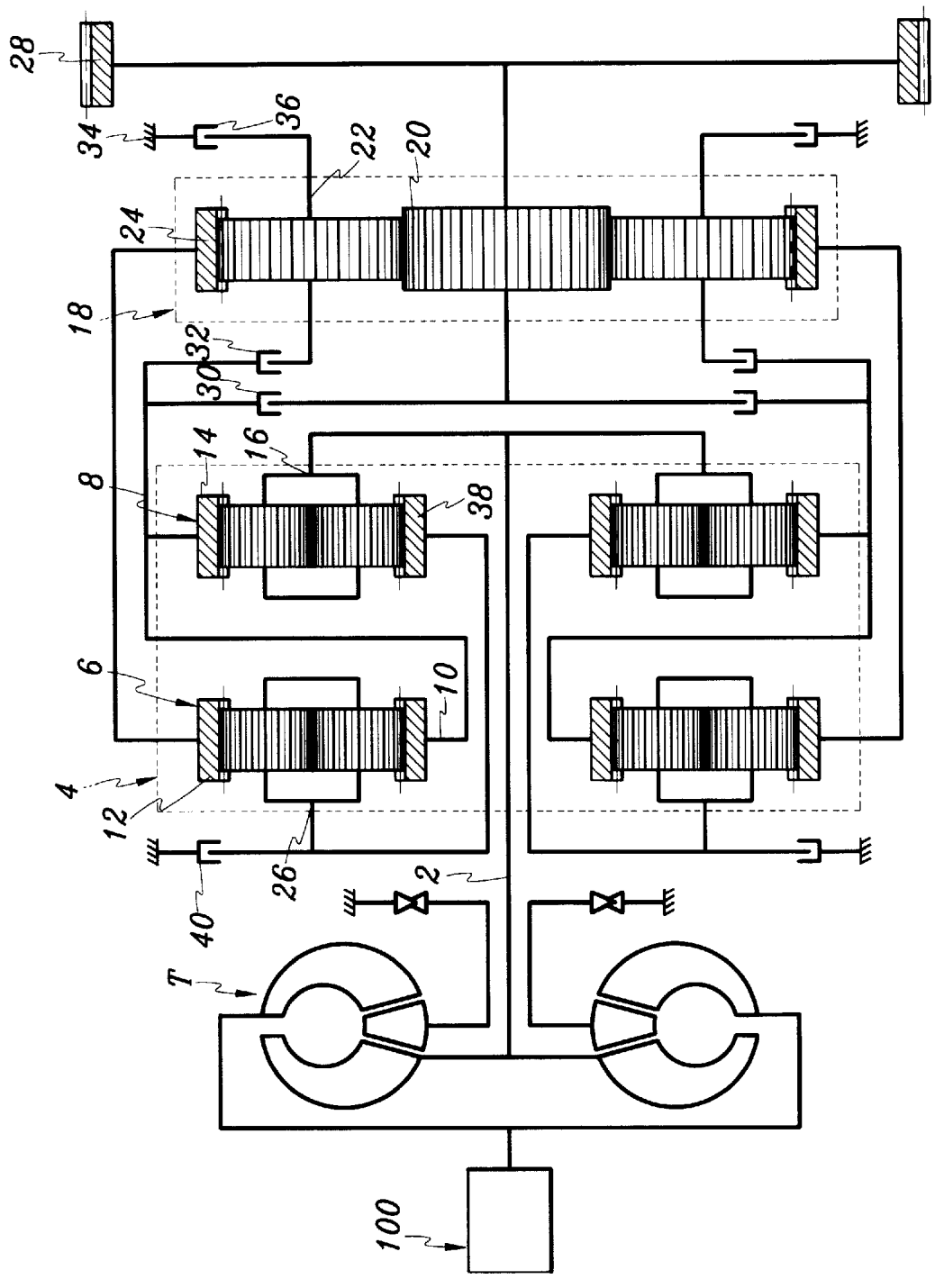
FIG. 42 is a schematic view of a powertrain according to a thirty-seventh preferred embodiment of the present invention.

Referring to FIG. 42, shown is a schematic view of a powertrain according to a thirty-seventh preferred embodiment of the present invention. In the drawing, the first planetary gear unit 4 is formed by a combination of the first simple planetary gearsets 6, which is a double pinion planetary gearset as in the first embodiment, with the second simple planetary gearset 8, which is a double pinion planetary gearset in this embodiment. Namely, the sun gear 10 and planet carrier 26 of the first simple planetary gearset 6 are fixedly connected respectively to the ring gear 14 and sun gear 38 of the second simple planetary gearset 8.

Further, with regard to the combination of the first and second planetary gear units 4 and 18, the ring gear 12 of the first simple planetary gearset 6 is fixedly connected to the ring gear 24 of the second planetary gear unit 18, and the ring gear 14 of the second simple planetary gearset 8 is variably connected to both the sun gear 20 of the second planetary gear unit 18 through the first clutch 30, and to the planet carrier 22 of the second planetary gear unit 18 through the second clutch 32.

Also, the first brake 36 is interposed between the planet carrier 22 of the second planetary gear unit 18 and the transmission housing 34, and the second brake 40 is interposed between the planet carrier 26 of the first simple planetary gearset 6 and the transmission housing 34 such that the planet carriers 22 and 26 selectively act as reacting elements. In addition, the sun gear 20 of the second planetary gear unit 18 is integrally formed with the output gear 28 such that the sun gear 20 acts as an output element.

According to the above structure, operating elements for the first planetary gear unit 4 in the lever analogies of FIGS. 2–5 are as follows: the first operating element A indicates the planet carrier 16 of the second simple planetary gearset 8, the second operating element B indicates the sun gear 10 and ring gear 14 of the first and second simple planetary gearsets 6 and 8, the third operating element C indicates the ring gear 12 of the first simple planetary gearset 6, and the fourth operating element D indicates the planet carrier 26 and sun gear 38 of the first and second simple planetary gearsets 6 and 8.

The operating elements of the first planetary gear unit 4 are connected to the operating elements of the second planetary gear unit 18 identically as in the first embodiment. Namely, the third operating element C of the first planetary gear unit 4 is fixedly connected to the third operating element G of the second planetary gear unit 18, and the second operating element B of the first planetary gear unit 4 is variably connected to the first and second operating elements E and F of the second planetary gear unit 18.

In the thirty-seventh embodiment, only the structure of the first planetary gear unit 4 is changed from the first embodiment. As the operation of the operating elements in each shift range is identical to that of the first embodiment, an explanation thereof will be omitted herein.

Thirty-eighth Embodiment

Figure 43:
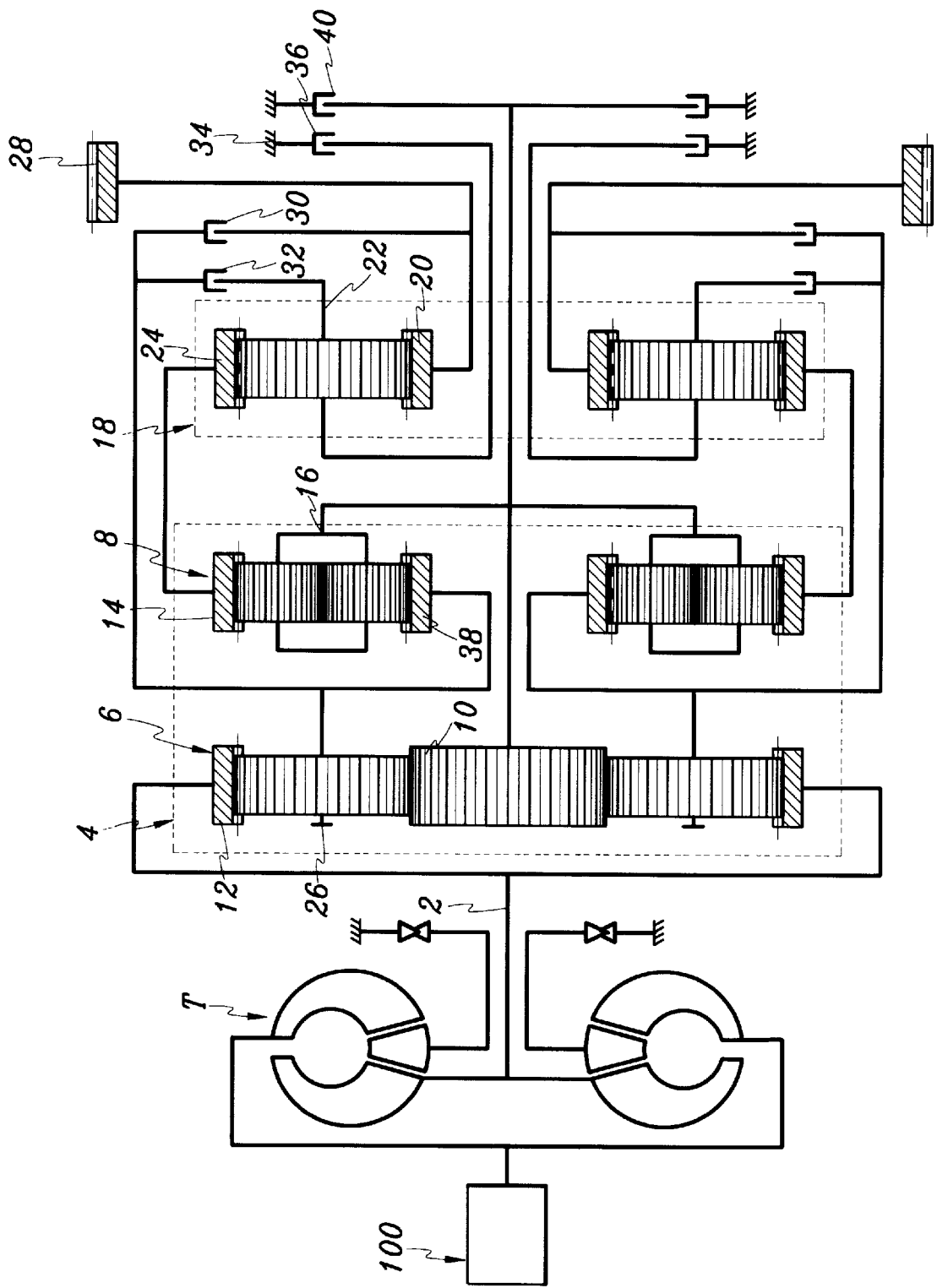
FIG. 43 is a schematic view of a powertrain according to a thirty-eighth preferred embodiment of the present invention.

Referring to FIG. 43, shown is a schematic view of a powertrain according to a thirty-eighth preferred embodiment of the present invention. In the drawing, the first planetary gear unit 4 is formed by a combination of the first simple planetary gearsets 6, which is a single pinion planetary gearset in this embodiment, with the second simple planetary gearset 8, which is a double pinion planetary gearset in this embodiment. Namely, the sun gear 10 and planet carrier 26 of the first simple planetary gearset 6 are fixedly connected respectively to the planet carrier 16 and sun gear 38 of the second simple planetary gearset 8.

Further, with regard to the combination of the first and second planetary gear units 4 and 18, the ring gear 14 of the second simple planetary gearset 8 is fixedly connected to the ring gear 24 of the second planetary gear unit 18, and the sun gear 38 of the second simple planetary gearset 8 is variably connected to both the sun gear 20 of the second planetary gear unit 18 through the first clutch 30, and to the planet carrier 22 of the second planetary gear unit 18 through the second clutch 32.

Also, the first brake 36 is interposed between the planet carrier 22 of the second planetary gear unit 18 and the transmission housing 34, and the second brake 40 is interposed between the planet carrier 16 of the second simple planetary gearset 8 and the transmission housing 34 such that the planet carriers 22 and 16 selectively act as reacting elements. In addition, the sun gear 20 of the second planetary gear unit 18 is integrally formed with the output gear 28 such that the sun gear 20 acts as an output element.

According to the above structure, operating elements for the first planetary gear unit 4 in the lever analogies of FIGS. 2–5 are as follows: the first operating element A indicates the ring gear 12 of the first simple planetary gearset 6, the second operating element B indicates the planet carrier 26 and sun gear 38 of the first and second simple planetary gearsets 6 and 8, the third operating element C indicates the ring gear 14 of the second simple planetary gearset 8, and the fourth operating element D indicates the sun gear 10 and planet carrier 16 of the first and second simple planetary gearsets 6 and 8.

The operating elements of the first planetary gear unit 4 are connected to the operating elements of the second planetary gear unit 18 identically as in the first embodiment. Namely, the third operating element C of the first planetary gear unit 4 is fixedly connected to the third operating element G of the second planetary gear unit 18, and the second operating element B of the first planetary gear unit 4 is variably connected to the first and second operating elements E and F of the second planetary gear unit 18.

In the thirty-eighth embodiment, only the structure of the first planetary gear unit 4 is changed from the first embodiment. As the operation of the operating elements in each shift range is identical to that of the first embodiment, an explanation thereof will be omitted herein.

Thirty-ninth Embodiment

Figure 44:
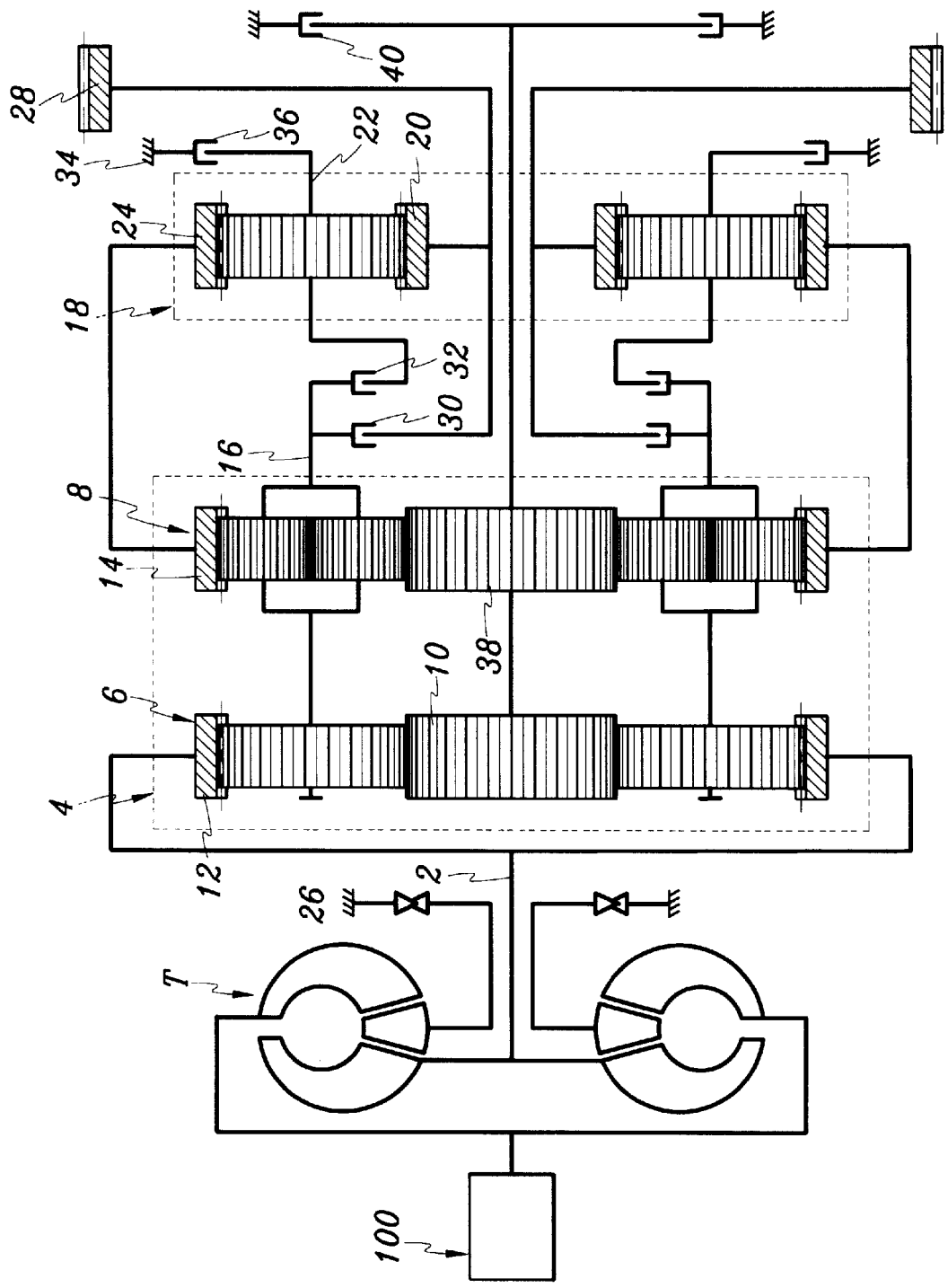
FIG. 44 is a schematic view of a powertrain according to a thirty-ninth preferred embodiment of the present invention.

Referring to FIG. 44, shown is a schematic view of a powertrain according to a thirty-ninth preferred embodiment of the present invention. In the drawing, the first planetary gear unit 4 is formed by a combination of the first simple planetary gearsets 6, which is a single pinion planetary gearset in this embodiment, with the second simple planetary gearset 8, which is a double pinion planetary gearset in this embodiment. Namely, the sun gear 10 and planet carrier 26 of the first simple planetary gearset 6 are fixedly connected respectively to the sun gear 38 and planet carrier 16 of the second simple planetary gearset 8.

Further, with regard to the combination of the first and second planetary gear units 4 and 18, the ring gear 14 of the second simple planetary gearset 8 is fixedly connected to the ring gear 24 of the second planetary gear unit 18, and the planet carrier 16 of the second simple planetary gearset 8 is variably connected to both the sun gear 20 of the second planetary gear unit 18 through the first clutch 30, and to the planet carrier 22 of the second planetary gear unit 18 through the second clutch 32.

Also, the first brake 36 is interposed between the planet carrier 22 of the second planetary gear unit 18 and the transmission housing 34, and the second brake 40 is interposed between the sun gear 38 of the second simple planetary gearset 8 and the transmission housing 34 such that the planet carrier 22 and the sun gear 38 selectively act as reacting elements. In addition, the sun gear 20 of the second planetary gear unit 18 is integrally formed with the output gear 28 such that the sun gear 20 acts as an output element.

According to the above structure, operating elements for the first planetary gear unit 4 in the lever analogies of FIGS. 2–5 are as follows: the first operating element A indicates the ring gear 12 of the first simple planetary gearset 6, the second operating element B indicates the planet carriers 26 and 16 of the first and second simple planetary gearsets 6 and 8, the third operating element C indicates the ring gear 14 of the second simple planetary gearset 8, and the fourth operating element D indicates the sun gears 10 and 38 of the first and second simple planetary gearsets 6 and 8.

The operating elements of the first planetary gear unit 4 are connected to the operating elements of the second planetary gear unit 18 identically as in the first embodiment. Namely, the third operating element C of the first planetary gear unit 4 is fixedly connected to the third operating element G of the second planetary gear unit 18, and the second operating element B of the first planetary gear unit 4 is variably connected to the first and second operating elements E and F of the second planetary gear unit 18.

In the thirty-ninth embodiment, only the structure of the first planetary gear unit 4 is changed from the first embodiment. As the operation of the operating elements in each shift range is identical to that of the first embodiment, an explanation thereof will be omitted herein.

Fortieth Embodiment

Figure 45:
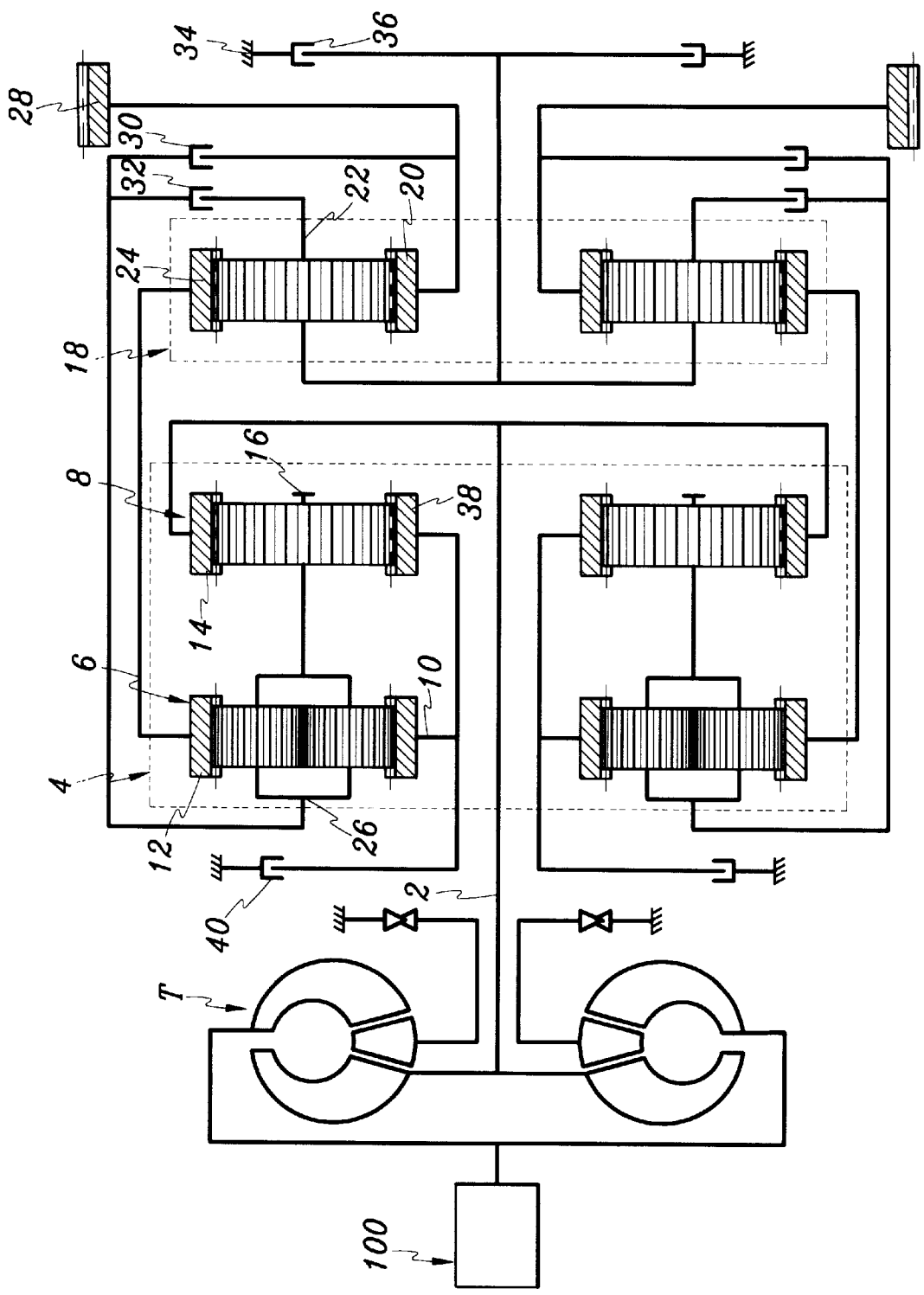
FIG. 45 is a schematic view of a powertrain according to a fortieth preferred embodiment of the present invention.

Referring to FIG. 45, shown is a schematic view of a powertrain according to a fortieth preferred embodiment of the present invention. In the drawing, the first planetary gear unit 4 is formed by a combination of the first simple planetary gearsets 6, which is a double pinion planetary gearset as in the first embodiment, with the second simple planetary gearset 8, which is a single pinion planetary gearset as in the first embodiment. Namely, the sun gear 10 and planet carrier 26 of the first simple planetary gearset 6 are fixedly connected respectively to the sun gear 38 and planet carrier 16 of the second simple planetary gearset 8.

Further, with regard to the combination of the first and second planetary gear units 4 and 18, the ring gear 12 of the first simple planetary gearset 6 is fixedly connected to the ring gear 24 of the second planetary gear unit 18, and the planet carrier 26 of the first simple planetary gearset 6 is variably connected to both the sun gear 20 of the second planetary gear unit 18 through the first clutch 30, and to the planet carrier 22 of the second planetary gear unit 18 through the second clutch 32.

Also, the first brake 36 is interposed between the planet carrier 22 of the second planetary gear unit 18 and the transmission housing 34, and the second brake 40 is interposed between the sun gear 10 of the first simple planetary gearset 6 and the transmission housing 34 such that the planet carrier 22 and the sun gear 10 selectively act as reacting elements. In addition, the sun gear 20 of the second planetary gear unit 18 is integrally formed with the output gear 28 such that the sun gear 20 acts as an output element.

According to the above structure, operating elements for the first planetary gear unit 4 in the lever analogies of FIGS. 2–5 are as follows: the first operating element A indicates the ring gear 14 of the second simple planetary gearset 8, the second operating element B indicates the planet carriers 26 and 16 of the first and second simple planetary gearsets 6 and 8, the third operating element C indicates the ring gear 12 of the first simple planetary gearset 6, and the fourth operating element D indicates the sun gears 10 and 38 of the first and second simple planetary gearsets 6 and 8.

The operating elements of the first planetary gear unit 4 are connected to the operating elements of the second planetary gear unit 18 identically as in the first embodiment. Namely, the third operating element C of the first planetary gear unit 4 is fixedly connected to the third operating element G of the second planetary gear unit 18, and the second operating element B of the first planetary gear unit 4 is variably connected to the first and second operating elements E and F of the second planetary gear unit 18.

In the fortieth embodiment, only the structure of the first planetary gear unit 4 is changed from the first embodiment. As the operation of the operating elements in each shift range is identical to that of the first embodiment, an explanation thereof will be omitted herein.

In the powertrain for a 5-speed automatic transmission structured and operating as in the above, by eliminating an element rotating faster than a final output element needed in the prior art when in overdrive, power loss is minimized. Also, as the number of friction elements is reduced, the powertrain can be designed to be compact in size and lightweight.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A powertrain for a 5-speed automatic transmission comprising:
   a first planetary gear unit comprising first and second simple planetary gearsets having first, second, third, and fourth operating elements;
   a second planetary gear unit comprising a simple planetary gearsets having fifth, sixth, and seventh operating elements, said fifth operating element acting as an output element, one of the operating elements of the second planetary gear unit being fixedly connected to one of the operating elements of the first planetary gear unit, and the remaining two operating elements of the second planetary gear unit being variably connected to one operating element of the first planetary gear unit;

clutch means for variably connecting the two operating elements of the second planetary gear unit to the one operating element of the first planetary gear unit;

brake means for selectively connecting at least one of the operating elements of the first and second planetary gear units to a transmission housing; and wherein at least one of the operating elements of the first planetary gear unit further comprises at least one gear of the first simple planetary gearset engaged to at least one gear of the second simple planetary gearset.

2. The powertrain of claim 1, wherein the first and second simple planetary gearsets of the first planetary gear unit are respectively single and double pinion planetary gearsets.

3. The powertrain of claim 2, wherein a planet carrier and a ring gear of the first simple planetary gearset are fixedly connected respectively to a ring gear and a sun gear of the second simple planetary gearset.

4. The powertrain of claim 3, wherein the ring gears of the first and second simple planetary gearsets are fixedly connected to a ring gear of the second planetary gear unit, and a planet carrier of the second simple planetary gearset is variably connected to both a sun gear of the second planetary gear unit through a first clutch and to a planet carrier of the second planetary gear unit through a second clutch.

5. The powertrain of claim 3, wherein the planet carrier of the first simple planetary gearset is fixedly connected to a ring gear of the second planetary gear unit, and both the planet carrier and ring gear of the first and second simple planetary gearsets are variably connected to both a sun gear of the second planetary gear unit through a first clutch and to a planet carrier of the second planetary gear unit through a second clutch.

6. The powertrain of claim 2, wherein a planet carrier and a ring gear of the first simple planetary gearset are fixedly connected respectively to a ring gear and a planet carrier of the second simple planetary gearset.

7. The powertrain of claims 6, wherein a sun gear of the first simple planetary gearset is fixedly connected to a ring gear of the second planetary gear unit, and both the ring gear and planet carrier of the first and second simple planetary gearsets are variably connected to both a sun gear of the second planetary gear unit through a first clutch and to a planet carrier of the second planetary gear unit through a second clutch.

8. The powertrain of claim 6, wherein the planet carrier and ring gear of the first and second simple planetary gearsets are fixedly connected to a ring gear of the second planetary gear unit, and a sun gear of the first simple planetary gearset is variably connected to both a sun gear of the second planetary gear unit through a first clutch and to a planet carrier of the second planetary gear unit through a second clutch.

9. The powertrain of claim 2, wherein a sun-gear and a planet carrier of the first simple planetary gearset are fixedly connected respectively to a sun gear and a planet carrier of the second simple planetary gearset.

10. The powertrain of claim 9, wherein the planet carriers of the first and second simple planetary gearsets are fixedly connected to a ring gear of the second planetary gear unit, and a ring gear of the first simple planetary gearset is variably connected to both a sun gear of the second planetary gear unit through a first clutch and to a planet carrier of the second planetary gear unit through a second clutch.

11. The powertrain of claim 9, wherein a ring gear of the second simple planetary gearset is fixedly connected to a ring gear of the second planetary gear unit, and the planet carriers of the first and second simple planetary gearsets are variably connected to both a sun gear of the second planetary gear unit through a first clutch and to a planet carrier of the second planetary gear unit through a second clutch.

12. The powertrain of claim 2, wherein a sun gear and a planet carrier of the first simple planetary gearset are fixedly connected respectively to a planet carrier and a sun gear of the second simple planetary gearset.

13. The powertrain of claim 9, wherein the planet carrier and sun gear of the first and second simple planetary gearsets are fixedly connected to a ring gear of the second planetary gear unit, and a ring gear of the second simple planetary gearset is variably connected to both a sun gear of the second planetary gear unit through a first clutch and to a planet carrier of the second planetary gear unit through a second clutch.

14. The powertrain of claim 9, wherein a ring gear of the second simple planetary gearset is fixedly connected to a ring gear of the second planetary gear unit, and the planet carrier and sun gear of the first and second simple planetary gearsets are variably connected to both a sun gear of the second planetary gear unit through a first clutch and to a planet carrier of the second planetary gear unit through a second clutch.

15. The powertrain of claim 1, wherein the first and second simple planetary gearsets are double pinion planetary gearsets.

16. The powertrain of claim 15, wherein a sun gear and a ring gear of the first simple planetary gearset are fixedly connected respectively to a planet carrier and a ring gear of the second simple planetary gearset.

17. The powertrain of claim 16, wherein a planet carrier of the first simple planetary gearset is fixedly connected to a ring gear of the second planetary gear unit, and the ring gears of the first and second simple planetary gearsets are variably connected to both a sun gear of the second planetary gear unit through a first clutch and to a planet carrier of the second planetary gear unit through a second clutch.

18. The powertrain of claim 16, wherein the ring gears of the first and second simple planetary gearsets are fixedly connected to a ring gear of the second planetary gear unit, and a planet carrier of the first simple planetary gearset is variably connected to both a sun gear of the second planetary gear unit through a first clutch and to a planet carrier of the second planetary gear unit through a second clutch.

19. The powertrain of claim 15, wherein a planet carrier and a ring gear of the first simple planetary gearset are fixedly connected respectively to a sun gear and a ring gear of the second simple planetary gearset.

20. The powertrain of claim 19, wherein the planet carrier of the first simple planetary gearset is fixedly connected to a ring gear of the second planetary gear unit, and the ring gears of the first and second simple planetary gearsets are variably connected to both a sun gear of the second planetary gear unit through a first clutch and to a planet carrier of the second planetary gear unit through a second clutch.

21. The powertrain of claim 19, wherein the ring gears of the first and second simple planetary gearsets are fixedly connected to a ring gear of the second planetary gear unit, and the planet carrier of the first simple planetary gearset is variably connected to both a sun gear of the second planetary gear unit through a first clutch and to a planet carrier of the second planetary gear unit through a second clutch.

22. The powertrain of claim 15, wherein a planet carrier and a ring gear of the first simple planetary gearset are fixedly connected respectively to a ring gear and a planet carrier of the second simple planetary gearset.

23. The powertrain of claim 22, wherein the planet carrier and ring gear of the first and second simple planetary gearsets are fixedly connected to a ring gear of the second planetary gear unit, and the ring gear and planet carrier of the first and second simple planetary gearsets are variably connected to both a sun gear of the second planetary gear unit through a first clutch and to a planet carrier of the second planetary gear unit through a second clutch.

24. The powertrain of claim 22, wherein the ring gear and planet carrier of the first and second simple planetary gearsets are fixedly connected to a ring gear of the second planetary gear unit, and the planet carrier and ring gear of the first and second simple planetary gearsets are variably connected to both a sun gear of the second planetary gear unit through a first clutch and to a planet carrier of the second planetary gear unit through a second clutch.

25. The powertrain of claim 15, wherein a planet carrier and a ring gear of the first simple planetary gearset are fixedly connected respectively to a planet carrier and a ring gear of the second simple planetary gearset.

26. The powertrain of claim 25, wherein a sun gear of the first simple planetary gearset is fixedly connected to a ring gear of the second planetary gear unit, and the ring gears of the first and second simple planetary gearsets are variably connected to both a sun gear of the second planetary gear unit through a first clutch and to a planet carrier of the second planetary gear unit through a second clutch.

27. The powertrain of claim 25, wherein a sun gear of the second simple planetary gearset is fixedly connected to a ring gear of the second planetary gear unit, and the ring gears of the first and second simple planetary gearsets are variably connected to both a sun gear of the second planetary gear unit through a first clutch and to a planet carrier of the second planetary gear unit through a second clutch.

28. The powertrain of claim 25, wherein the ring gears of the first and second simple planetary gearsets are fixedly connected to a ring gear of the second planetary gear unit, and a sun gear of the second simple planetary gearset is variably connected to both a sun gear of the second planetary gear unit through a first clutch and to a planet carrier of the second planetary gear unit through a second clutch.

29. The powertrain of claim 15, wherein a sun gear and a ring gear of the first simple planetary gearset are fixedly connected respectively to a ring gear and a planet carrier of the second simple planetary gearset.

30. The powertrain of claim 29, wherein the sun gear and ring gear of the first and second simple planetary gearsets are fixedly connected to a ring gear of the second planetary gear unit, and the ring gear and planet carrier of the first and second simple planetary gearsets are variably connected to both a sun gear of the second planetary gear unit through a first clutch and to a planet carrier of the second planetary gear unit through a second clutch.

31. The powertrain of claim 29, wherein the ring gear and planet carrier of the first and second simple planetary gearsets are fixedly connected to a ring gear of the second planetary gear unit, and the sun gear and ring gear of the first and second simple planetary gearsets are variably connected to both a sun gear of the second planetary gear unit through a first clutch and to a planet carrier of the second planetary gear unit through a second clutch.

32. The powertrain of claim 15, wherein a planet carrier and a ring gear of the first simple planetary gearset are fixedly connected respectively to a ring gear and a sun gear of the second simple planetary gearset.

33. The powertrain of claim 32, wherein the ring gear and sun gear of the first and second simple planetary gearsets are fixedly connected to a ring gear of the second planetary gear unit, and the planet carrier and ring gear of the first and second simple planetary gearsets are variably connected to both a sun gear of the second planetary gear unit through a first clutch and to a planet carrier of the second planetary gear unit through a second clutch.

34. The powertrain of claim 31, wherein a sun gear and a ring gear of the first simple planetary gearset are fixedly connected respectively to a sun gear and a planet carrier of the second simple planetary gearset.

35. The powertrain of claim 34, wherein a ring gear of the second simple planetary gearset is fixedly connected to a ring gear of the second planetary gear unit, and the ring gear and planet carrier of the first and second simple planetary gearsets are variably connected to both a sun gear of the second planetary gear unit through a first clutch and to a planet carrier of the second planetary gear unit through a second clutch.

36. The powertrain of claim 34, wherein the ring gear and planet carrier of the first and second simple planetary gearsets are fixedly connected to a ring gear of the second planetary gear unit, and a ring gear of the second simple planetary gearset is variably connected to both a sun gear of the second planetary gear unit through a first clutch and to a planet carrier of the second planetary gear unit through a second clutch.

37. The powertrain of claim 15, wherein a sun gear and a planet carrier of the first simple planetary gearset are fixedly connected respectively to a sun gear and a ring gear of the second simple planetary gearset.

38. The powertrain of claim 37, wherein a ring gear of the first simple planetary gearset is fixedly connected to a ring gear of the second planetary gear unit, and the planet carrier and ring gear of the first and second simple planetary gearsets are variably connected to both a sun gear of the second planetary gear unit through a first clutch and to a planet carrier of the second planetary gear unit through a second clutch.

39. The powertrain of claim 37, wherein the planet carrier and ring gear of the first and second simple planetary gearsets are fixedly connected to a ring gear of the second planetary gear unit, and a ring gear of the first simple planetary gearset is variably connected to both a sun gear of the second planetary gear unit through a first clutch and to a planet carrier of the second planetary gear unit through a second clutch.

40. The powertrain of claim 15, wherein a planet carrier and a ring gear of the-first simple planetary gearset are fixedly connected respectively to a ring gear and a sun gear of the second simple planetary gearset.

41. The powertrain of claim 40, wherein the planet carrier and sun gear of the first and second simple planetary gearsets are fixedly connected to a ring gear of the second planetary gear unit, and the ring gear and sun gear of the first and second simple planetary gearsets are variably connected to both a sun gear of the second planetary gear unit through a first clutch and to a planet carrier of the second planetary gear unit through a second clutch.

42. The powertrain of claim 15, wherein a sun gear and a planet carrier of the first simple planetary gearset are fixedly connected respectively to a ring gear and a sun gear of the second simple planetary gearset.

43. The powertrain of claim 42, wherein the sun gear and ring gear of the first and second simple planetary gearsets are fixedly connected to a ring gear of the second planetary gear unit, and a ring gear of the first simple planetary gearset is variably connected to both a sun gear of the second planetary gear unit through a first clutch and to a planet carrier of the second planetary gear unit through a second clutch.

44. The powertrain of claim 15, wherein a planet carrier and a ring gear of the first simple planetary gearset are fixedly connected respectively to a planet carrier and a sun gear of the second simple planetary gearset.

45. The powertrain of claim 44, wherein the ring gear and planet carrier of the first and second simple planetary gearsets are fixedly connected to a ring gear of the second planetary gear unit, and a ring gear of the second simple planetary gearset is variably connected to both a sun gear of the second planetary gear unit through a first clutch and to a planet carrier of the second planetary gear unit through a second clutch.

46. The powertrain of claim 15, wherein a sun gear and a planet carrier of the first simple planetary gearset are fixedly connected respectively to a planet carrier and a sun gear of the second simple planetary gearset.

47. The powertrain of claim 46, wherein a ring gear of the second simple planetary gearset is fixedly connected to a ring gear of the second planetary gear unit, and a ring gear of the first simple planetary gearset is variably connected to both a sun gear of the second planetary gear unit through a first clutch and to a planet carrier of the second planetary gear unit through a second clutch.

48. The powertrain of claim 46, wherein a ring gear of the first simple planetary gearset is fixedly connected to a ring gear of the second planetary gear unit, and a ring gear of the second simple planetary gearset is variably connected to both a sun gear of the second planetary gear unit through a first clutch and to a planet carrier of the second planetary gear unit through a second clutch.

49. The powertrain of claim 15, wherein a sun gear and a ring gear of the first simple planetary gearset are fixedly connected respectively to a planet carrier and a sun gear of the second simple planetary gearset.

50. The powertrain of claim 49, wherein a ring gear of the second simple planetary gearset is fixedly connected to a ring gear of the second planetary gear unit, and the ring gear and sun gear of the first and second simple planetary gearsets are variably connected to both a sun gear of the second planetary gear unit through a first clutch and to a planet carrier of the second planetary gear unit through a second clutch.

51. The powertrain of claim 15, wherein a sun gear and a planet carrier of the first simple planetary gearset are fixedly connected respectively to a ring gear and a sun gear of the second simple planetary gearset.

52. The powertrain of claim 51, wherein a ring gear of the first simple planetary gearset is fixedly connected to a ring gear of the second planetary gear unit, and the sun gear and ring gear of the first and second simple planetary gearsets are variably connected to both a sun gear of the second planetary gear unit through a first clutch and to a planet carrier of the second planetary gear unit through a second clutch.

53. A powertrain for a 5-speed automatic transmission comprising:
a first planetary gear unit comprising first and second simple planetary gearsets having first, second, third, and fourth operating elements;
a second planetary gear unit comprising a simple planetary gearsets having fifth, sixth, and seventh operating elements, said fifth operating element acting as an output element, one of the operating elements of the second planetary gear unit being fixedly connected to one of the operating elements of the first planetary gear unit, and the remaining two operating elements of the second planetary gear unit being variably connected to one operating element of the first planetary gear unit;
clutch means for variably connecting the two operating elements of the second planetary gear unit to the one operating element of the first planetary gear unit; and
brake means for selectively connecting at least one of the operating elements of the first and second planetary gear units to a transmission housing, wherein the first and second simple planetary gearsets of the first planetary gear unit are respectively double and single pinion planetary gearsets.

54. The powertrain of claim 53, wherein a sun gear and a ring gear of the first simple planetary gearset are fixedly connected respectively to a ring gear and a planet carrier of the second simple planetary gearset.

55. The powertrain of claim 53, wherein a planet carrier and a ring gear of the first simple planetary gearset are fixedly connected respectively to a ring gear and a planet carrier of the second simple planetary gearset.

56. The powertrain of claim 53, wherein a sun gear and a planet carrier of the first simple planetary gearset are fixedly connected respectively to a sun gear and a planet carrier of the second simple planetary gearset.

57. The powertrain of claim 53, wherein a sun gear and a planet carrier of the first simple planetary gearset are fixedly connected respectively to a planet carrier and a sun gear of the second simple planetary gearset.

58. The powertrain of claim 53, wherein a sun gear and a planet carrier of the first simple planetary gearset are fixedly connected respectively to a ring gear and a sun gear of the second simple planetary gearset.

59. The powertrain of claim 53, wherein a sun gear and a planet carrier of the first simple planetary gearset are fixedly connected respectively to a sun gear and a ring gear of the second simple planetary gearset.

60. The powertrain of claim 54, wherein a planet carrier of the first simple planetary gearset is fixedly connected to a ring gear of the second planetary gear unit, and the planet carrier of the second simple planetary gearset is variably connected to both a sun gear and a planet carrier of the second planetary gear unit.

61. The powertrain of claim 54, wherein the ring gear of the first simple planetary gearset is fixedly connected to a planet carrier of the second planetary gear unit, and a planet carrier of the first simple planetary gearset is variably connected to both a sun gear and a planet carrier of the second planetary gear unit.

62. The powertrain of claim 54, wherein a sun gear of the first simple planetary gearset is fixedly connected to the ring gear of the second planetary gear unit, and both the ring gear and planet carrier of the first and second simple planetary gearsets are variably connected to a sun gear of the second planetary gear unit through a first clutch and to a planet carrier of the second planetary gear unit through a second clutch.

63. The powertrain of claim 55, wherein the planet carrier and ring gear of the first and second simple planetary gearsets are fixedly connected to a ring gear of the second planetary gear unit, and a sun gear of the first simple planetary gearset is variably connected to both a sun gear of the second planetary gear unit through a first clutch and to a planet carrier of the second planetary gear unit through a second clutch.

64. The powertrain of claim 56, wherein the planet carriers of the first and second simple planetary gearsets are fixedly connected to a ring gear of the second planetary gear unit, and a ring gear of the first simple planetary gearset is variably connected to both a sun gear of the second planetary gear unit through a first clutch and to a planet carrier of the second planetary gear unit through a second clutch.

65. The powertrain of claim 56, wherein a ring gear of the first simple planetary gearset is fixedly connected to a ring gear of the second planetary gear unit, and the planet carriers of the first and second simple planetary gearsets are variably connected to both a sun gear of the second planetary gear unit through a first clutch and to a planet carrier of the second planetary gear unit through a second clutch.

66. The powertrain of claim 57, wherein the sun gear and planet carrier of the first and second simple planetary gearsets are fixedly connected to a planet carrier of the second planetary gear unit, and a ring gear of the first simple planetary gearset is variably connected to both a sun gear of the second planetary gear unit through a first clutch and to a planet carrier of the second planetary gear unit through a second clutch.

67. The powertrain of claim 58, wherein a planet carrier of the second simple planetary gearset is fixedly connected to a ring gear of the second planetary gear unit, and a ring gear of the first simple planetary gearset is variably connected to both a sun gear of the second planetary gear unit through a first clutch and to a planet carrier of the second planetary gear unit through a second clutch.

68. The powertrain of claim 59, wherein a ring gear of the first simple planetary gearset is fixedly connected to a ring gear of the second planetary gear unit, and the planet carrier of the first simple planetary gearset is variably connected to both a sun gear of the second planetary gear unit through a first clutch and to a planet carrier of the second planetary gear unit through a second clutch.

* * * * *

UNITED STATES PATENT AND TRADEMARK OFFICE
CERTIFICATE OF CORRECTION

PATENT NO.: 6,004,241

DATED: December 21, 1999

INVENTOR(S): Jong-sool PARK

It is certified that an error appears in the above-identified patent and that said Letters Patent is hereby corrected as shown below:

Claim 9, col. 41, line 60 - "sun-gear" should be --sun gear--.

Claim 34, col. 44, line 13 - "claim 31" should be --claim 15--.

Claim 40, col. 44, line 53 - "the-first" should be --the first--.

Signed and Sealed this

Nineteenth Day of September, 2000

*Attest:*

Q. TODD DICKINSON

*Attesting Officer*   *Director of Patents and Trademarks*